United States Patent [19]

Reynolds

[11] E Re. 30,471

[45] Reissued Jan. 6, 1981

[54] AUTOMATIC BOWLING SCORE COMPUTING AND DISPLAY DEVICE

[75] Inventor: Eugene E. Reynolds, Richmond, Calif.

[73] Assignee: Brunswick Corporation, Chicago, Ill.

[21] Appl. No.: 974,626

[22] Filed: Dec. 29, 1978

Related U.S. Patent Documents

Reissue of:

[64] Patent No.: 3,738,652
Issued: Jun. 12, 1973
Appl. No.: 196,039
Filed: May 16, 1962

U.S. Applications:

[63] Continuation of Ser. No. 697,632, Nov. 20, 1957, abandoned.

[51] Int. Cl.[3] ..... A63D 5/04

[52] U.S. Cl. ..... 273/54 C; 235/92 GA; 340/323 B; 364/411

[58] Field of Search ..... 273/54 C; 340/323; 235/92 GA; 353/45; 364/410, 411

[56] References Cited

U.S. PATENT DOCUMENTS

| | | | |
|---|---|---|---|
| 866,923 | 9/1907 | Eichenberger | 273/54 C UX |
| 1,091,810 | 3/1914 | Cassidy | 235/23 |
| 1,313,231 | 8/1919 | Schoradt | 235/60.18 |
| 2,059,277 | 11/1936 | Rand | 235/146 |
| 2,072,933 | 3/1937 | Williams | 273/54 UX |
| 2,109,104 | 2/1938 | Dahlberg | 101/97 |
| 2,203,336 | 6/1940 | Landsiedel | 235/60.2 |
| 2,450,165 | 9/1948 | Randall et al. | 235/60.2 |
| 2,590,444 | 3/1952 | Millman et al. | 273/54 C UX |
| 2,648,497 | 8/1953 | Boyden | 235/43 |
| 2,652,252 | 9/1953 | Alexander | 273/41 X |
| 2,682,995 | 7/1954 | Carey et al. | 235/60.33 |
| 2,741,427 | 4/1956 | Drake | 235/145 X |
| 2,756,933 | 7/1956 | Gang | 235/146 X |
| 2,759,667 | 8/1956 | Werner et al. | 236/60 MT X |

FOREIGN PATENT DOCUMENTS

| | | | |
|---|---|---|---|
| 162602 | 9/1905 | Fed. Rep. of Germany | 273/37 |
| 555216 | 7/1932 | Fed. Rep. of Germany | 273/54 |
| 26271 | 4/1902 | Sweden | 273/52 |

*Primary Examiner*—Anton O. Oechsle
*Attorney, Agent, or Firm*—Wegner, Stellman, McCord, Wiles & Wood

[57] ABSTRACT

A bowling score computer having either manual keyboard or automatic pinfall sensing input. The computer is operative to record mark counts, totalize and display team scores, allow entry of handicap scores and automatically record pace-setter scores. First and second pinfall values for each frame are recorded and the scoring cycle is modified in accordance with first and second ball pinfall. In a first embodiment the frame scores are printed on individual tablets which are thereafter manipulated to display positions. In a second embodiment, the scores are printed on a moveably disposed scoresheet. A device is provided for projecting the scores.

266 Claims, 66 Drawing Figures

FIG. 19.
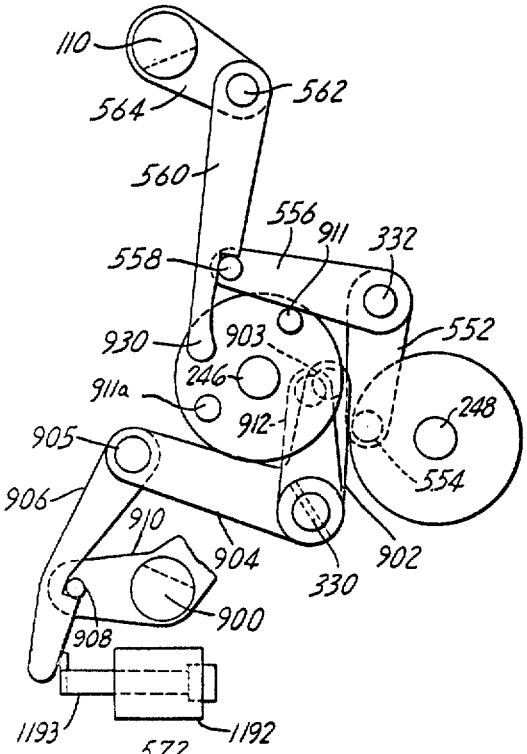
FIG. 20.
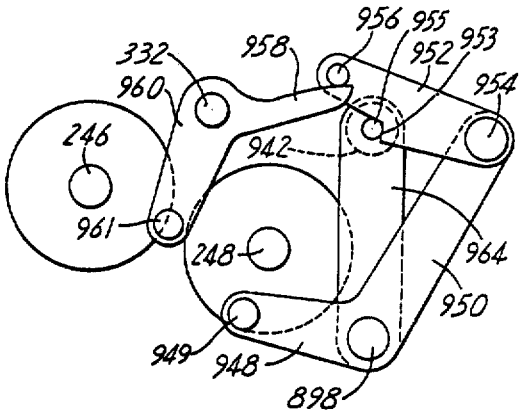
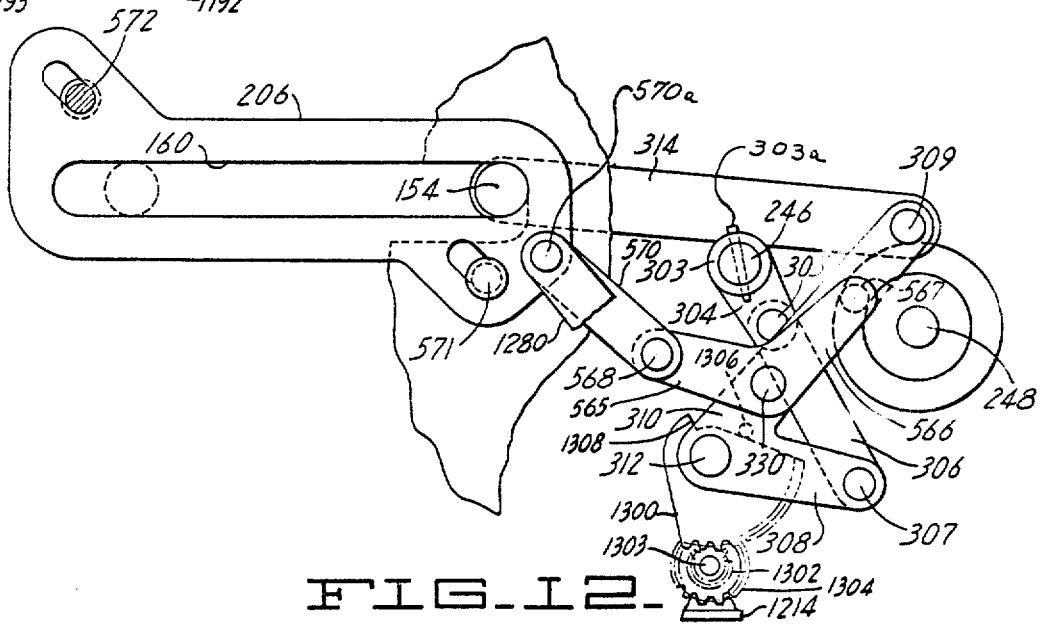
FIG. 12.

842
846
848
748
732
810
808
806
804
814
816
820
822
824
818
884
884a
836
836a
832
832a
INDIVIDUAL SCORES
TEAM TOTAL
10TH
9TH
966
826
827
829
969
X
F
122
106

880
878
874
872
850
842
877
876
852
846
892a
848
806
836
836a
882
882a
832
832a
814
815
816
834
884a
884
885
887
732
748
804
808
810
812
828
830
822
820
818
825
824
826
829
827
823
840
854
844
858
859
856
860
838
857
890
888
886
892
870a
886a
884a
866
868
869
870
862
864
843
806
848

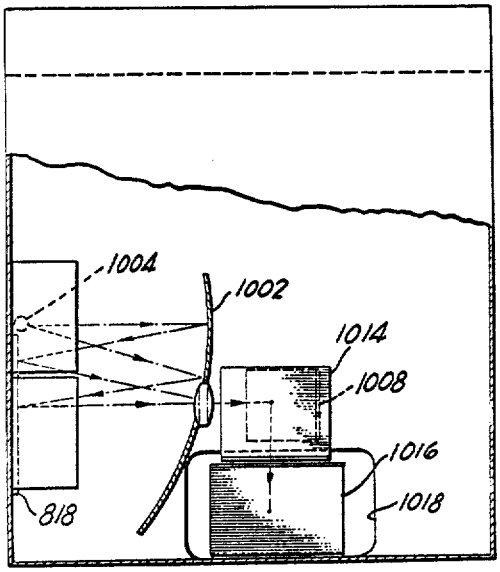
FIG. 35B.
FIG. 35.
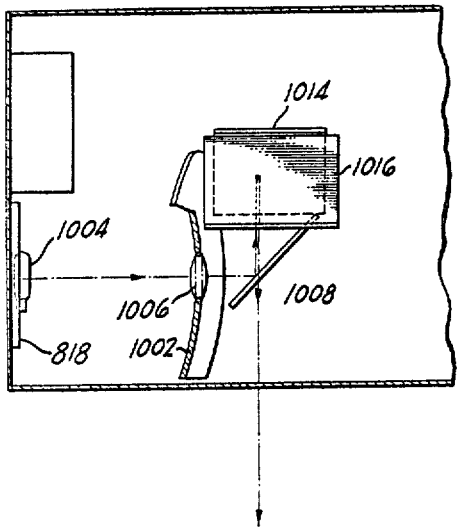
FIG. 35A.
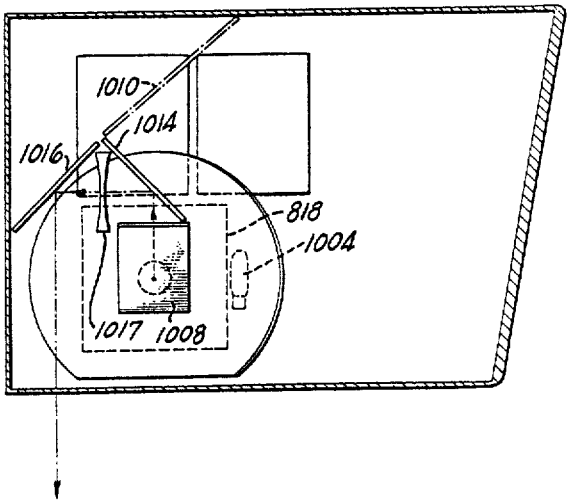

FIG_37_
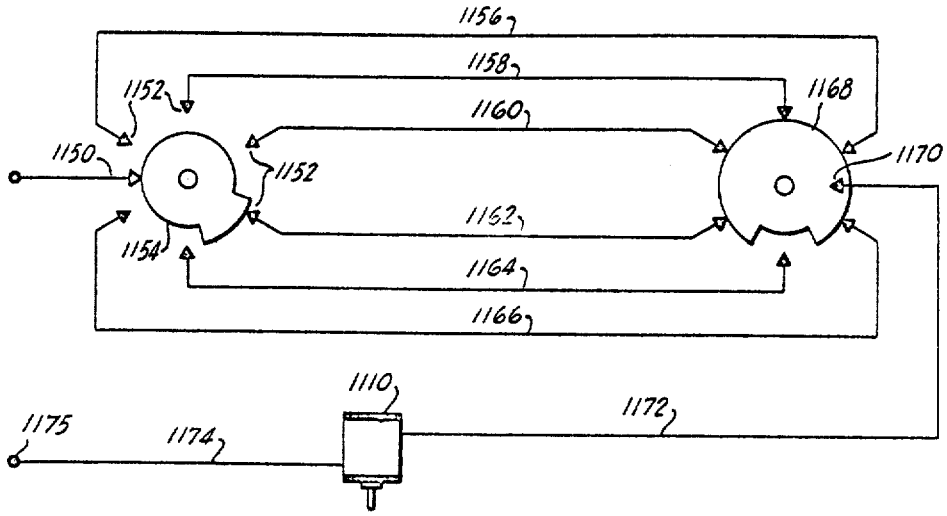
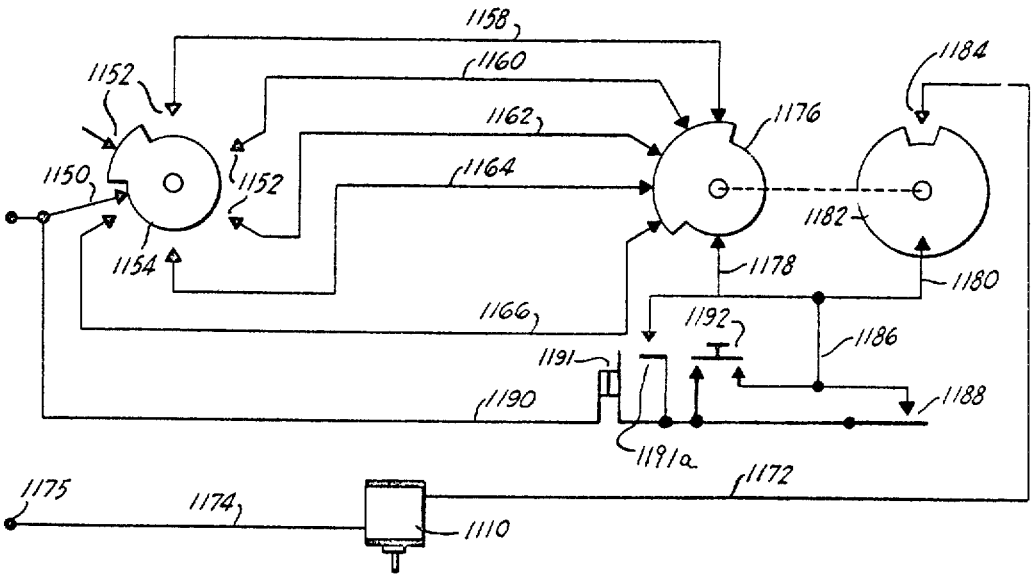
FIG_37A_

FIG_40_
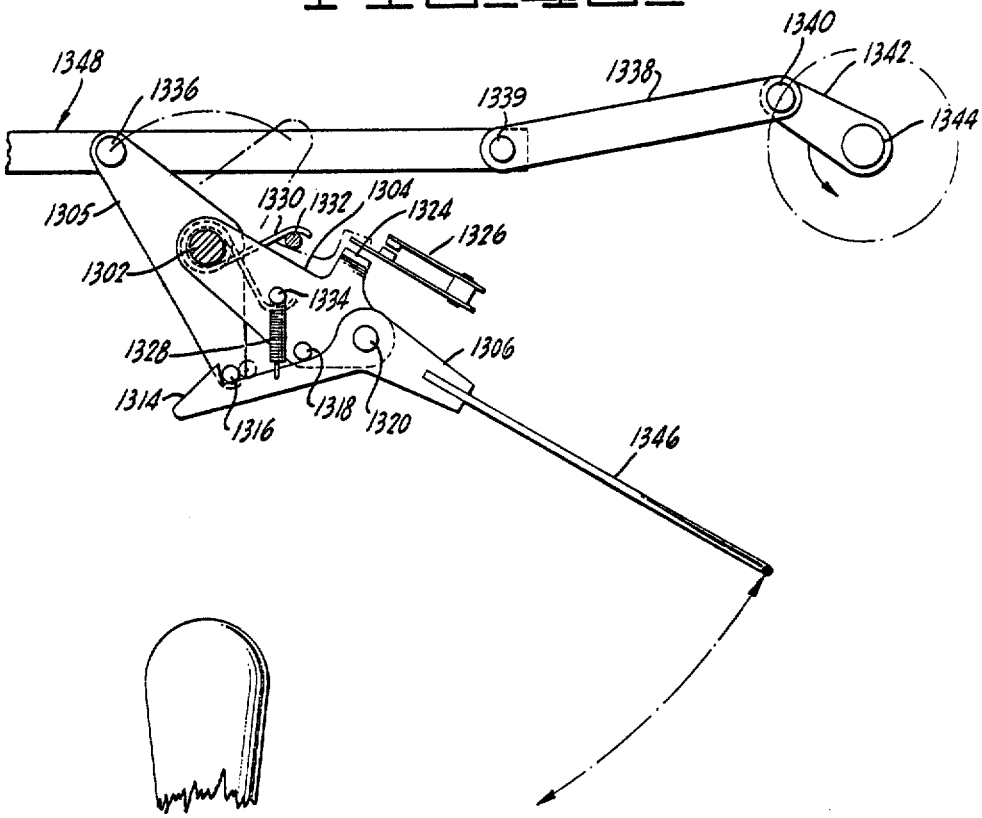
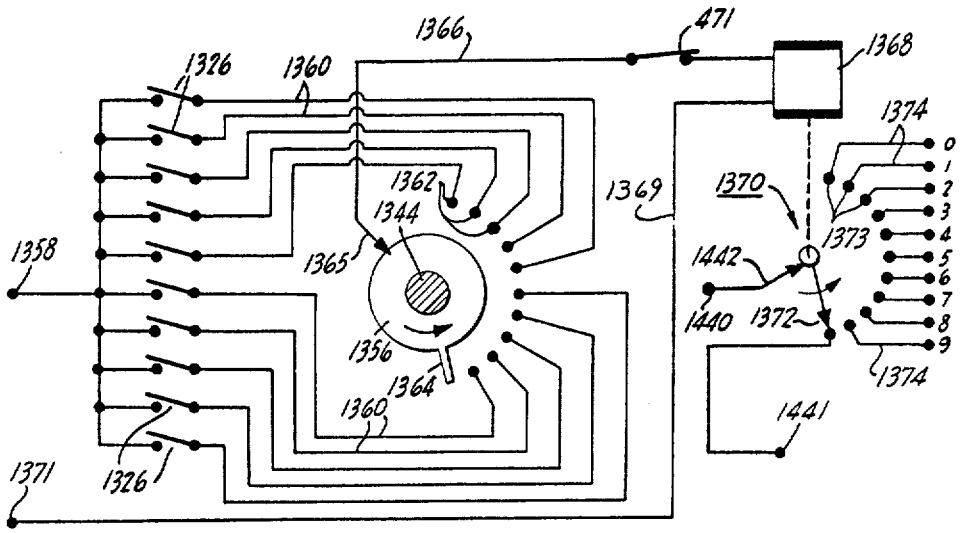
FIG_41_

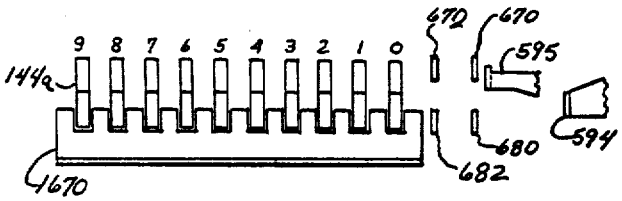
FIG_47
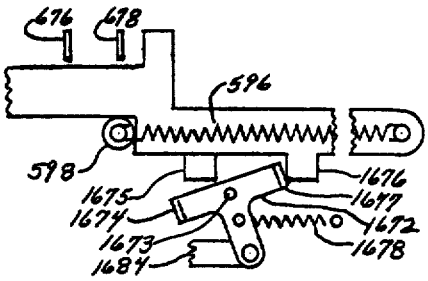
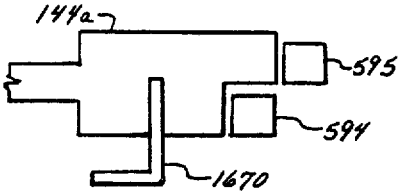
FIG_47-A
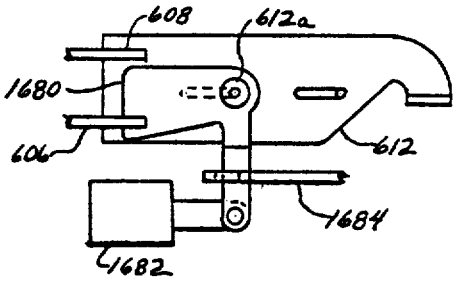
FIG_47-B
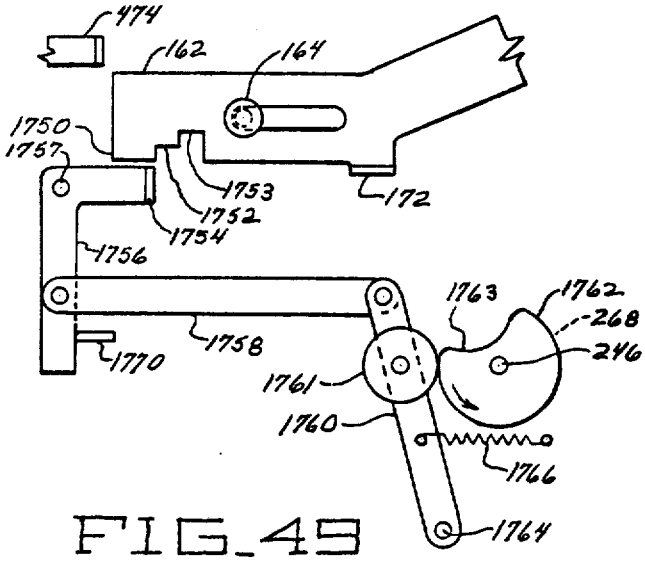
FIG_49
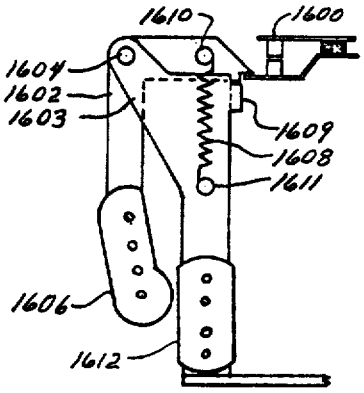
FIG_40-A
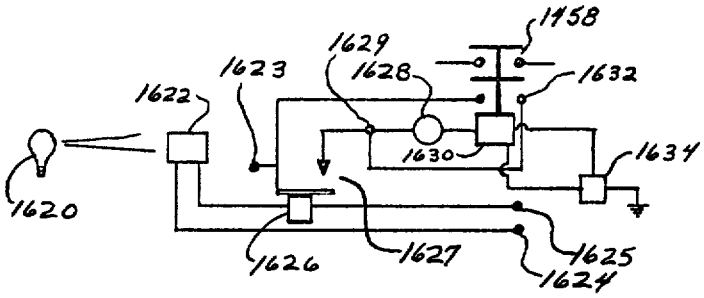
FIG_42-A

AUTOMATIC BOWLING SCORE COMPUTING AND DISPLAY DEVICE

Matter enclosed in heavy brackets [ ] appears in the original patent but forms no part of this reissue specification; matter printed in italics indicates the additions made by reissue.

This application is a continuation of copending application Ser. No. 697,632, filed Nov. 20, 1957, entitled "Automatic Bowling Score Device", and now abandoned.

The present invention relates to scoring devices, and more particularly relates to devices for automatically computing and registering progressive scores in the game of bowling.

The mechanism for computing and registering the scores comprises an adding and printing mechanism capable of cooperation with any one of six score registers, and includes a single accumulating device for registering the sum of the individual scores. One such mechanism is provided for each alley, the term "alley" hereinafter denoting a single bowling lane.

Display is accomplished by a projecting device which is arranged to project the printed scores of two machines; therefore, one display device is provided for each pair of alleys.

Input to the machine is from scanning equipment at the pinsetting machine capable of registering the number of bowling pins, 0-10, down after each ball is bowled, or, in the absence of such equipment, the input is from a manually operated keyboard. Both types of input device will be described.

The game of bowling is scored according to the following rules: Each game consists of ten turns, or "frames" for each player. A player is allowed to bowl two balls to complete a frame although if all ten pins are knocked down by the first ball, the frame is completed and the player is credited with a "strike." If any pins are left standing after the first ball, the player bowls the second ball and if he knocks down all of the remaining pins he is credited with a "spare." The player's score in a frame is the number of pins knocked down plus a bonus if all of the pins are knocked down in a frame. The bonus for a strike is the total number of pins knocked down by the next two balls bowled in the succeeding frame or frames; thus a strike counts 10 plus the total number of pins knocked down by the next two balls bowled by that player. The bonus for a spare is the number of pins downed by the first ball bowled in the next frame; thus a spare counts 10 plus the number of pins downed by the first ball in the next frame. It will be seen, therefore, that it is sometimes, but not always, necessary to count the pins downed by the first ball of a frame. If a spare or strike is made in the tenth (last) frame, the player is allowed to bowl an extra one or two balls, respectively, to complete his score.

It is the present practice to write the score of each player on a prepared form which provides a space for a score for each of ten frames. The progressive score for a single player for the 10 frames is called a "line." The standard form also provides a space for recording a "mark" in connection with each frame. "Marks" in the broad sense include misses, fouls, splits, etc., as well as strikes or spares. The machine embodying this invention is adapted to record the marks, and to sum and print the scores for each player as the game progresses, in the same manner as is now done by a human scorekeeper.

It is therefore a principal object of the invention to provide an improved device for computing, recording and displaying bowling scores.

Other objects of the invention are:

To automatically, and without manual attention, perform such recording and displaying;

To perform such recording under control of a manually operated keyboard while displaying automatically;

To record and display bowling scores automatically under control of a pin-counting device;

To print bowling scores either automatically or under control of a manually operated keyboard;

To project such printed scores for visual display;

To record bowling scores, as set forth above, in a separate device for each bowling lane, or alley, while displaying the recorded scores for two alleys in a single display device which is positioned to be readily viewable by players at both of said alleys;

To record and display all of the standard "marks" of the game of bowling along with and in the manner set forth above for recording and displaying the scores of said game;

To store individual players' scores in separate score registers;

To sum the scores of a plurality of players in a single accumulator device or register;

To provide cooperative relationship between adding or printing mechanism or both and successive score registers;

To automatically and concurrently display bowling scores in two positions, a lower position for convenient viewing by the players and a higher position for convenient viewing by spectators;

To automatically and concurrently display progressive bowling scores for a plurality of players and to display, by a manually and/or automatically controlled indicator, an indication of the score associated with the current player;

To provide a keyboard for entering bowling scores and having two rows of keys for entering, respectively, the number of pins downed by the first ball of a frame and the number of pins downed by both balls of the frame;

To indicate on such a keyboard which row of keys is to be operated next and to prevent entry of a value into the wrong row where such wrong entry would result in an incorrect score;

To provide, associated with such a keyboard, a row of indicator lights to inform all of the interested viewers as to which of the keys has been depressed;

To delay the functional operation of such a keyboard and to provide means for correcting an incorrect entry prior to the expiration of the delay period;

To record progressive bowling scores for each of a plurality of players and to automatically compute and display individual game and team scores after each 10th bowling frame;

To provide a calculating mechanism in a device for recording and displaying bowling scores, wherein a cyclic operation of said device is initiated in response to manual or automatic entry of any of a predetermined signal, and wherein signals of a certain class cause operation of the calculating mechanism during said cyclic operation of the device;

To operate such calculating mechanism in response to entry of a signal representing the number of pins downed by the first ball of a frame only when it is necessary, for score accuracy, to record said number as a separate value;

To record mark counts automatically;

To provide for entry of handicap scores into such a machine;

To provide for automatic scoring of pace-setter values;

To print scores in removable racks;

To automatically count downed pins at the pit of a bowling alley and to automatically signal a scoring machine in accordance with such count;

To cross-connect pin-counting and scoring display machines that are normally associated with separate alleys, and to provide automatic control of such cross-connection;

To automatically sense the bowling of a ball;

To automatically sense the first-ball and second-ball fouls and to automatically distinguish therebetween;

To automatically control the operation of a scoring device in response to first-ball and second-ball fouls in accordance with normal scoring rules;

To print first-ball and second-ball score indicia on separate portions of a recording surface;

To indicate and/or record the cumulative score for each frame throughout a game;

To indicate and/or record bonus marks and/or pinfall and cumulative score for each frame throughout the progress of the game;

To indicate, print and/or record bonus marks, and/or pinfall and cumulative scores for each frame throughout the progress of a game; and To compute and indicate, and/or print and/or record bonus marks and/or pinfall and cumulative scores for each frame throughout the progress of a game.

Figure 3:
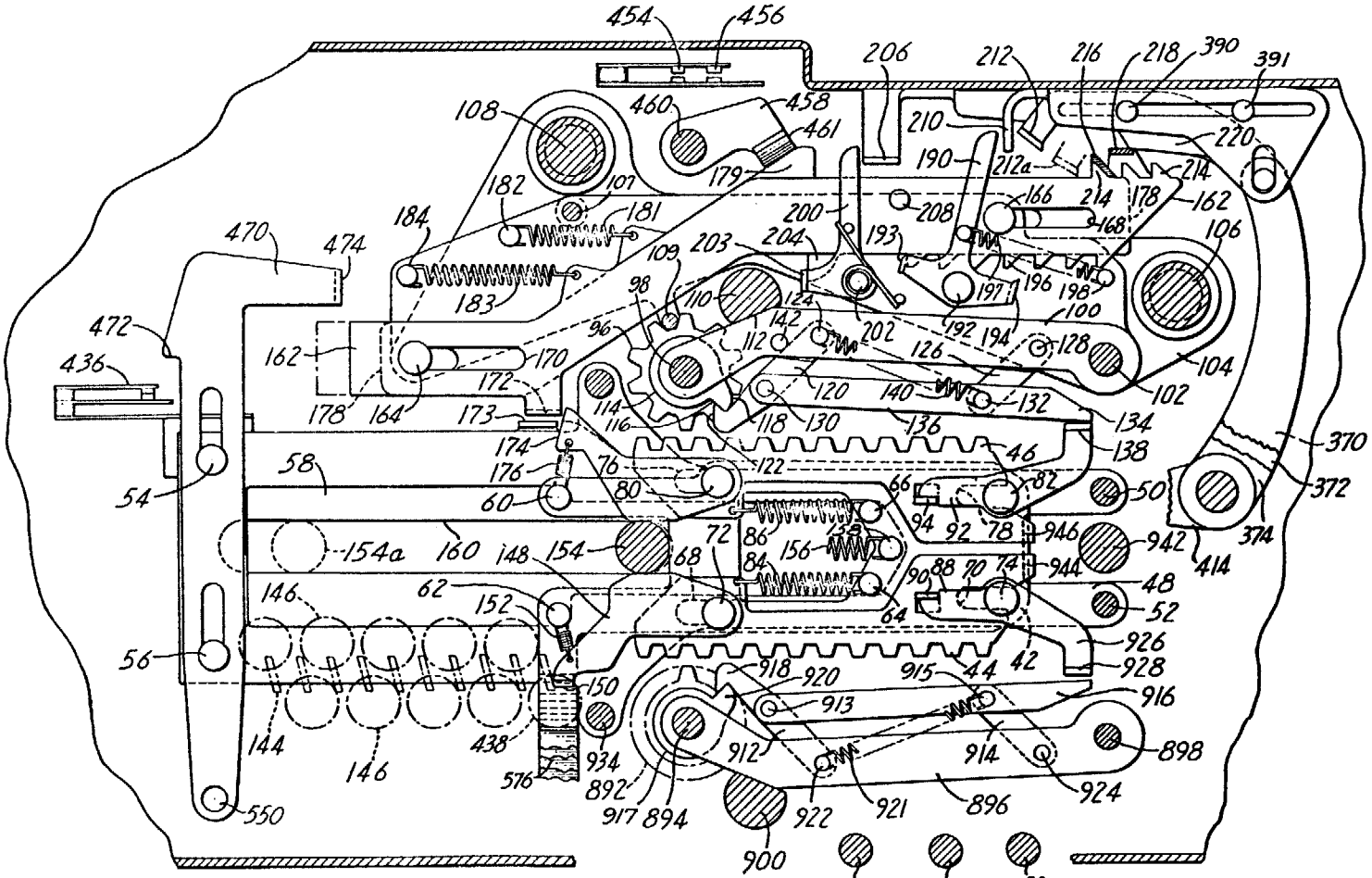

FIG. 3 is a right side view of the machine illustrating the "memory" elements thereof, but does not include all controls; it does, however, include the members required for sensing the status of a particular bowler's game which in turn cause the control members to cycle the machine properly. This figure includes the solenoid coils required for entry of the score into the actuator unit, means for adding the score into the proper player's accumulator gears, means for adding the score into the totalizer accumulator gears for team play, the tens-carry mechanisms for both sets of gears, the individual player's game "history" at any time, and means for sensing such "history," other than 10th-frame sensing for properly controlling the cycling of the machine during the game.

Figure 3A:
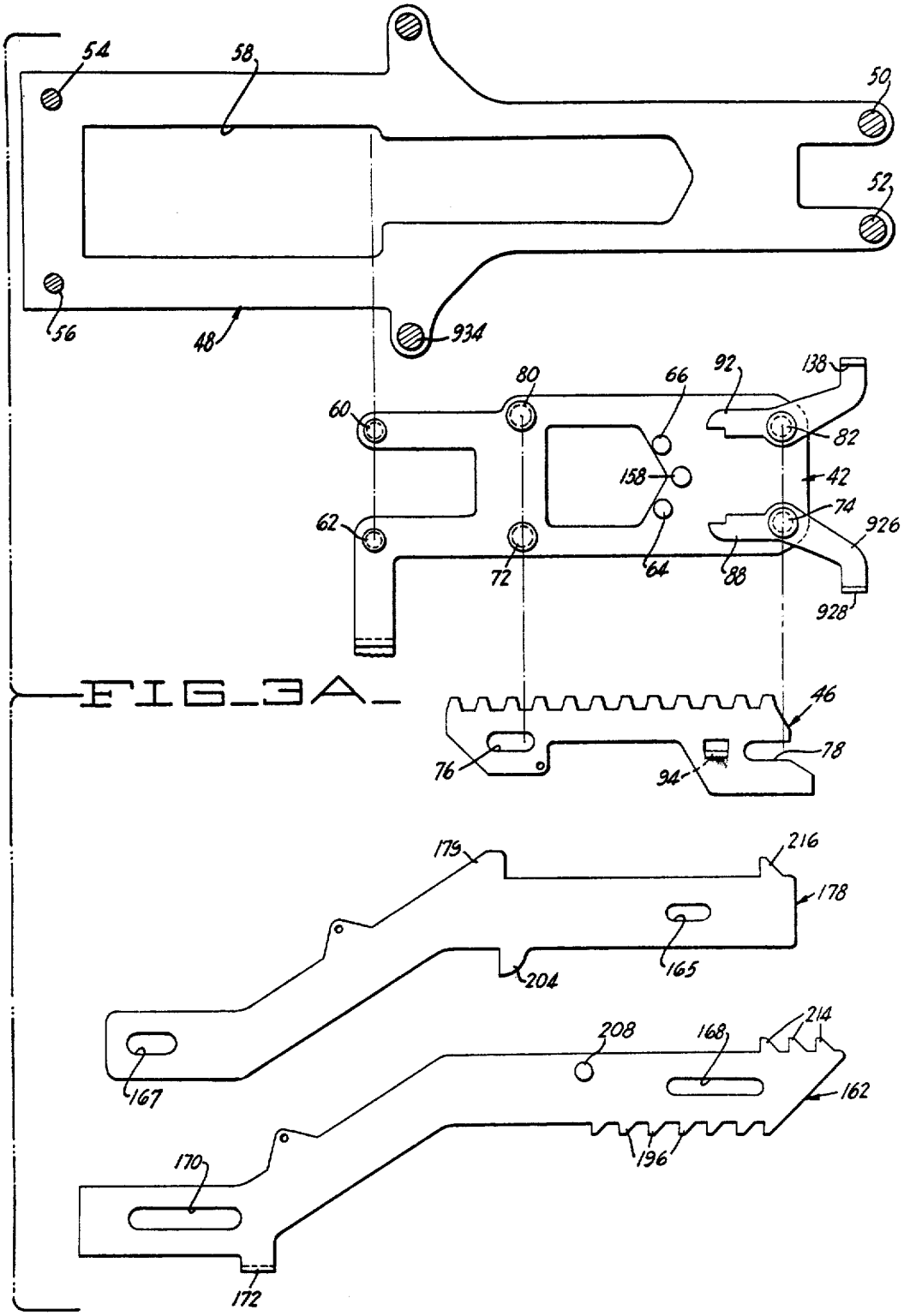

FIG. 3A illustrates the shapes of the frame, and certain unit parts shown on FIG. 3, for purposes of clarity in following FIG. 3.

Figure 4:
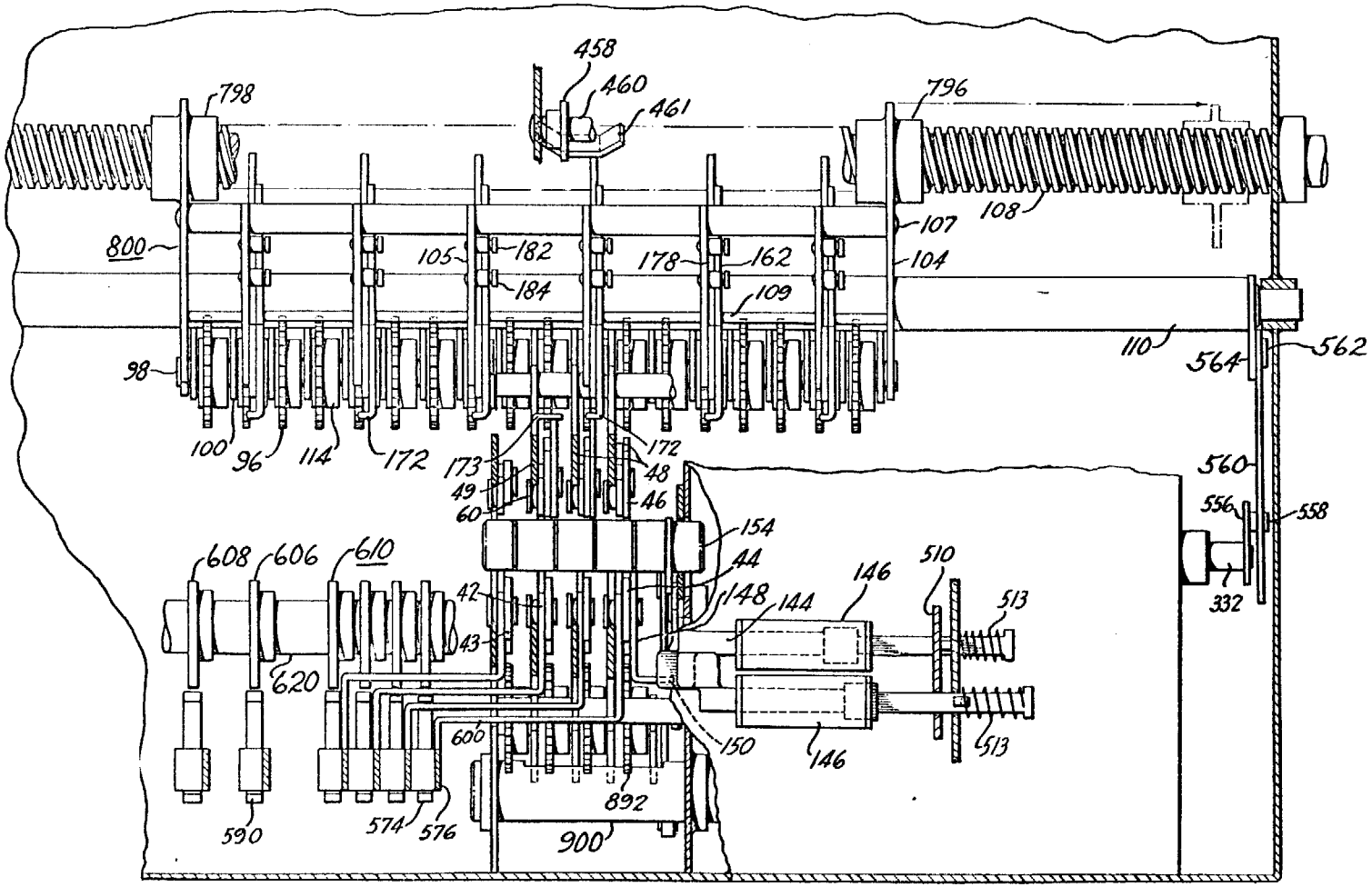

FIG. 4 is a front view of the carriage, the actuator, certain connections with a portion of the printing mechanism, and the screw means for laterally shifting the carriage, and shows the six sets of player's score gears and a portion of the "count first ball" sensing mechanism.

Figure 5:
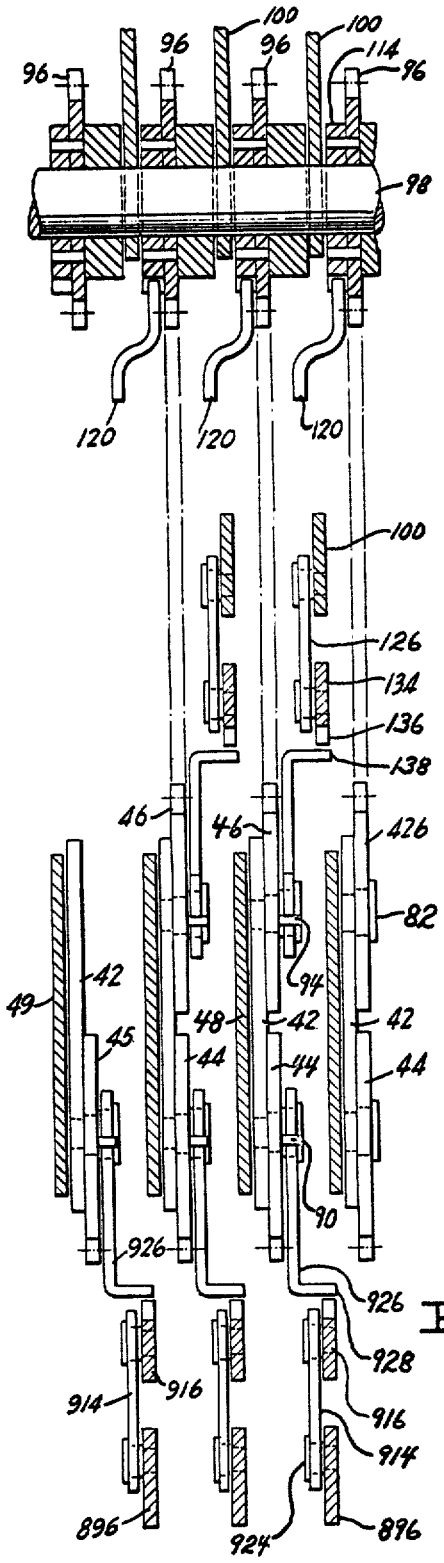

FIG. 5 is a more detailed front view of the actuator, and shows the relation of actuator parts with carriage parts as well as the lateral relationship of the tens-carry mechanism and the lateral relationship of the racks.

Figure 5A:
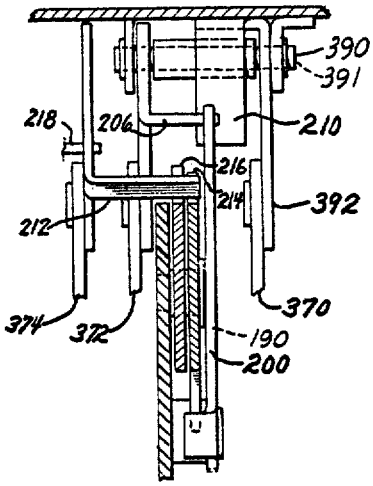

FIG. 5A is a detailed front view of a portion of the machine illustrating the lateral relationship of the members which sense the "history" of the individual bowler's game, together with the members which set this information into the carriage.

Figure 6:
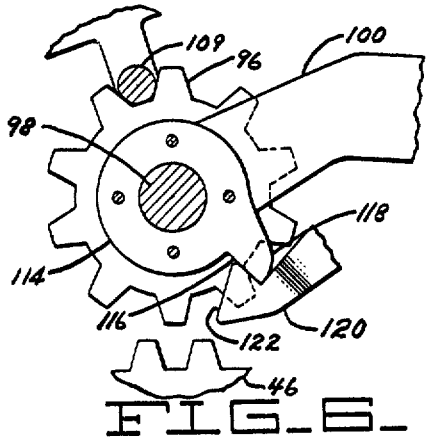

FIG. 6 is a detailed right side view of the zero stop member and the tens-carry camming surface of the zero stop member, together with the fixed rod which holds the line gears in a stationary position when these gears are out of mesh with the racks of the actuator.

Figure 7:
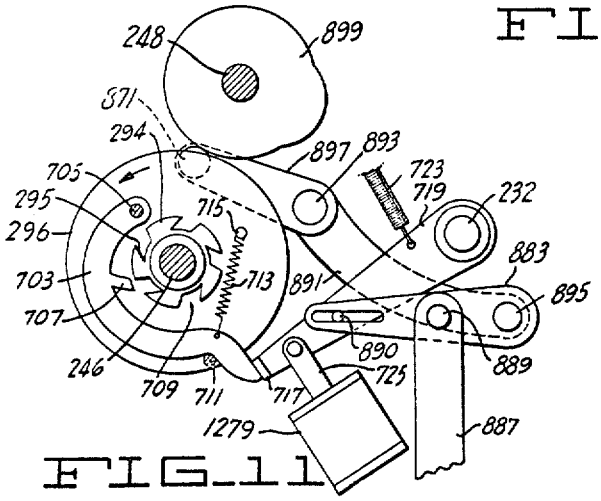

FIG. 7 is a detailed right side view of the mechanism which positions the tens stop in response to strikes and spares, together with a portion of the control mechanism which positions this member.

Figures 8, 15, 16:
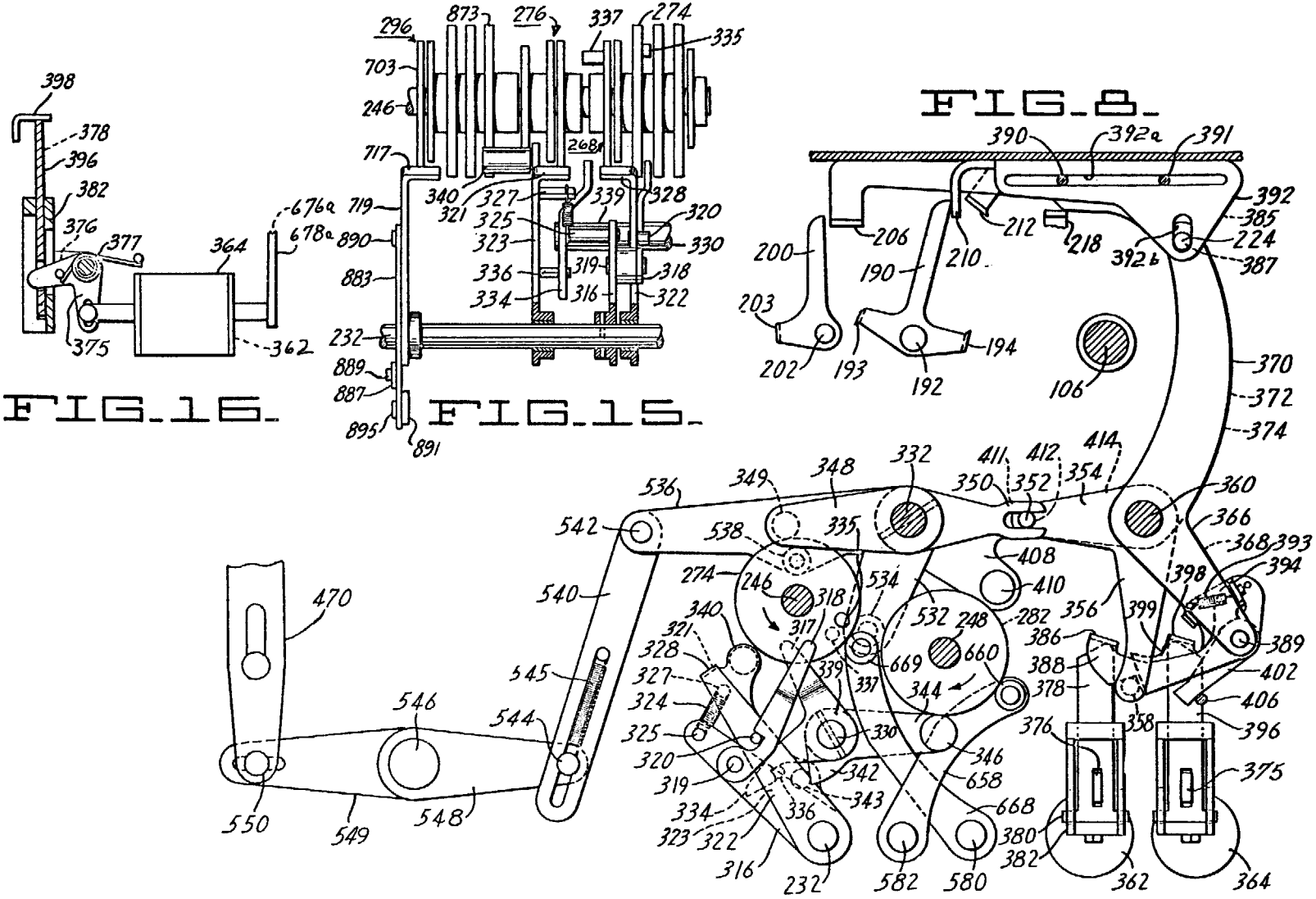

FIG. 8 is a right side view of a portion of the machine illustrating more of the positioning control mechanism shown in FIG. 7, together with the "count first ball" member and the sensing member associated with both add-print and sensing cycles, and the cams and mechanism required to perform these three functions. Also shown are: the strike and the spare solenoid coils which determine whether only one or both of the tens stop positioning mechanism and the "count first ball" mechanism shall be operated during a sensing cycle. This figure also shows means for initiating a sensing cycle after the time delay period, and means for initiating one or more add-print cycles following this sensing cycle, provided the time-delay solenoid (not shown in this figure) is still operated at the close of the sensing cycle.

Figure 9:
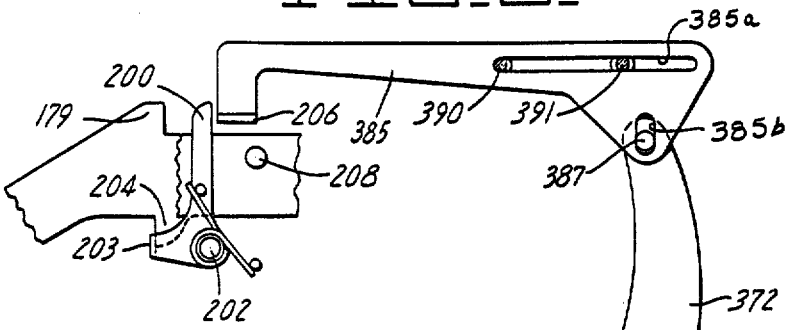
Figure 9:
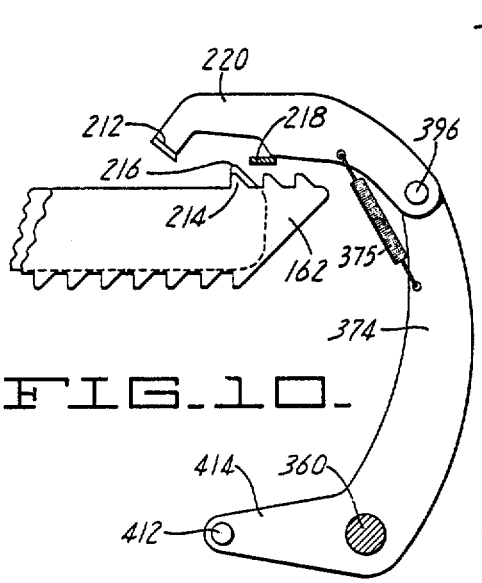

FIG. 9 is a right side view of a portion of the machine illustrating in detail the members associated with the "count first ball" mechanism also shown in FIG. 8, but separated here from the other mechanisms for purposes of clarity.

Figure 10:
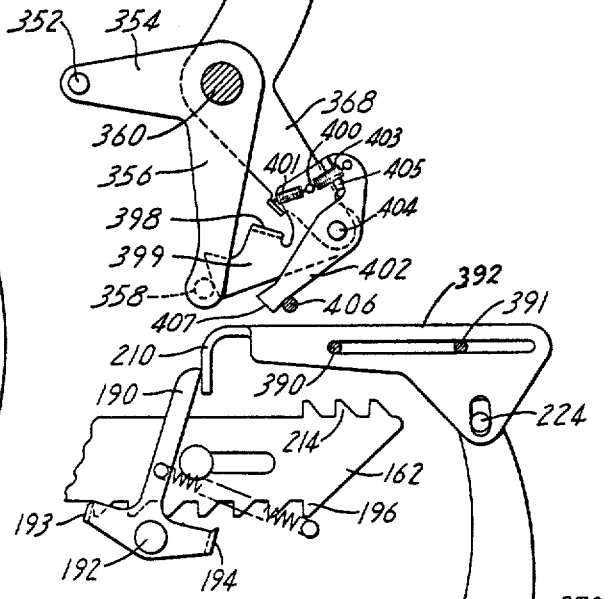

FIG. 10 is detailed right side view of the repositioning mechanism for both the tens-count member and the "count first ball" member.

Figure 11:
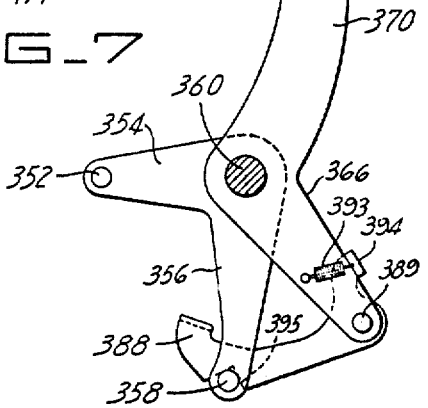

FIG. 11 is a detailed right side view of the tenth frame clutch and the associated control members.

FIG. 12 is a detailed right side view of the mechanism for yieldably reciprocating the racks of the actuator, together with mechanism for controlling the racks either to be stopped by their respective stop members (during the add phase of the add-print cycle) or to move freely until stopped by the zero stop of the line gears (during the print phase of the add-print cycle). This figure also shows the gear and the gear segment for recocking of the correction and handicap entry mechanism.

Figures 13, 14:
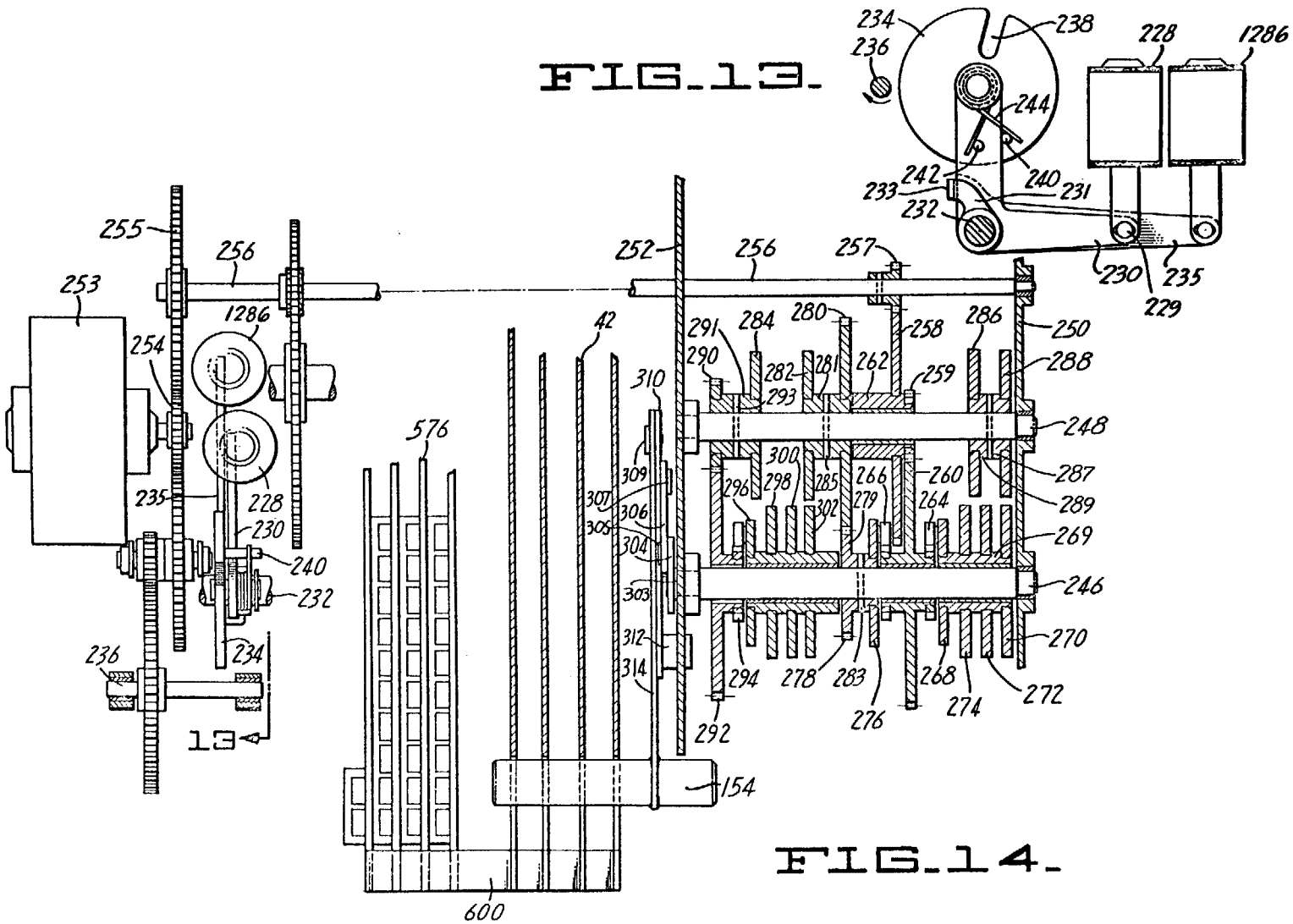

FIG. 13 is a detailed right side view of the time-delay mechanism, which prevents an entry from being used in the machine until a specified time has elapsed after the player has entered his number of pins downed. The solenoid coil actuating this mechanism is shown in addition to a separate solenoid coil which is adapted to cause the machine to begin operation immediately, without a time delay.

FIG. 14 is a top view of a portion of the machine illustrating the lateral relationship of cams, gears and clutches on the sensing-cycle shaft and the add-print-cycle shaft. Also shown are the set of cams and the clutch for the 10th-frame cycle and the time-delay mechanism shown in FIG. 13, together with the motor and the gear reduction trains necessary to reduce the rotational speed of drive of all the mechanism in the machine, as well as the lateral relationship of the actuator racks and the printing slides.

FIG. 15 is a detailed front view of that portion of mechanism shown in FIG. 8 which causes the initiation of a sensing cycle after the time delay period has elapsed, and shows the tenth-frame clutch-control member, together with a fragment of the other mechanism shown in FIG. 11.

FIG. 16 is a rear view of a portion of the mechanism shown in FIG. 8 and shows the solenoid coils, bellcranks, and sliders that determine whether one or both the tens-count member and the "count first ball" member are operated.

Figure 2:
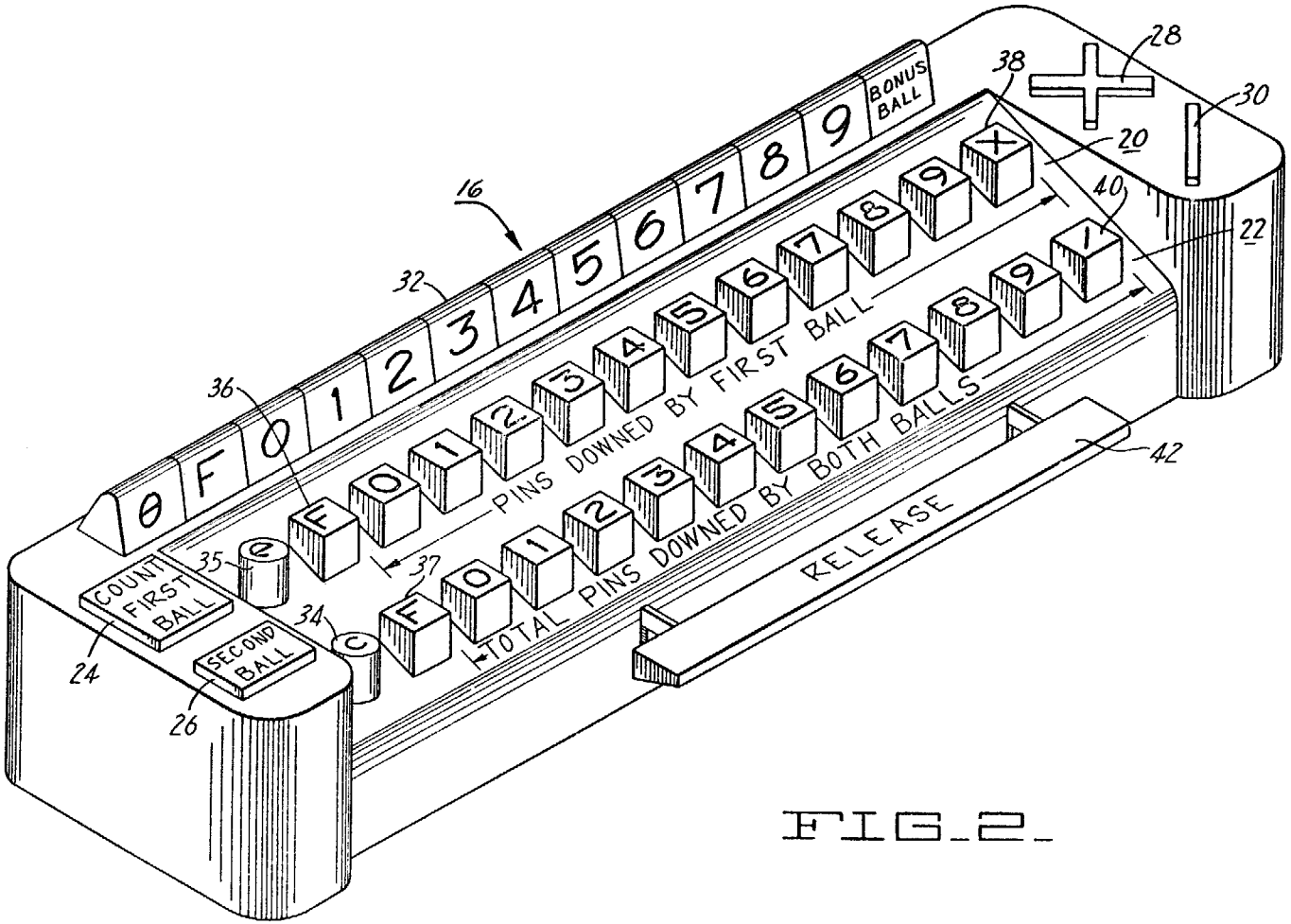
FIG. 2 is a perspective view of the keyboard furnished for one unit of the two units included in a complete machine.
Figure 17:
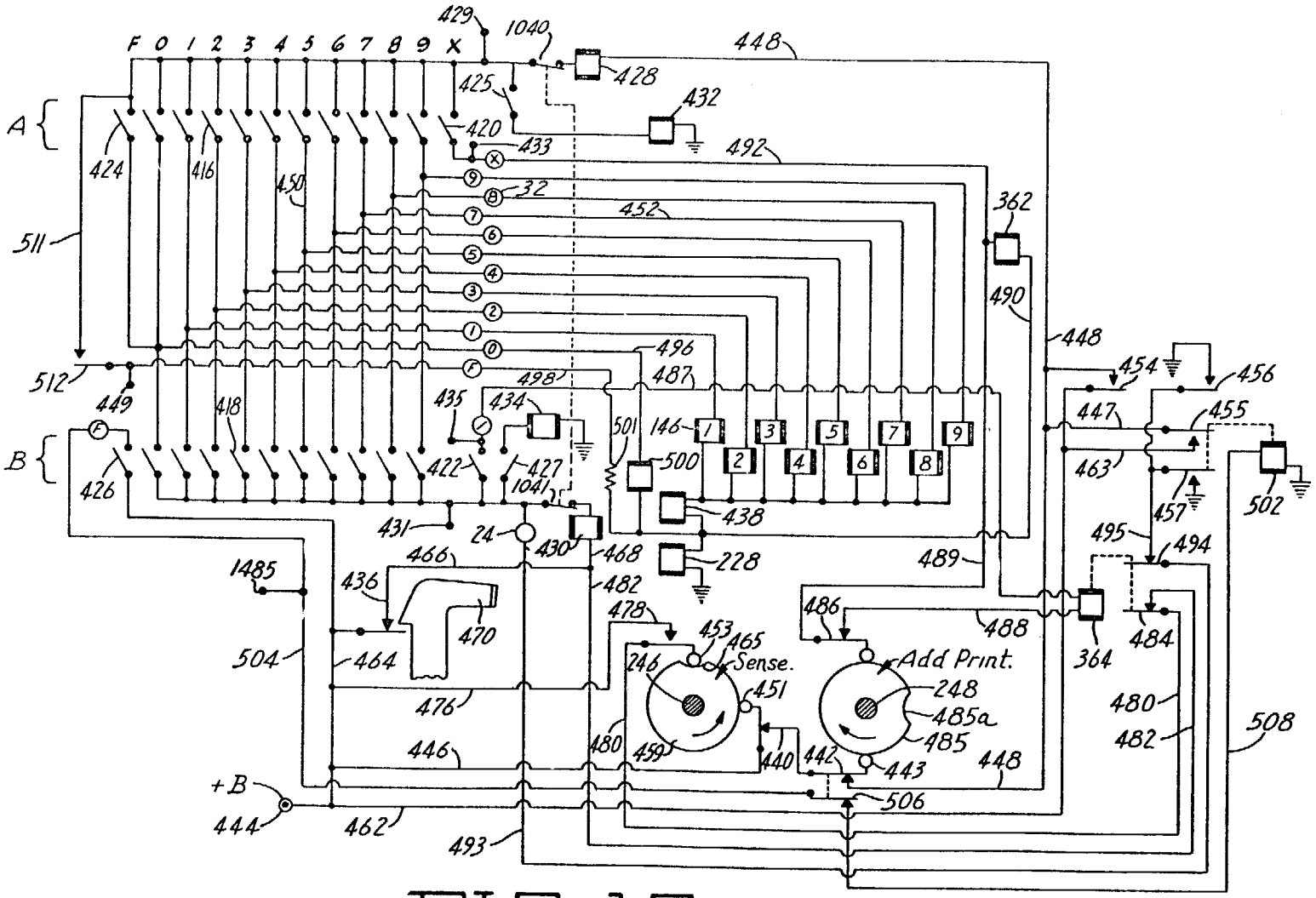

FIG. 17 is a schematic wiring diagram of all circuits necessary to operate the machine from a keyboard as illustrated in FIG. 2, with the exception of the circuit necessary for shifting the carriage under the control of a knob at the keyboard.

Figure 18:
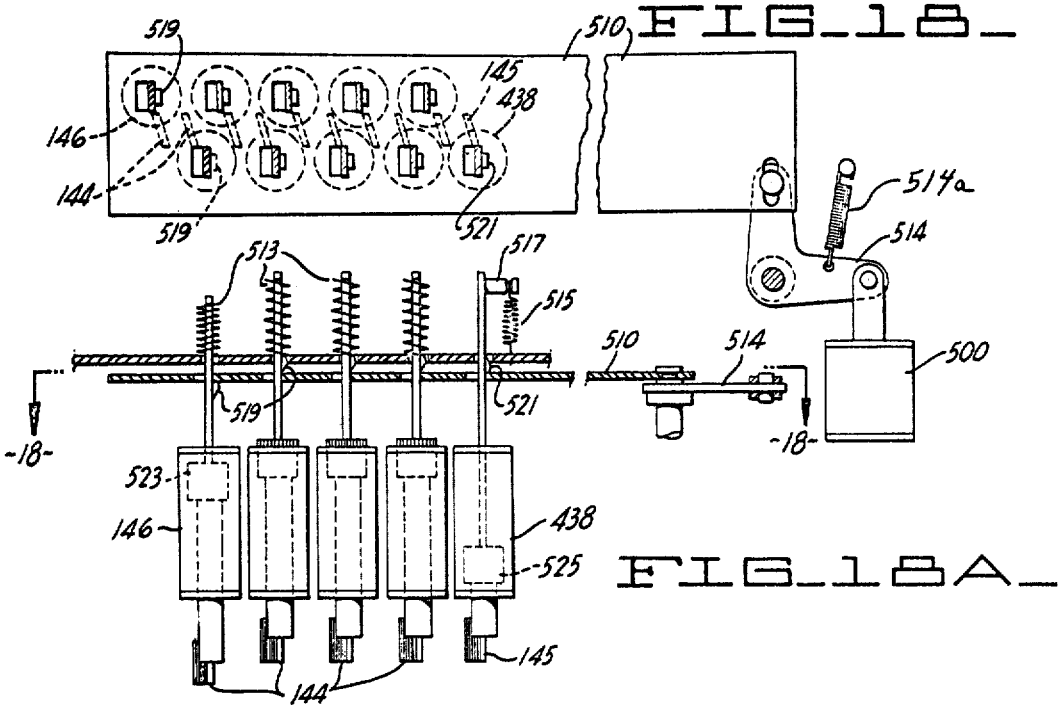

FIG. 18 is a right side view of the common slider latch which causes any unit stop to remain ejected until a different key of the keyboard shown in FIG. 2 is depressed, together with the solenoid coil and bellcrank necessary to unlatch such an ejected stop under certain conditions. (This mechanism serves to retain the information last entered, after the machine has finished cycling, in the case of a foul requiring that this same information be used again).

FIG. 18A is a bottom view of the mechanism shown in FIG. 18.

FIG. 19 is a right side view of the control mechanism for engagement of the individual player gears and the team totalizer gears with their respective racks at the appropriate times in the add-print cycle and the 10th frame cycle, and includes a solenoid coil to modify the 10th frame cycle under certain conditions.

FIG. 20 is a right side view of mechanism for recocking the tens-carry latches in the actuator, and includes the means for disabling this recocking during a certain phase of the 10th frame clutch cycle.

Figure 21:
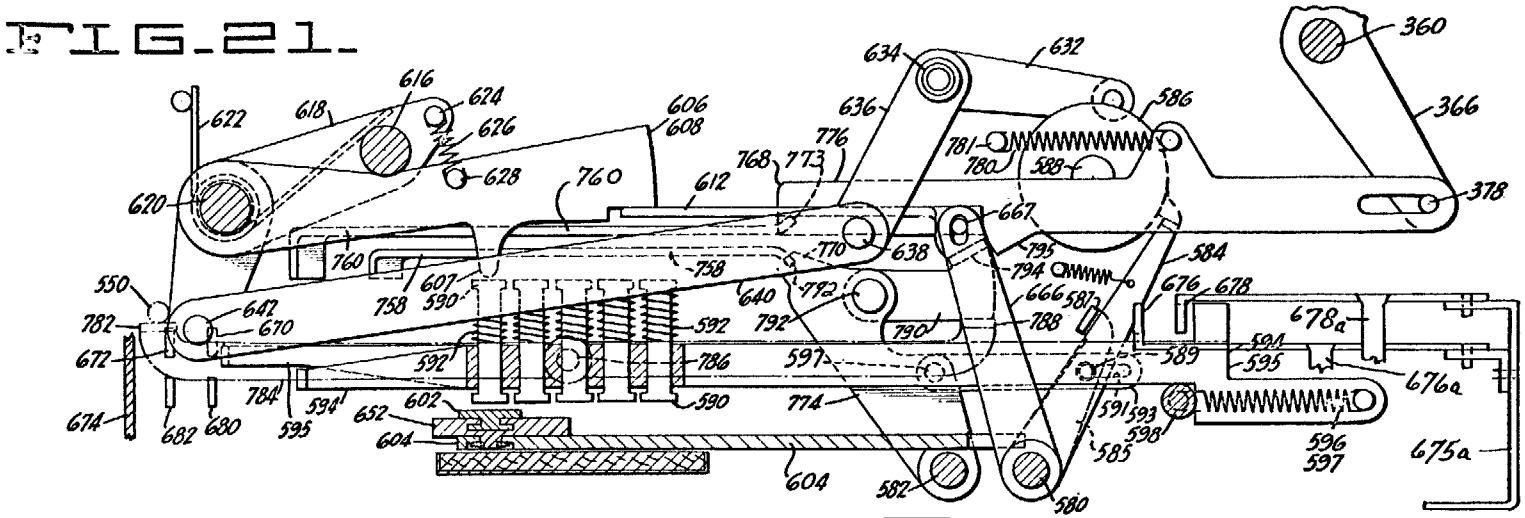

FIG. 21 is a right side view of the mechanism for printing marks to indicate whether a given frame was completed with a strike, spare, foul, split, or other condition, and includes mechanism for positioning the printing sliders correctly, for inking the type carried by these sliders, and for the print hammer operation with a portion of the print-hammer actuating clutch shown.

Figure 22:
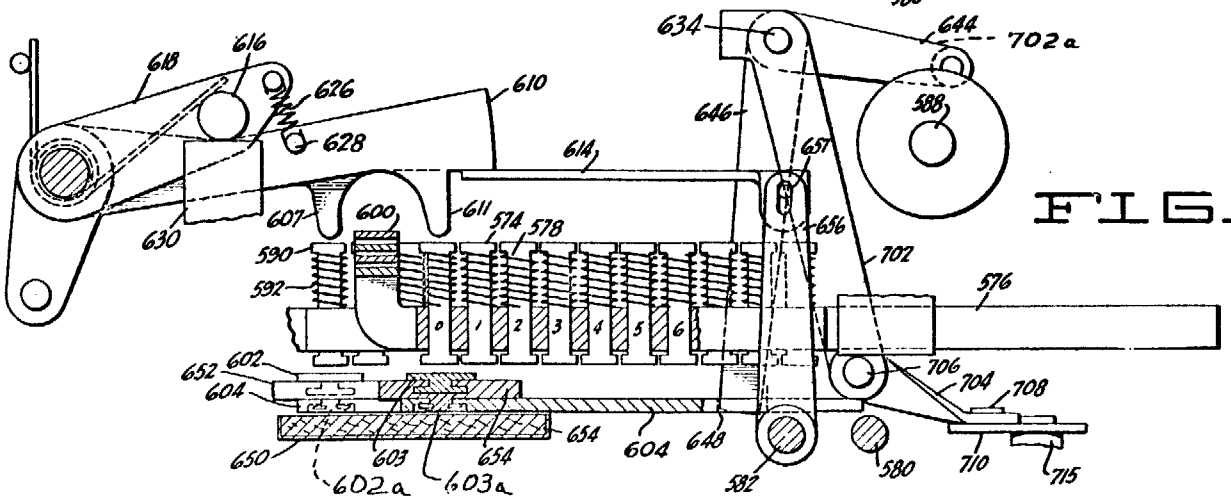

FIG. 22 is a right side view of the mechanism necessary for printing of the actual scores, both individual and team scores, on the individual score pieces. This figure shows a cross-section of the tie-ins with the actuator racks, the print-hammers (but not their actuating mechanism) and a portion of the mechanism for handling the individual score pieces for inking, and the ink pad, are included in the figure.

Figure 23:
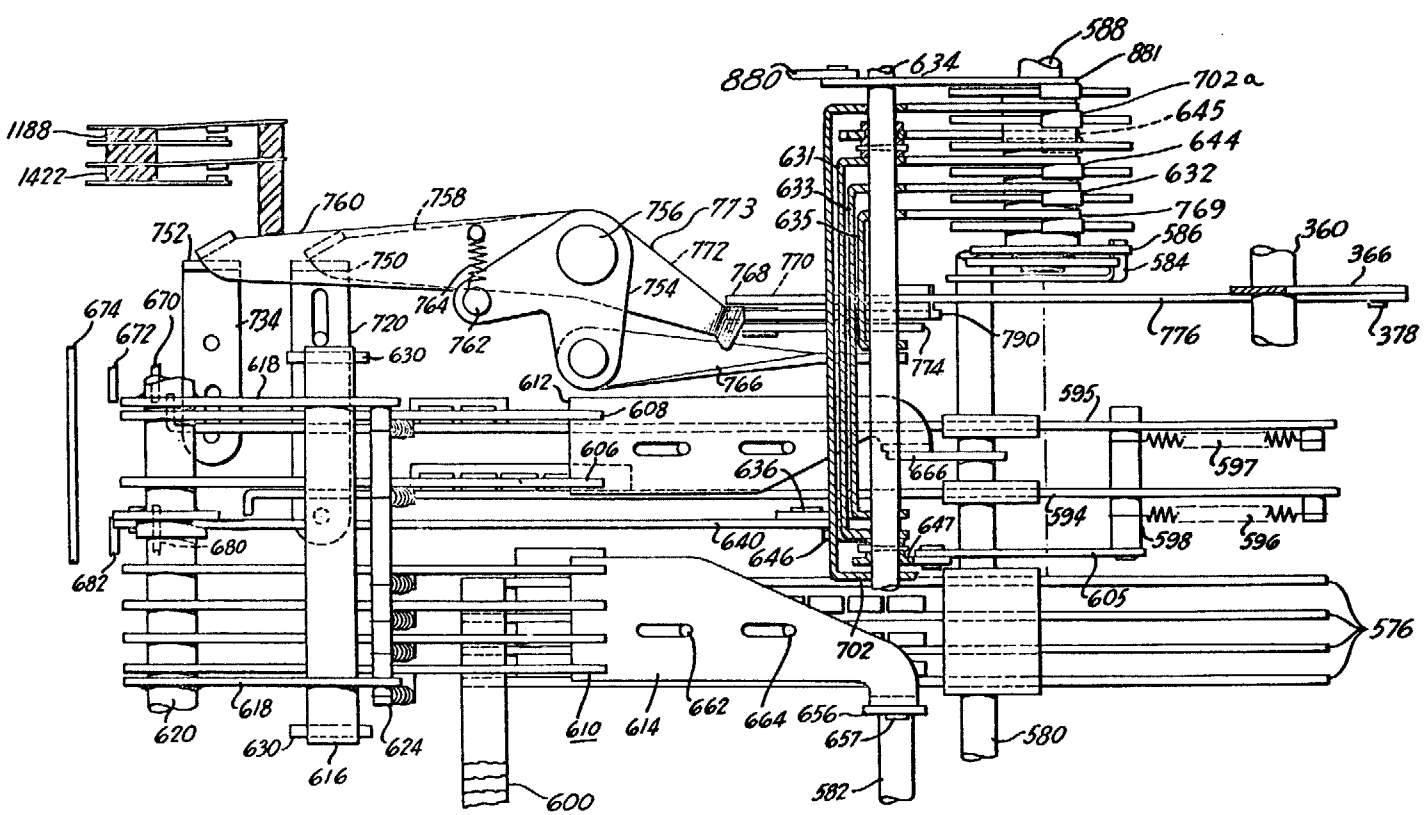

FIG. 23 is a top view of the mechanism shown in FIGS. 21 and 22, more clearly showing the control of the blocks for the print hammers, and showing a lateral view of the cams for operations of the print-hammer cycle.

Figure 24:
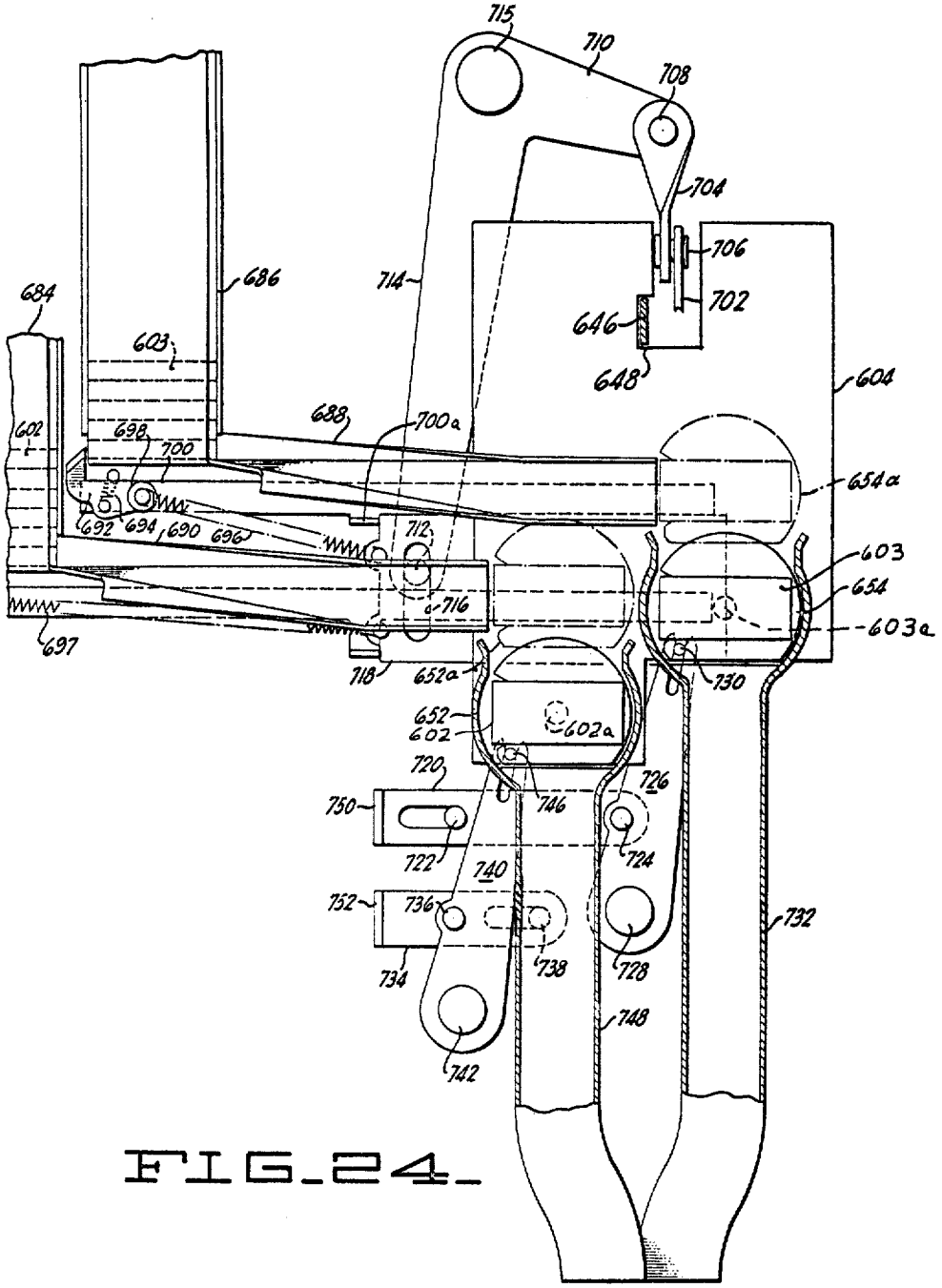

FIG. 24 is a top view of a portion of the mechanism shown in FIG. 23, and also shows the means for feeding individual pieces from the bottom of a stack of pieces in a hopper, and includes means for rotating these pieces into correct relation for dropping them into the rack for projection by the optical system. (Top view is in terms of reference properly oriented as related to the previous figures and considering the machine as horizontal. In use the machine is in vertical position and will be described as related to the cabinet.)

Figure 25:
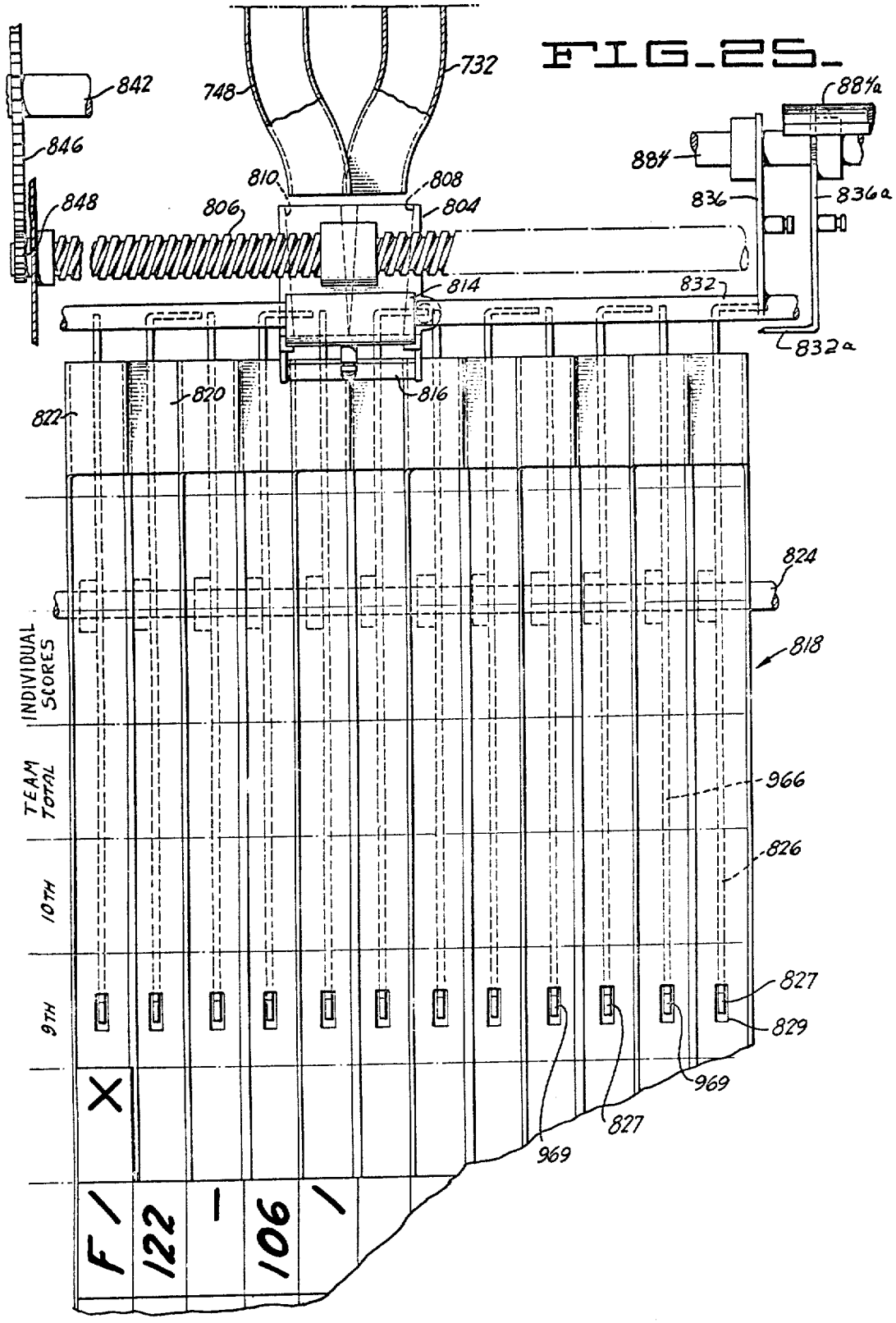

FIG. 25 is a top view of the lower portion of the chutes shown in FIG. 24, and the display rack into which the pieces drop for projection. This figure shows a portion of the mechanism for moving the carrier of the pieces into correct relationship with the display rack and includes the sensing levers which control the 10th frame clutch.

Figures 26, 27, 28, 29:
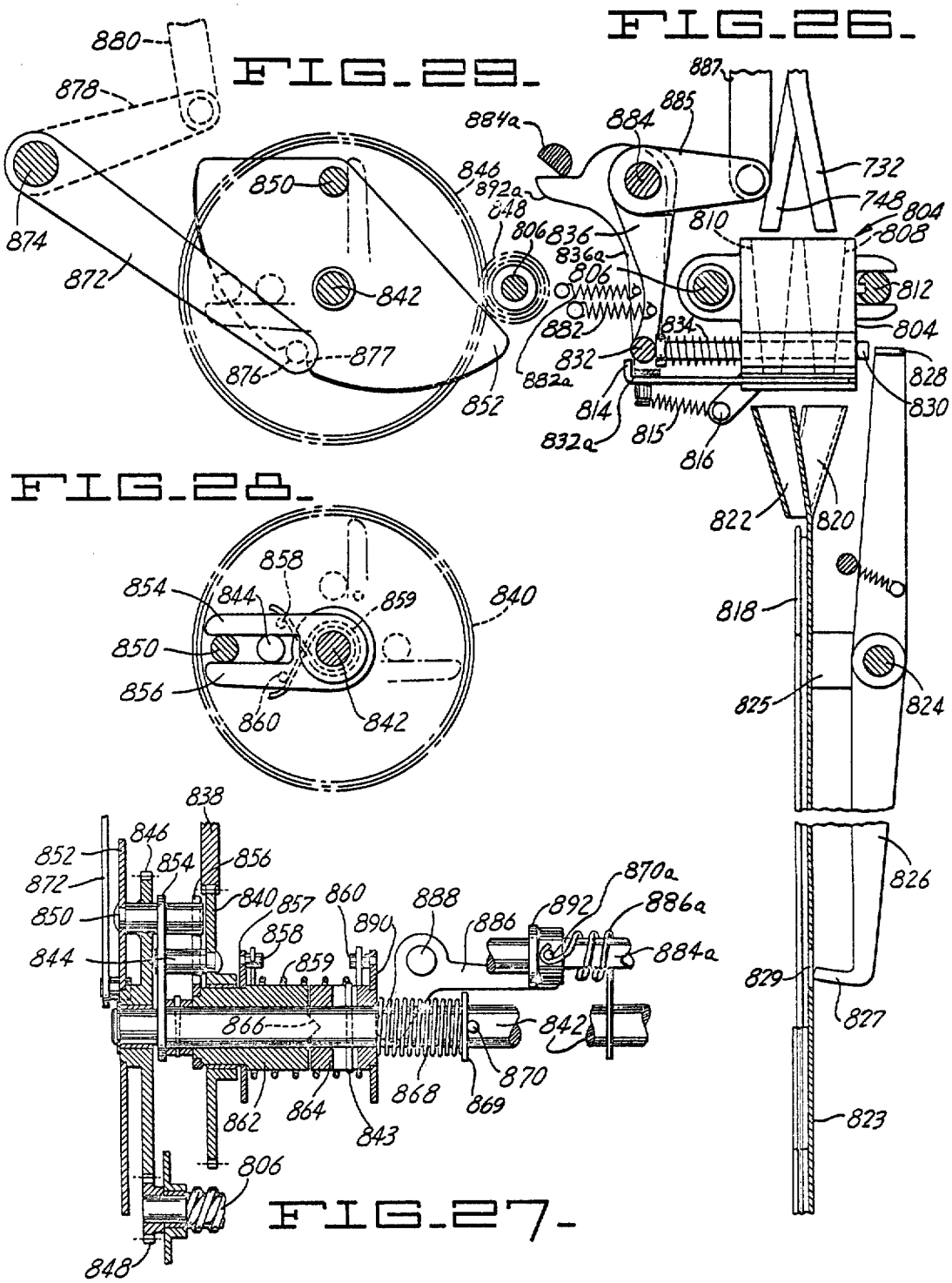

FIG. 26 is a right side view of the mechanism shown in FIG. 25 and includes the chutes, the carrier, means for operating the "valves" of the carrier, the sensing levers for initiating operation of the 10th frame clutch, and rack for holding the pieces for projection. The shafts providing the sliding supports for the carrier are shown in cross-section in this figure.

FIG 27 is a top view showing a cross-section of the mechanism for moving the carrier into the position for receiving the pieces from the chutes, and subsequently moving the carrier into position for releasing the printed pieces in the correct player's line of the display rack. The figure also shows means for releasing the pieces when the carrier reaches the correct line position.

FIG. 28 is a left view of a portion of the mechanism shown in FIG. 27, for moving the carrier to the correct position and showing the centralizing mechanism.

FIG. 29 is a left view of a portion of the mechanism shown in FIG. 27, for moving the carrier to the correct position relative to the individual player.

Figure 30:
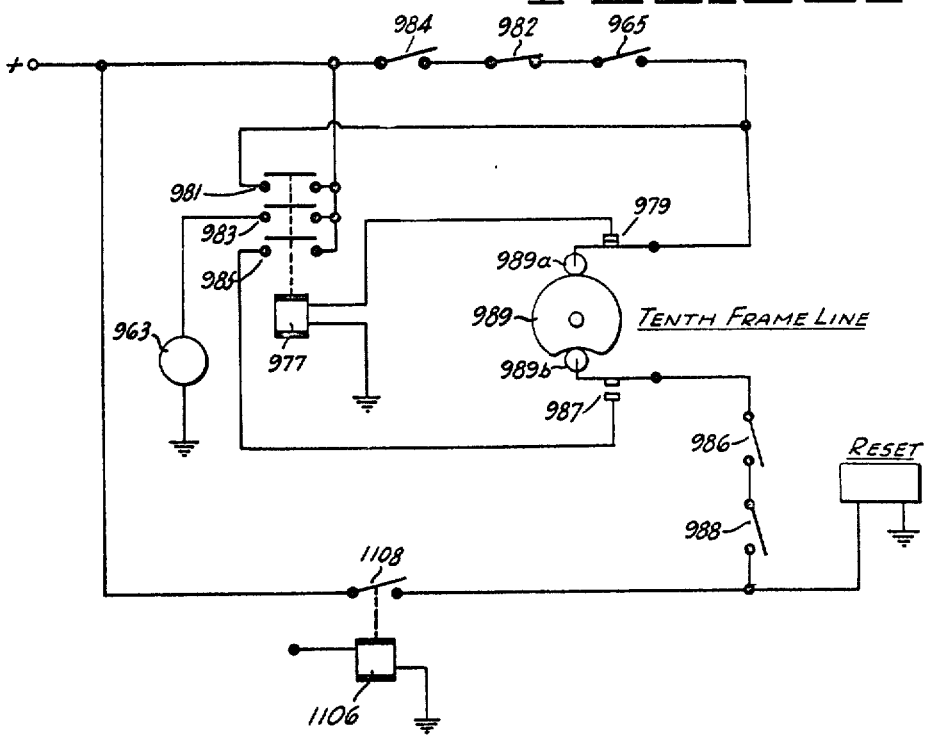

FIG. 30 is a schematic wiring diagram of circuits effective to indicate that a bonus ball is due a player in the tength frame, and to correctly cycle the machine and terminate the game after such bonus ball or balls are thrown, and including means for automatic control of a reset operation if automatic pinsetting equipment is used, or to give a signal to the pinboy if pins remain standing after completion of a game.

Figure 31:
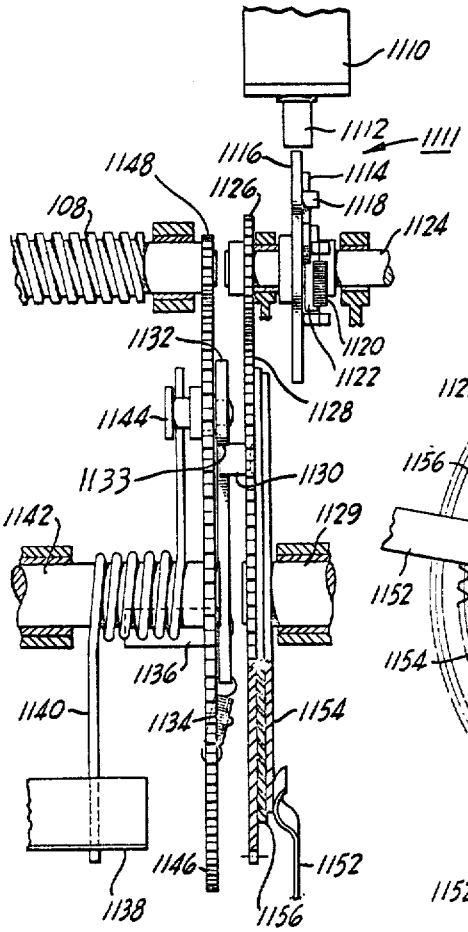

FIG. 31 is a bottom view of means for positioning the carriage of the machine under the remote control of a knob at the table, or other means. This figure includes the carriage position clutch, the carriage return latch system, with a portion of the carriage shifting screw and the solenoid control for the carriage position clutch.

Figure 31A:
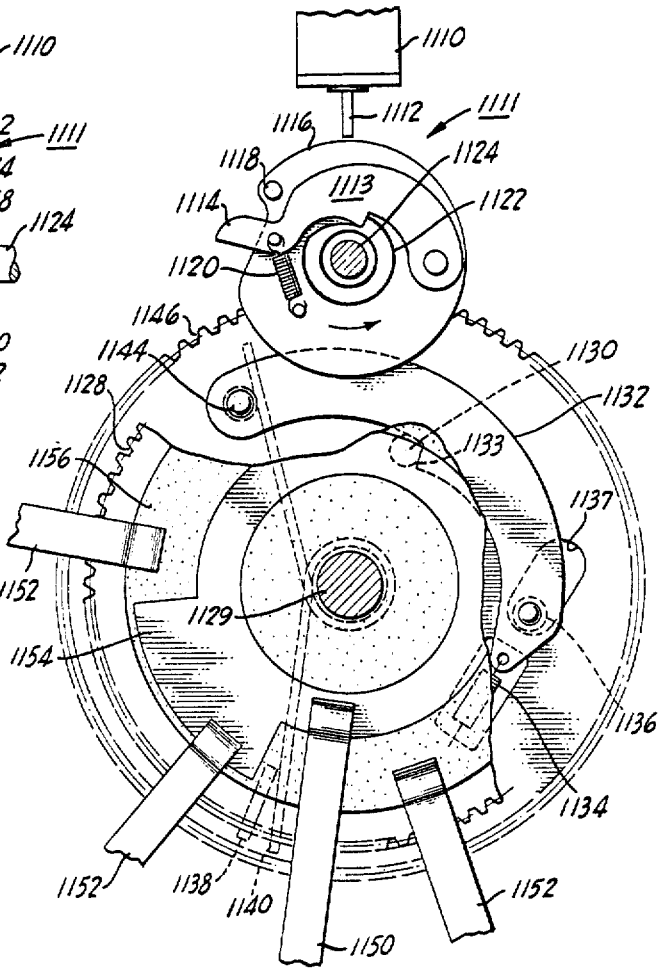

FIG. 31A is a left side view of the mechanism shown in FIG. 31, and more clearly shows the electrical contact system employed.

Figure 32:
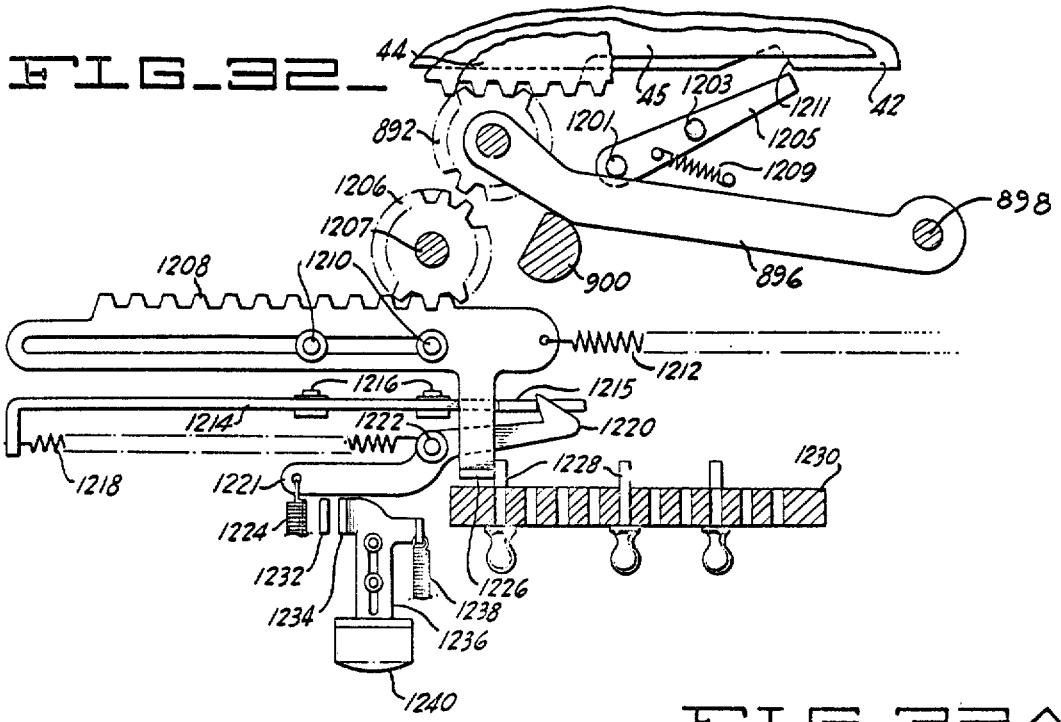

FIG. 32 is a right side view of the means of entering pace bowler scores, handicap scores, and corrections, into the accumulator gears.

Figure 32A:
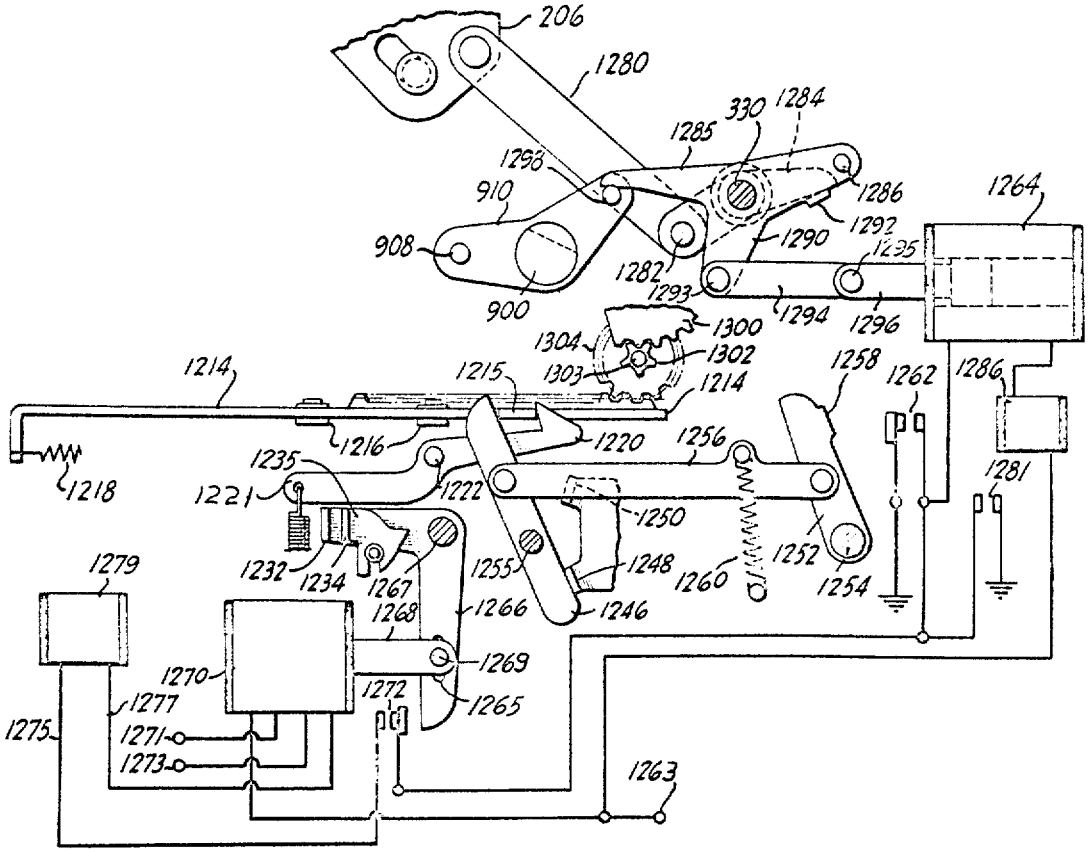

FIG. 32A is a right side view and schematic wiring diagram of the remaining portion of means for entering pace bowler scores, handicap scores, and corrections, and means for proper control and cycling during such entries.

Figure 32B:
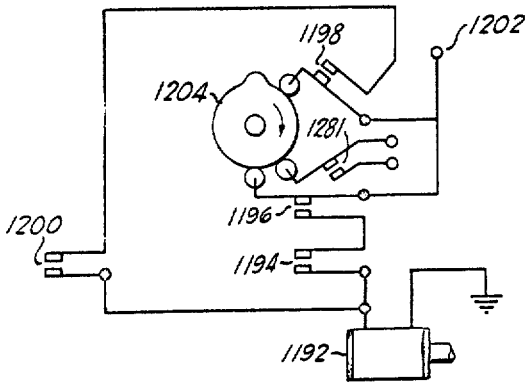

FIG. 32B is a schematic wiring diagram of the electrical circuits for control of pace bowler scores, including disabling of the normal accumulator engagement in the 10th frame.

Figure 33:
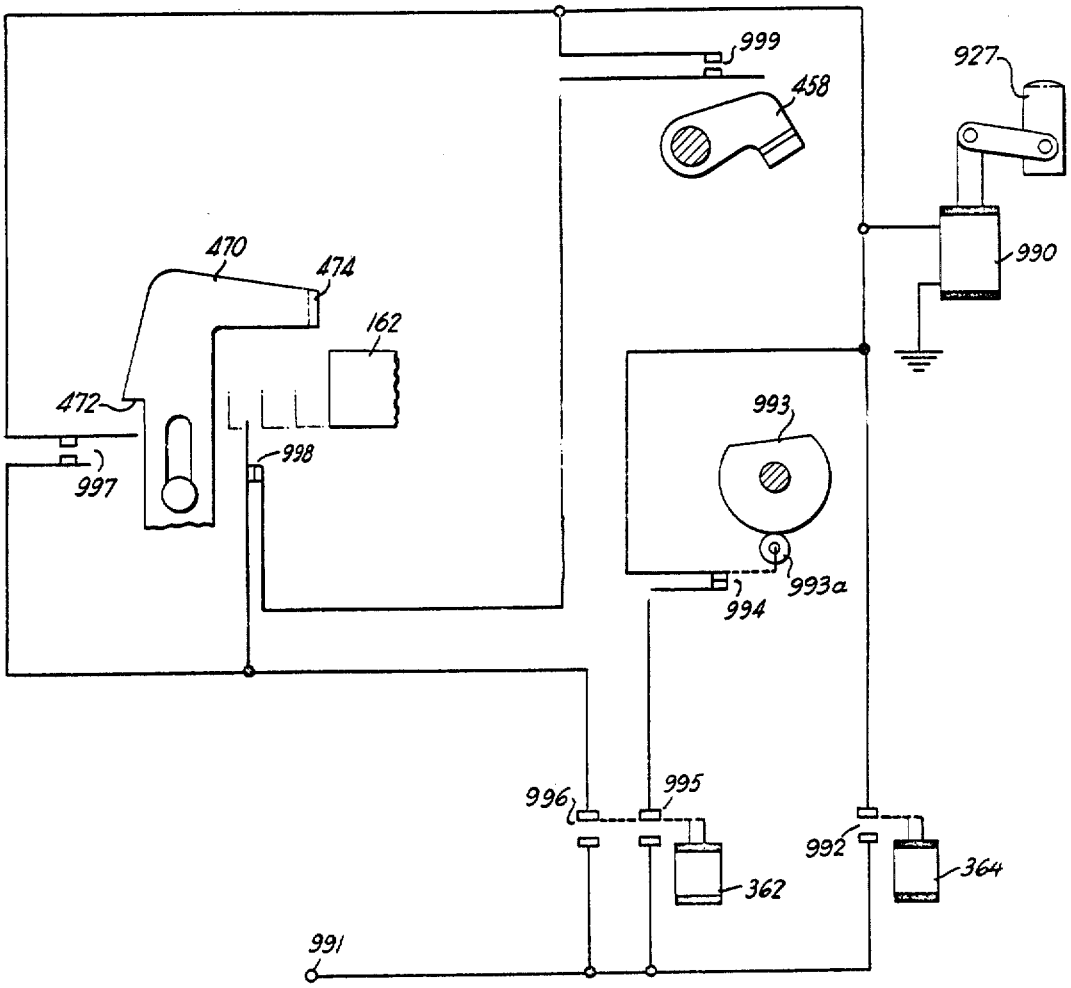

FIG. 33 is a schematic wiring diagram of circuits for the "mark count," which actuates a common type of mechanism counter.

Figure 34B:
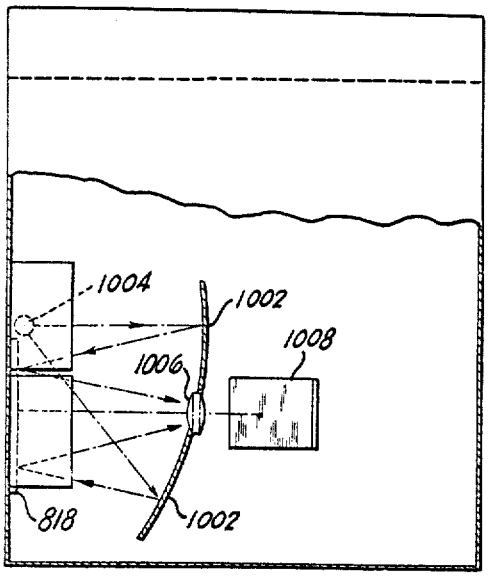
Figure 34:
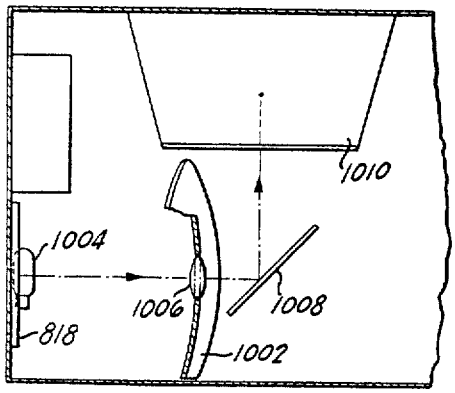

FIG. 34 is a rear view of the cabinet including two calculating units, the optical system used for projection of the image of the scores upon a screen at the front of the enclosure. This figure includes the projection lamp, the elliptically shaped concave mirror for properly distributing the light upon the rack, the lens, and the rectifying mirrors. (The machine is placed in the cabinet at the left side as viewed from the back with the top of the machine on the inside of the cabinet and the front pointing downward.)

Figure 34A:
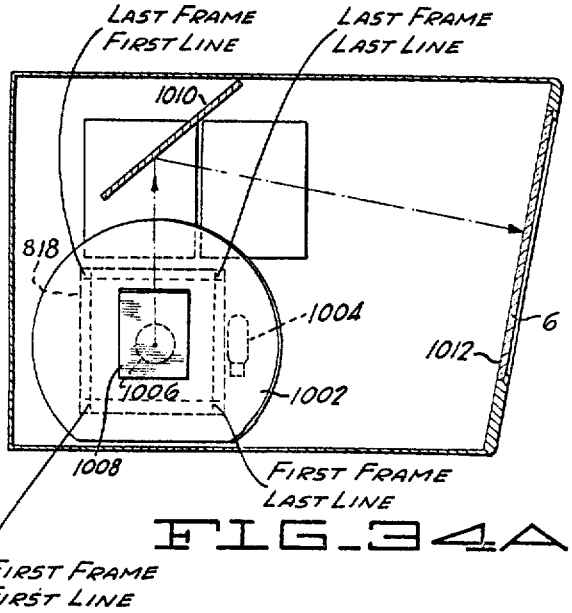

FIG. 34A is a right side view of the cabinet and the optical system shown in FIG. 34.

FIG. 34B is a top view of the cabinet and optical system shown in FIG. 34.

FIG. 35 is a back view showing a portion of the optical system shown in FIG. 34 but omits for clarity the mirrors necessary for rectification of the image on the front screen, but showing, however, are the mirrors (one of them half-silvered) necessary for projection of the image downward to the table.

FIG. 35A is a right side view of the optical system for projection downward to the table as shown in FIG. 35.

FIG. 35B is a top view of the optical system for projection downward to the table as shown in FIG. 35.

Figure 36:
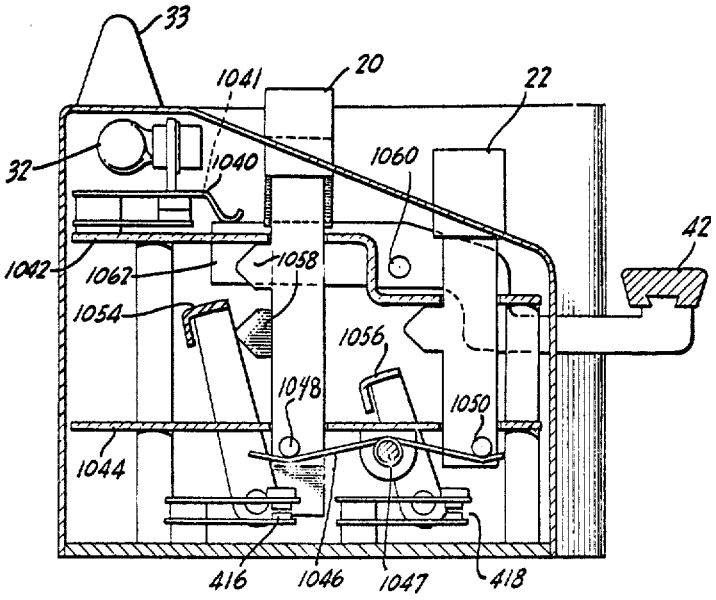

FIG. 36 is a left side cross-section of the keyboard. This figure shows the first and second row keys and their associated contacts, and the bails for latching these keys and the clearing bar operated in case of erroneous key depression.

Figure 36A:
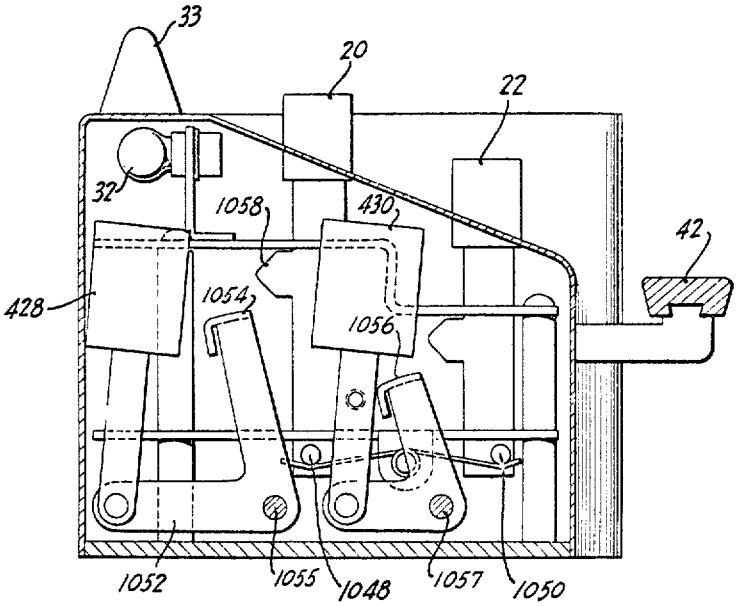

FIG. 36A is a left side view of the keyboard and shows the solenoid coils which operate the bails for latching the first and second row keys.

Figure 36B:
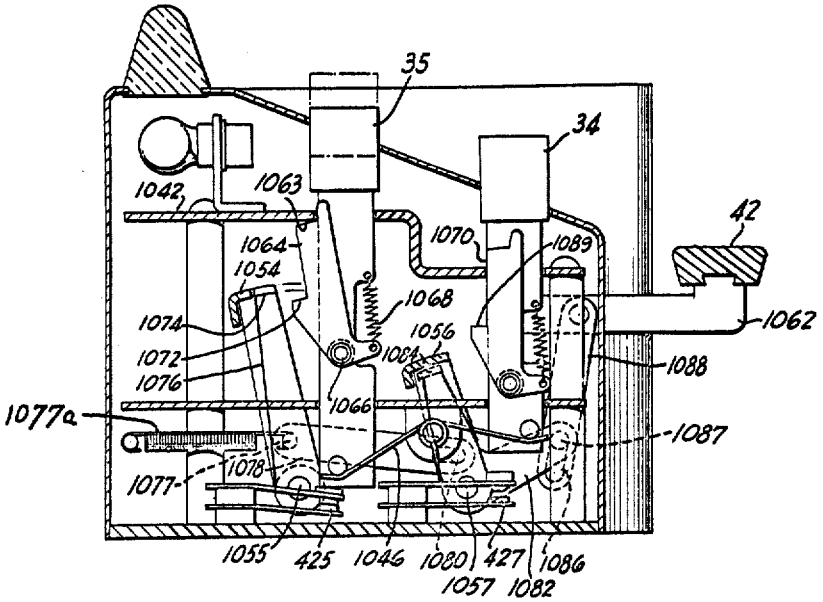

FIG. 36B is a left side cross-section of the keyboard taken at a plane which shows the "chop" and "split" keys and their associated mechanism.

Figure 36C:
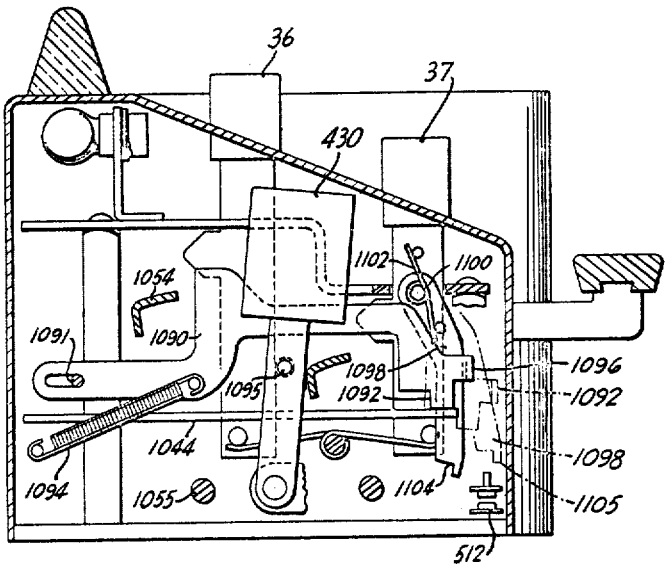

FIG. 36C is a left side cross-section of the keyboard taken at a plane which shows the mechanism associated with first and second row Foul keys.

FIG. 37 is a schematic wiring diagram of the means for positioning the carriage of a unit in accordance with the position of a selector switch knob at the table.

FIG. 37A is a schematic wiring diagram of the means for positioning the carriage of a unit automatically to the next player's position after completion of a given player's frame, and means for automatically returning to the first player's position when all players indicated by the setting of a knob for "number of players" have completed their respective frames.

Figure 38:
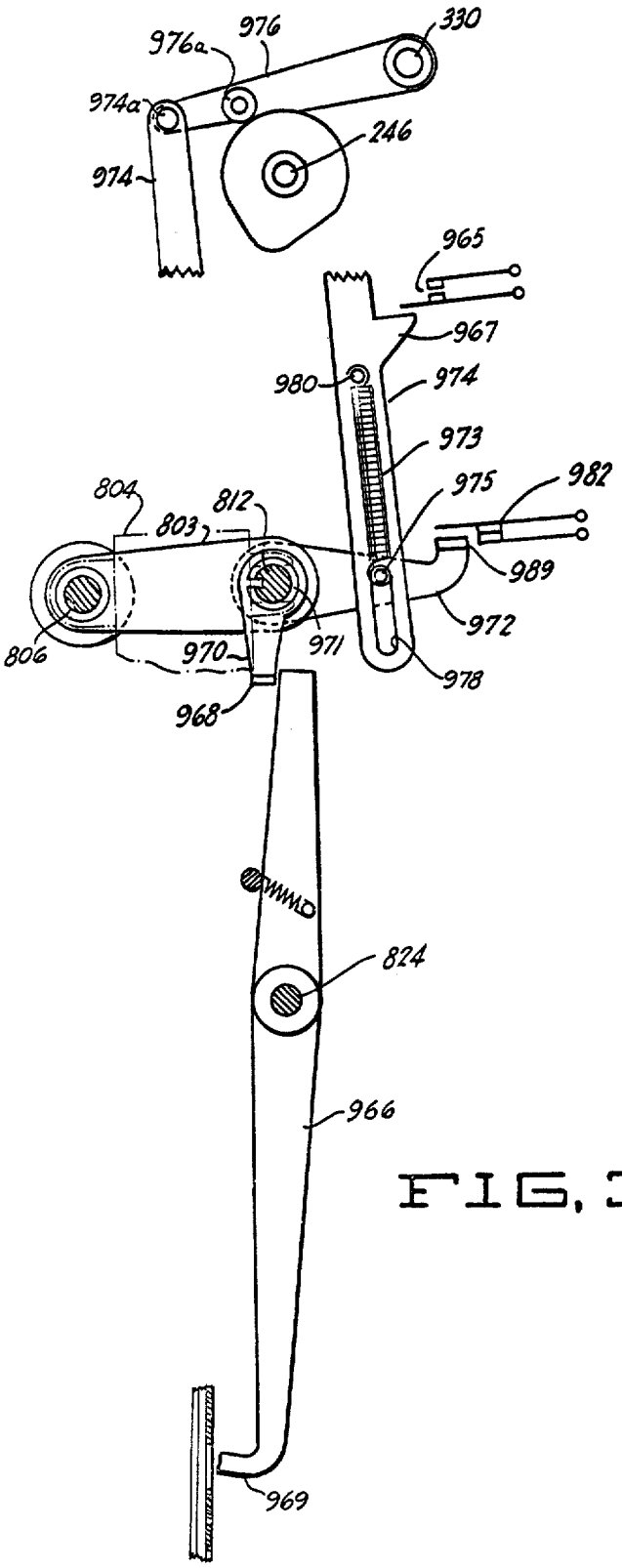

FIG. 38 is a right side view of the mechanism employed for sensing the presence of a mark piece in the ninth frame, as provided by the circuit illustrated in FIG. 30, for determination of whether or not a "bonus ball" is due a player.

Figure 39:
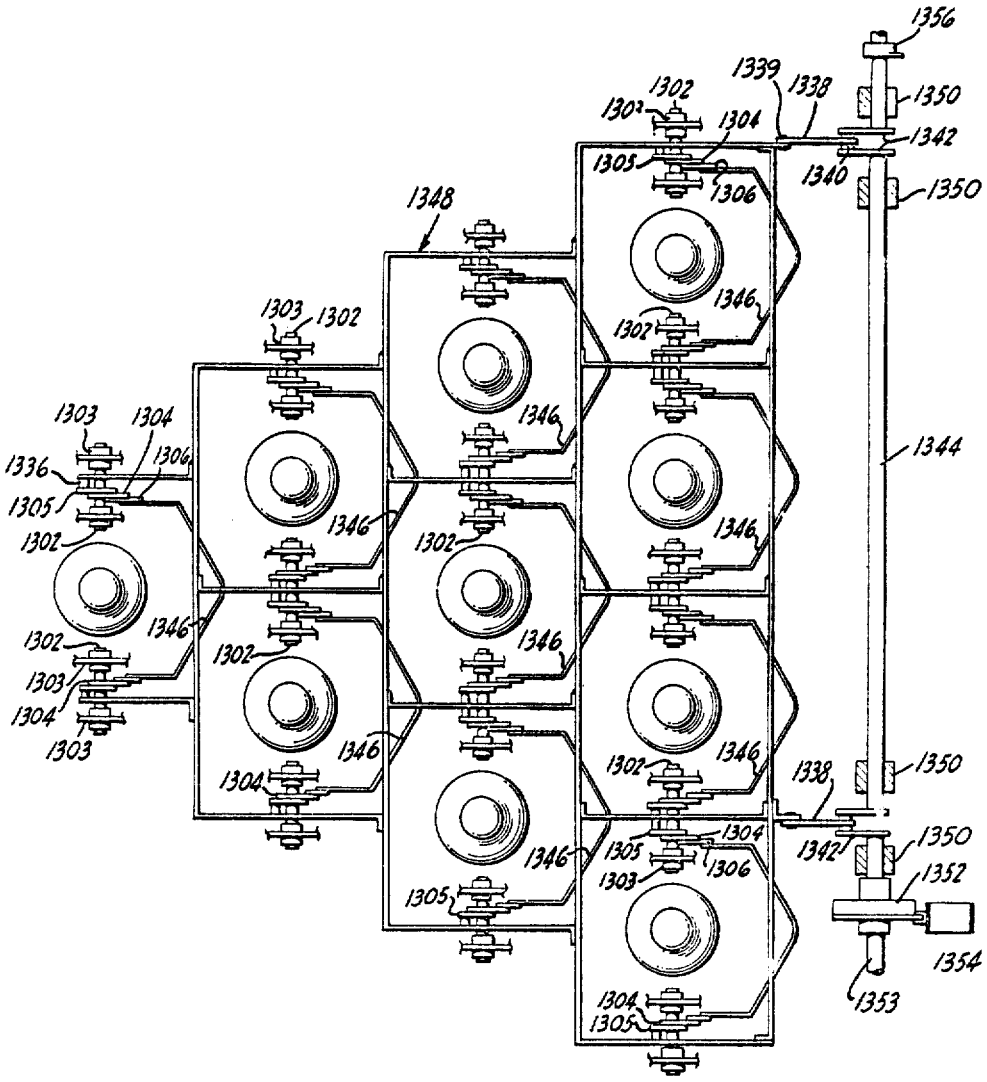

FIG. 39 is a top view of means for sensing mechanically the number of pins downed after a ball is thrown, and translating this information into the form of a number of closed switches and includes the shaft and clutch which cause this sensing operation.

FIG. 40 is a right side view of the pin-counting mechanism for one pin of the 10 pins and mechanisms shown in FIG. 39 and includes crank-arm action of sensing mechanism drive.

FIG. 40A is a side view of the ball stop and switch for initiating a pin count.

FIG. 41 is a schematic wiring diagram of the circuit employed for counting the number of pins downed, as sensed by the mechanism shown in FIG. 39, and closing the circuit for the correct number of downed pins for operation of the unit stops in the machine, as an alternative to manual operation with the keyboard.

Figure 42:
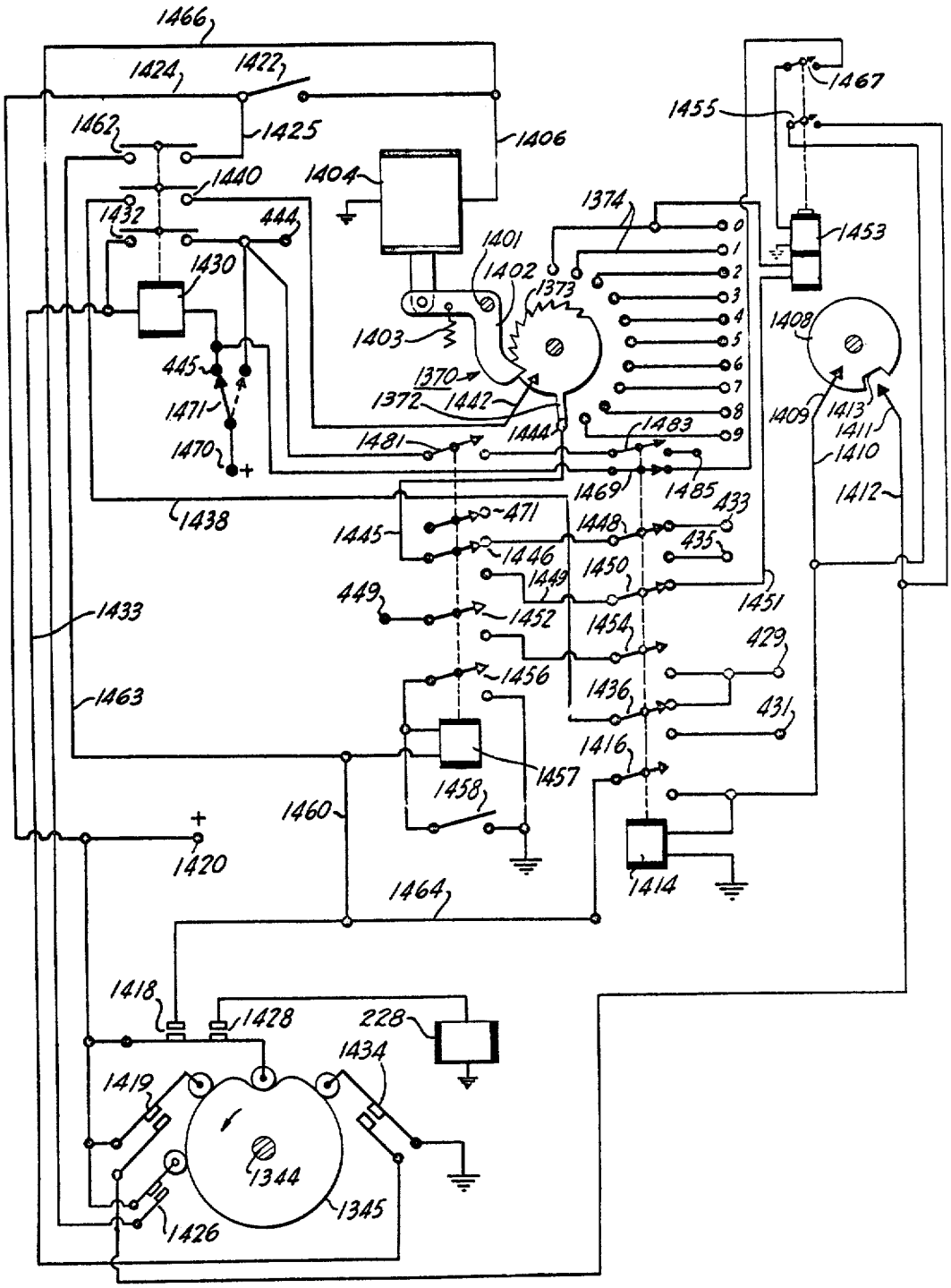

FIG. 42 is a schematic wiring diagram of circuits for utilizing information from the pit and including the means to differentiate between first and second ball, and to score properly when a foul is committed. The circuitry provides for all possible combinations and sequences of scoring.

FIG. 42A is schematic diagram of the foul light circuitry.

Figure 43:
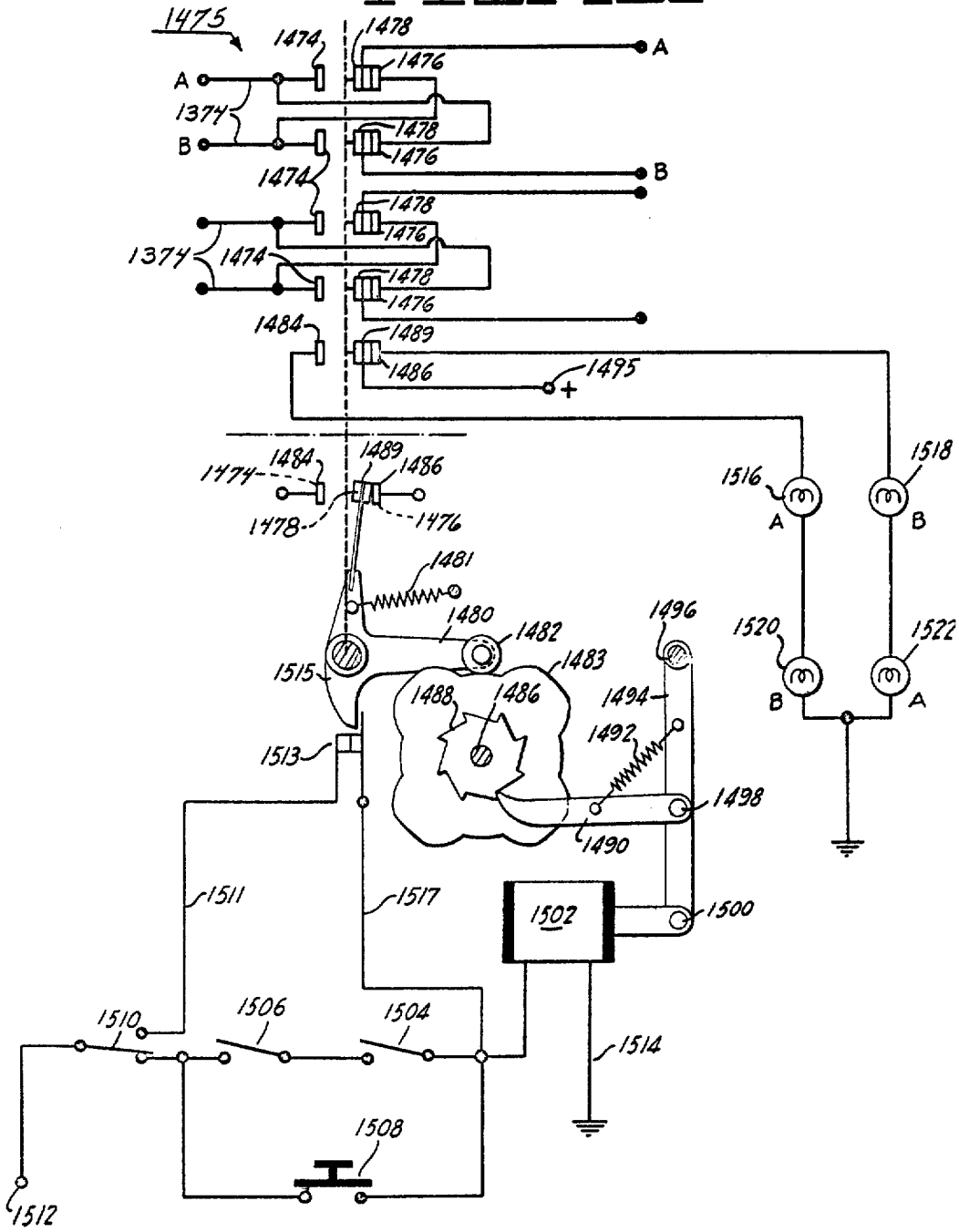

FIG. 43 is a schematic diagram of the circuit and mechanism for automatically reversing the input of information from a given pit to the other scoring unit, when information from the pit is used.

Figures 44, 45:
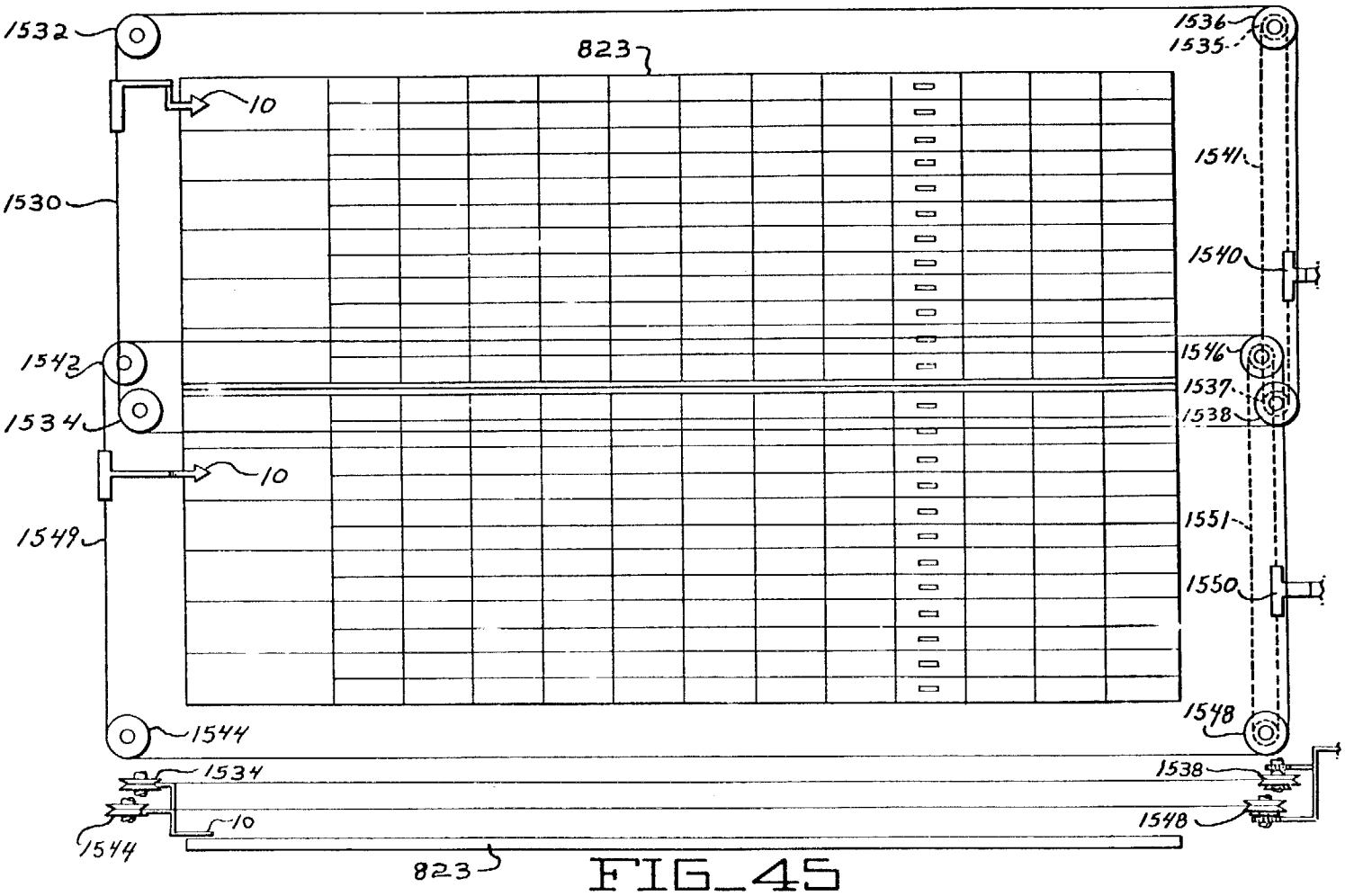

FIG. 44 is a top view showing the pulleys for controlling the position of the arrows relative to the display rack.

FIG. 45 is a right side view of the pulleys shown in FIG. 44.

Figure 46:
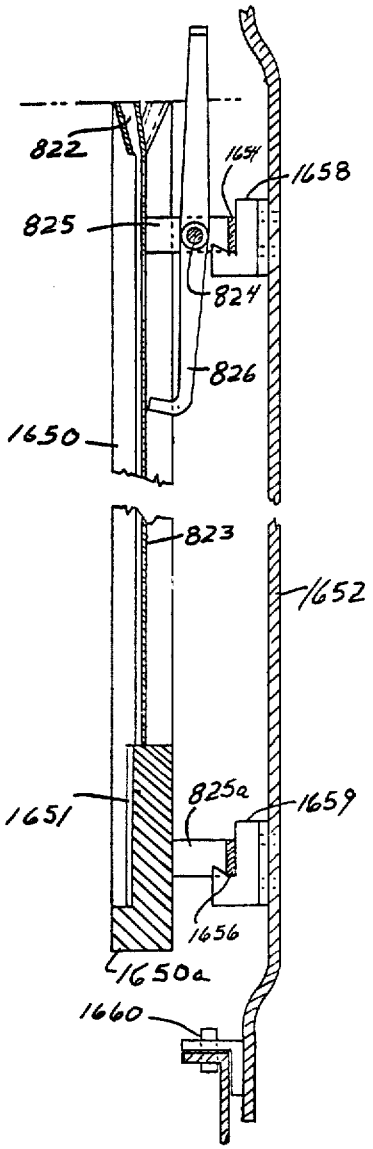

FIG. 46 is a view from the front of the cabinet showing the method of supporting the display racks in a door in the side of the cabinet.

FIG. 47 is a view from the right side of the machine showing a modification of the stops and the control of mark printing of FIG. 21.

FIG. 47A shows one of the modified stops 144a.

FIG. 47B is a top view of an additional block plate to selectively print first or second ball information in the modified embodiment.

Figure 48:
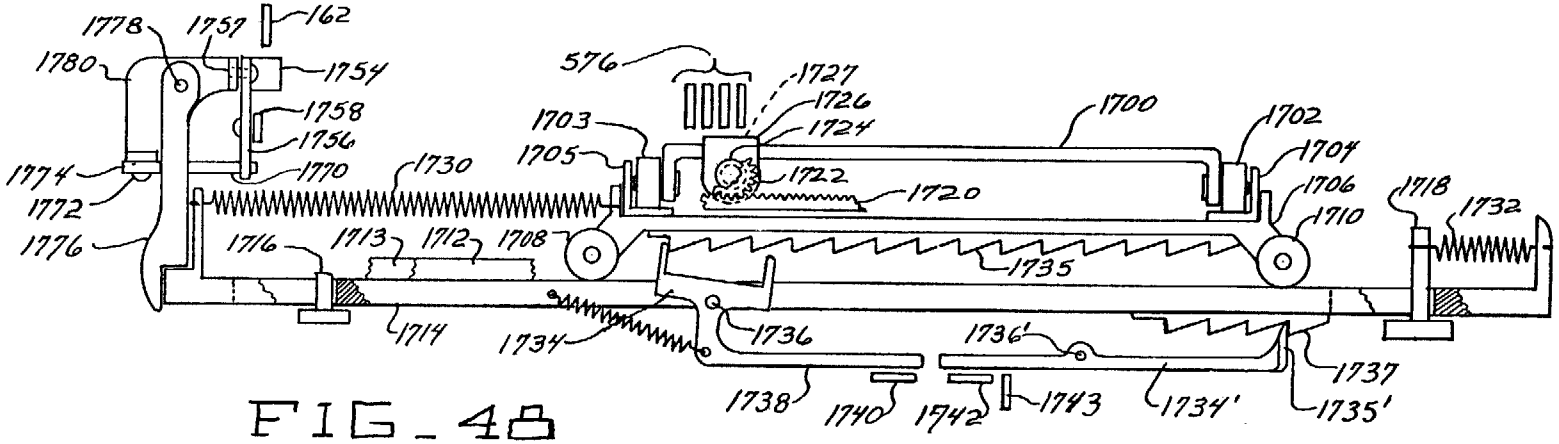

FIG. 48 is a right side view of mechanism for positioning of a score sheet in a modified embodiment.

FIG. 49 is a partial view of the tens stop and score sheet positioning control in the modified embodiment.

MANUAL OPERATION

Figure 1:
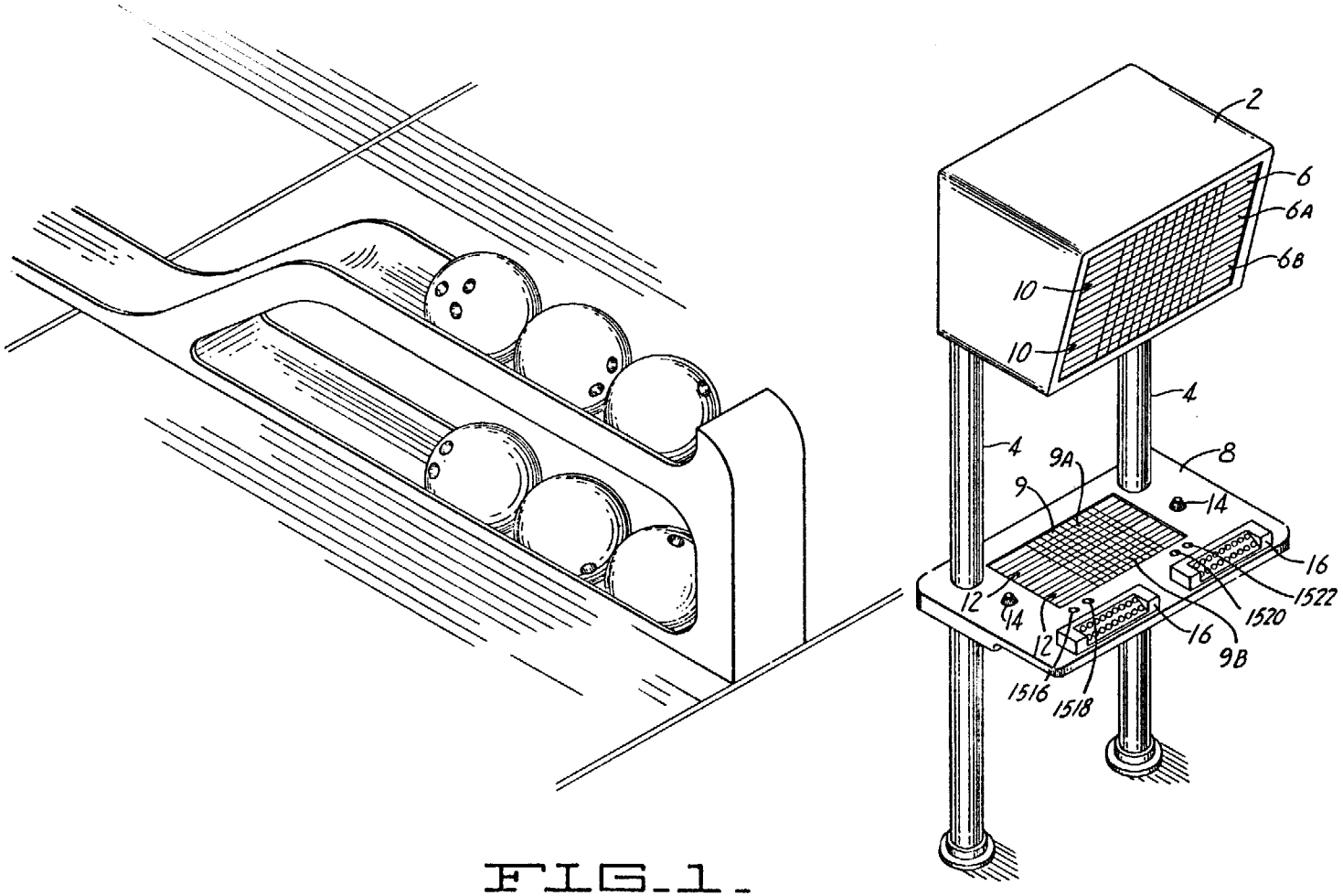
FIG. 1 is a perspective view illustrating the outward appearance of a complete machine, including one pair of units with a common projection system, for use with two alleys.

A general view of a unit for a pair of alleys is shown in FIG. 1. An enclosed structure 2, supported on posts 4, has a translucent screen 6 on which the scores are projected for viewing by the spectators. The enclosure 2 contains two machines for adding and printing, and sets of projection lamps and mirrors. The posts 4 also support a table 8 having an area 9 on which the scores are projected for the benefit of the bowlers. The projected scores are divided longitudinally into two sections, A and B. The upper section A, which is normally associated with the alley on the left, may be adapted to display and desired number of scoring lines, and in the illustrated device is adapted to display as many as six such lines. The lower section B is adapted for similar display and is normally associated with the alley on the right. On either side of the table is a knob 14. The knob 14 on the left controls the position of a line-selecting arrow 10 in the upper section and the knob 14 on the right of the table controls the position of an arrow 10 on the lower section. Similar line-selecting arrows 12 are projected onto the table under control of knobs 14.

Also on the table are two keyboards 16 which, as previously mentioned, are provided in the absence of pin counting and/or scanning and equipment. The machine will be described first a controlled by these keyboards, and second as automatically controlled by pin counting equipment. The lefthand keyboard 16 controls scoring in the upper section A and the right-hand keyboard controls the scoring in the lower section B.

In normal play, players on the lefthand alley use section A, the lefthand knob and the lefthand keyboard, and the players on the righthand alley use the knob and keyboard on the right; the latter's scores are projected on lower section B. In team play, however, it is present practice for the members of a team to play each frame on alternate alleys, i.e., players on team A start on the left and players on team B start on the right. The second frame is reversed and team B bowls on the lefthand alley while team A bowls on the righthand alley. Team A, therefore, always uses the section A and lefthand knob and keyboard and team B uses the section B and the righthand equipment for the entire game regardless of the alley used for bowling each frame.

Keyboard

The keyboard 16 is shown in FIG. 2. It will be noted that there are two rows of keys 20 and 22; row 20 is provided for entry of pins downed by the first ball of a frame and row 22 is provided for entry of pins downed by both balls. Two rows of keys are provided for convenience in entering the score, but both rows operate the same counting elements within the machine itself.

First-ball keys may be depressed after each first ball, but it is not necessary to depress these keys unless the pins downed by the first ball should be counted. An indicator 24 lights when first-ball pins should be counted; moreover, when this indicator is "on," the second row keys are locked against depression. Normally, a second-ball indicator 26 is on. It will therefore be seen that a beginner may easily use the machine and can, by watching the two indicator lights 24 and 26 and the results, actually learn how scores are computed. The person familiar with bowling and scoring is prevented from making inadvertent errors, and is not penalized in any way, such as by having to depress first ball keys, when they do not affect the score.

A row of indicator lights 32 is provided to allow all of the players concerned to see which key has been depressed. Moreover, there is a time delay of a few seconds before the machine actually operates so that in case of a mis-count, an error key 42 may be depressed to release the erroneously depressed counting key.

It will be noted that the tenth number key of the first row, shown in FIG. 2 at 38, bears the sumbol (X) for a strike and the corresponding key 40 of the second row bears the symbol (/) for a spare. Other symbols are (F) for "foul," (C) for "chop" and (100) for "split." "Chop" is a term employed to describe a direct hit on the front one of two standing pins in such manner that the second pin remains standing. A "split" occurs when two pins remain standing after the first ball, with space between them such that it is difficult to knock down both with the second ball. The latter two terms are no more than symbols and do not affect the score, but their indication is desirable to the bowler. A "foul" is committed when the bowler steps over a line where the alley joins the approach. Pins knocked down when a player fouls do not count. A "foul" key 36 in the first row therefore actually counts as a "zero" and, except for printing of the mark, operates the machine as if a zero key were depressed in that row. A foul key 37 in the second row, however, locks down and locks all other keys in that row up, and also lights the "Count First Ball" indicator 24, indicating that it is necessary to enter into the counting mechanism the number of pins downed by the first ball, as is the correct procedure. This action leaves no doubt as to what should be done in case of a foul on the second ball.

In using the machine, each bowler's name is written in a blank space at the left end of a line assigned to him. Each bowler then turns the appropriate knob 14 (FIG. 1) until the arrow is opposite his name, and if the pins downed by the first ball that he bowls should be counted, indicator 24 (FIG. 2) will turn on as soon as the arrow is positioned. He then pushed the key representative of the pins down on the first ball. If indicator 26 is on, he need do nothing; he may, however, push first row keys without harm or error. He then rolls the second ball and pushes the key representative of pins downed by both balls, after which his score is automatically computed and disposed. The next bowler then moves the appropriate knob 14 to position the arrow opposite his name and depresses the keys representative of the pins downed, in the same manner. No other attention is required. The machine not only automatically computes and displays the scores, but at the tenth frame the machine automatically sums the lines as the games are completed; also, the total scores of each team are computed and displayed.

Machine Cycles

Upon depression of any key other than a split or chop, a sensing cycle is initiated. The sensing cycle serves to condition the calculating mechanism to print marks or symbols as required by the key depressed, and to initiate an add-print cycle as required by previously set conditions or by the key depressed. An add-print print cycle serves to enter into the appropriate register a value, representing pins downed and/or bonus, determined by stops set or maintained during the sensing cycle, and serves to print the accumulated total after each such entry. The add-print cycle is controlled to operate only for the completion of the score of each frame for each player.

A sensing cycle initiated by the first ball simply releases the depressed key unless the Count First Ball indicator is set. The Count First Ball indicator is set only after a spare, two consecutive strikes or a second-ball foul for any player; therefore, a first-ball key initiates an add-print cycle only if one of these conditions immediately precedes the first ball for a player in any frame. If the Count First Ball indicator is set to initate an add-print cycle under these circumstances, a number of bonus points may be entered, as determined by the depressed key, to complete the score of a previous frame.

A sensing cycle initiated by depression of a key in the second row may be the result of a spare requiring another ball in the next frame to complete the score of that frame; in this case no add-print cycle is initiated. The spare, however, may follow a strike and therefore constitute the completion of the preceding frame score; under these circumstances the spare does initiate an add-print cycle to complete the previous frame. Second-ball keys other than the "Spare" key indicate that a frame is complete and therefore the score of that frame must be computed. A sensing cycle initiated by any second-ball number key therefore always initiates an add-print cycle. If such a frame is preceded by a strike, the add-print cycle completes the preceding frame and a second add-print cycle follows automatically to complete the current frame score.

A sensing cycle initiated by a strike or space always prints and displays the mark, showing that the bowling of that frame is completed. Otherwise the mark is printed and displayed during the add-print cycle which completes the frame.

Score-value Entering and Accumulating Mechanism

Right side and front views of the mechanism for accomplishing the computing and printing are shown in FIGS. 3 and 4, respectively. Four rack carriers 42 (FIG. 3) are guided for endwise movement, each in a stationary frame member 48. (See also FIG. 3A). The stationary frame members are supported on a pair of shafts 50 and 52 on the right (as viewed in FIG. 3), and on a pair of shafts 54 and 56 on the left. Each movable carrier 42 is guided in a wide, lefthand portion 58 of a slot in its associated frame 48 by a pair of studs 60 and 62, and is guided in a narrower righthand portion of the slot by a pair of studs 64 and 66. Upon each of the first three carriers 42, two racks 44 and 46 are mounted to engage with gears below and above, respectively, as will be explained hereinafter. The fourth carrier 42 engages only the lower gears and differs slightly, as will be explained. The racks are mounted for a limited movement relative to the carrier. Each of the lower racks 44 has a pair of slots 68 and 70 and is supported therein by a pair of studs 72 and 74, respectively, on the carrier. Each of the upper racks 46 has a pair of slots 76 and 78 (see also FIG. 3A) and is supported by a pair of studs 80 and 82, respectively, on the carrier. A respective spring 84 attached to each lower rack 44 and the stud 64 on its carrier tends to pull the rack rightward, but this is prevented by a latch 88 pivoted on stud 74 and in engagement with an ear 90 on the rack. Similarly, each upper rack 46 is urged rightward by a respective spring 86, but is held leftward by a latch 92 in contact with an ear 94 of the rack. Normally the racks and the carrier move together with the latches effective as shown. The purpose of the latches will become evident later.

The three upper racks 46 operate to enter individual scores into individual registers, being capable of cooperating with any set of six sets of line gears or memory elements 96, each set having three gears. (See also FIG. 4). The maximum score of an individual game is 300; therefore three decimally ordered gears will register any individual score. These gears are located within a frame 104 which is moved laterally (left and right in FIG. 4) to bring the individual ordinal sets of line gears 96 into alignment with the racks. There are 18 gears 96, each having 10 teeth, mounted on a shaft 98 which is supported by a series of braces 100 which are interleaved between gears 96 and are pivoted on a shaft 102. Each of the six groups of three consecutive gears constitutes an individual score register. The shaft 102 is supported at each end by the frame 104 which in turn is supported for lateral movement on a pair of shafts 106 and 108. Shafts 106 and 108 extend between the side frames of the machine. Also extending between the side frames is a shaft 110 having a flat surface 112 in contact with the braces 100. Counter-clockwise rocking of shaft 110 (as viewed in FIG. 3) serves to engage the gears 96 with the racks 46 by counter-clockwise rocking of the braces 100 about the pivot 102.

In operation, the rack carriers 42 are moved leftward, and the movement of each is limited by means to be described. The amount of leftward movement of the racks is determined by the amount to be added to an individual score. The accumulator, comprising "line" gears 96, is then brought into mesh with the racks 46 by counter-clockwise rocking of shaft 110. The rack carriers are then returned to the position shown in FIG. 3, thereby rotating the gears 96 counter-clockwise the number of teeth represented by the original leftward movement of the racks.

The carrying of tens between orders in the individual gear registers on shaft 98 is accomplished in the following manner. Each line gear 96 has secured to it a single-tooth disc 114, the tooth of this disc having a flat blocking surface 116 and a camming surface 118. (See also FIG. 6). This tooth locates the zero position of its related gear 96. A respective hook-nose lever 120 is pivoted at 124 on each brace 100, and is in lateral alignment with the corresponding one tooth disc 114. The shape of the nose on lever 120 provides a blocking surface for cooperation with the surface 116 on disc 114 and a camming surface 122 for cooperation with surface 118 on disc 114. The gear 96 shown in FIG. 3 and FIG. 6 is in zero position. As a gear 96 completes one turn counter-clockwise in receiving a value entry, the camming surface 118 of its disc 114 contacts the camming surface 122 of the associated lever 120; this rocks lever 120 counter-clockwise about pivot 124 (FIG. 3). A respective second lever 126 is pivoted on each brace 100 at 128. Each lever 120 and its corresponding lever 126 are pivotally connected to a respective link 134 by studs 130 and 132 to form a parallel linkage. A respective spring 140 fastened between studs 124 and 132 in each order tends to rock the parallel linkage clockwise. This movement is limited by a respective stud 142 which engages each lever 120. The passing of the one tooth disc 114 counter-clockwise from its nine position to its zero position rocks the parallel linkage counter-clockwise and moves link 134 downward. Below a lower surface 136 of each link 134 is an ear 138 of the previously described latch 92 of the next higher order upper rack 46. (See also FIG. 5). As previously explained, each latch 92 holds its upper rack 46 leftward (as viewed in FIG. 3) by contact with ear 94. When latch 92 is rocked clockwise about pivot 82 by the downward movement of link 134 against ear 138 of the higher-order latch, the higher-order rack 46 is released for a one tooth rightward movement (FIG. 3) relative to its carrier by spring 86. This one tooth rightward movement of the rack is limited by slot 76 on the rack and provides a counter-clockwise movement of one tooth to the higher-order gear 96. It is apparent that the tens carry entry occurs whether the rack 46 is stationary or moving. The action is therefore in addition to movement provided by the entry mechanism. It should be noted that the surface 136 of link 134 is of such extended shape that will operate as described even if the latch ear 138 is in an advanced position (leftward) when a tens carry entry occurs.

The three racks 46 provide for entry of units, tens and hundreds of the individual scores. The amount of movement of each is limited by separate mechanism. The units rack carrier is limited by a group of solenoid stops 144 (shown at lower left of FIG. 3), each controlled by a separate solenoid 146 and representing digits 0 to 9, inclusive. These solenoids are fixed on a plate secured to the base of the machine. When a solenoid is energized, it causes a stop to move laterally (away from the viewer in FIG. 3, or to the left in FIG. 4). The units carrier 42 has a stop interponent 148 pivoted on stud 72 and urged clockwise (as viewed in FIG. 3) by a spring 152 against a stub shaft 154. Interponent 148 has a forward each 150 which, in the position shown in FIG. 3, may cooperate with any of the solenoid stops 144.

The stud shaft 154 is supported for movement leftward by a slot 160 in a plate 206 better shown in FIG. 12 and described in detail hereinafter. In operation, the stud shaft 154 is moved leftward (FIG. 3) to the dotted line position shown at 154a whenever a value is to be entered into an accumulator. A respective spring 156 is connected to shaft 154 and to a stud 158 on each carrier. As the shaft 154 moves leftward, the rack carriers therefore tend to move leftward with it. The units rack carrier is therefore moved until stop ear 150 engages any solenoid stop 144 which has been moved into its path, and the units rack carrier stops at this position as shaft 154 continues its leftward movement. When shaft 154 returns, it picks up the rack carrier and returns it to the position shown. As previously mentioned, the line gears 96 are in engagement with the racks during this return movement. The particular digit represented by a solenoid stop therefore controls the entry of that digit into the corresponding units-order line gear, each successive stop being fixed to control the advance of the carrier by one additional rack tooth.

The tens-order upper rack 46, adjacent to the units-order upper rack but limited in leftward movement by different means, provides the entry of the tens increments of scores into the line gears 96. (This entry is distinguished from tens "carry"). There is a separate tens-stop member 162 (See also FIG. 3A) assocaited with the tens-order gear of each group of three gears 96 in the movable line carriage. The tens-stop member of the particular line being scored controls the excursion of the tens-order upper rack 46 and is positioned whenever ten pins are downed in a frame. Each tens-stop member 162 has two slots 168 and 170 by which it is mounted on two shafts 166 and 164, respectively, in the movable line carriage. Each member 162 has an ear 172 which serves as the stop to control the excursion of the tens-order rack to provide for the tens entry into the line being scored. Slots 168 and 170 in each tens-stop member 162 permit leftward movement of that member to adjust the position of stop ear 172. A tens-stop interponent 174 is pivoted on stud 80 on the tens-order rack carrier and is spring urged counter-clockwise by a spring 176 and limited by stub shaft 154. Interponent 174 engages the stop ear 172 on the tens-stop member 162.

Since no frame score can exceed 30, the entry of the hundreds value into a line score can result only from a tens carry from the tens order when the individual register passes from a stored value of 9 in the tens order to a zero in that order. As previously mentioned, 300 is a maximum individual line score. No adjustable (entry) stops therefore are provided for the hundreds-order rack carrier (adjacent to the tens-order rack carrier) but an interponent 174 is provided on the hundreds-order rack carrier which operates against a fixed stop 173 on the hundreds-order stationary frame 48. The detailed operation of the interponent on the hundreds-order rack carrier is described later.

A fourth, thousands-order rack carrier 42 operates after a carry of ten from the hundreds rack and does not enter a value into the line gears 96, but is effective only to enter a thousands digit a team score into a set of totalizer gears, hereinafter described.

To review, the rack carriers are controlled for entering individual line scores by stops as follows: the units-order rack carrier by a series of solenoids fixed in the machine; the tens-order rack carrier by a stop member at each line position in the movable carriage; the hundreds-order rack carrier is controlled by a first fixed stop; and the thousands-order rack carrier is controlled by a second fixed stop.

The movable carriage has at each ordinal line position a set of three gears and a tens-stop member, as previously mentioned, and also has, at each ordinal line position, a "count first ball" member 178 (see also FIG. 3A). This member is adjacent to the tens-stop member 162 in each ordinal line assembly and is mounted in the carriage frame on the same shafts 164 and 166 as the tens-stop member and has slots 165 and 167 to allow limited movement on the respective shafts. Each tens-stop member 162 is urged leftward by a spring 183 secured to a stub shaft 184 on a corresponding intermediate frame member 105 (FIG. 4) of the movable carriage, and is adjusted to proper position through a respective escapement latch 190 (FIG. 3). All of the latches 190 are pivoted on a shaft 192 mounted in the end frames 104 of the movable carriage. Each latch 190 is urged clockwise (as viewed in FIG. 3) by a respective spring 197.

Each "count first ball" member 178 is urged leftward by a respective spring 181 secured to a stub shaft 182 on the corresponding intermediate frame member 105, and is held against such a leftward movement as would be allowed by slots 165 and 167 by a respective latch 200 pivoted on a shaft 202. Each latch 200 is springurged clockwise (as viewed in FIG. 3) and has a formed ear 203 to cooperate with a nose 204 on the "count first ball" member to hold it in the position shown.

The "count first ball" member 178 is unlatched for leftward movement as a result of the depression of a spare key or two successive strike key depressions. The tens-stop member 162 may attain a position one, two or three increments to the left of its normal (FIG. 3) position and is positioned by either the strike or spare key to control the excursion of the tens-order rack carrier 42 during an add-print cycle as hereinafter described. It serves not only as the stop for tens entry but also controls the cycling of the machine for proper scoring. The tens-stop member in each line group is adapted to add 10 by either a spare or a strike, and to add 20 by a spare-strike, a strike-spare, or a strike-strike sequence for one bowler. It is further adapted to add 30 in response to three consecutive strikes by one bowler, all in accordance with proper scoring procedure.

The "count first ball" member 178 is released for leftward movement from its normal neutral position by counter-clockwise rocking of latch 200. This occurs, whenever the spare key is depressed, through leftward movement of an ear 206, by means described later. Latch 200 also is rocked counter-clockwise by a stud 208 on the tens-stop member 162 whenever the tens stop member is adjusted leftward to the position in which 20 will be added to the score during the add cycle, thus also releasing the "count first ball" member. Latch ear 203 therefore is not effective to hold the "count first ball" member in its neutral position when the tens-stop member of the corresponding line group is adjusted to add more than ten to the line score.

The tens-stop member 162 is positioned to control entry of the correct score by a rocking reciprocation of the latch 190, which operates through a pair of ears 193 and 194 in alternative contact with a series of lower teeth 196 on tens-stop member in the well-known manner of an escapement. Each reciprocation of latch 190 positions the stop ear 172 on the tens-stop member one increment to the left (FIG. 3) to thereby add a gear tooth of movement (representing the value 10) to the second-order line gear 96 during entry of the line score. The means for reciprocating the ratchet bellcrank 190 includes an ear 210 which is moved by linkage described later.

The tens-stop member 162 and the "counter first ball" member 178 are restored simultaneously by a member 220 having an ear 212 which contacts one of a series of upper teeth 214 on the tens-stop member and a single upper tooth 216 on the "count first ball" member. The ear 212 is normally out of the path of the teeth of the members to be restored, being held by a shelf 218 fixed to a stationary support. (See also FIG. 10). The surface of the member 220 is such that rightward movement thereof, by means of rocking an arm 374, allows counter-clockwise movement of member 220 about a pivot 396 through a spring 375, and the ear 212 assumes a level indicated by 212a (FIG. 3) during the first part of its rightward movement. Further movement of member 220 moves both members 162 and 178 rightward if they are out of this initial positions. The operation of these setting and restoring members is described more fully later.

The mode of operation of the machine during value entry will now be described.

Briefly reviewing, the depression of a number key (or the arrival of a ball at the pit, if value entry is automatic) starts a sensing cycle. The sensing cycle performs three main functions: (1) determining whether or not the ball thrown completes a frame; (2) printing marks and setting the accumulator control elements for correct scoring as determined by the number of pins downed; and (3) initiating scoring and printing operations as determined by conditions sensed.

Unless an add-print operation is initiated by mechanism operated during the sensing cycle, the sensing operation completes the response to a key depression. If, however, the ball thrown completes a frame, an add-print operation is initiated during sensing by engaging a clutch. This add-print operation primarily consists of: (1) additive entry into the line gears of the ordinal values determined by the set stops; and (2) printing of the values then stored in the line gears.

A clear understanding of the operation of the machine will be better maintained if it is borne in mind that the stops which control the extent of excursion of the racks are set from pin information, such as by key depression, and are not necessarily used for entry into the register at the time they are set. They are constantly in readiness to control amount of the entry if and when such entry occurs. The units order rack stops may change with each ball thrown where less than 10 pins have been downed by the ball but will not be effective unless the rules of scoring require such entry and the machine will then cycle automatically. Similarly, the tens-stop member initially positioned in response to key depression is always in readiness to control the entry of the correct tens increments when 10 pins have been downed by one or both balls or any successive combinations thereof if the rules of scoring would at that moment require such entry into the register. The tens-stop member in each "line" register therefore stands at a position representing the accumulated tens bowled but not added to that register. Since bonus points are earned by scoring ten pins in a frame with one or both balls, the tens-stop member is used for control of machine cycling and interdependently, the tens-stop member is re-positioned as a result of the cycling to control a subsequent machine cycle as well as the tens increments of the amount to be entered into the register in the event of such cycling. As explained more fully later, the tens-stop member has two functions, namely, machine cycling control and the tens increment entry, both dependent on its adjusted position, and in conjunction with the "count first ball" member, the tens-stop member furnishes the entire control for all "bonus" frame score completions.

Referring now to FIG. 3, an add-print operation includes two reciprocations of stub shaft 154 by mechanism described later. The rack carriers 42 always tend to follow the shaft by spring action as previously explained and are blocked through the action of interponents 148 and 174 by the stops as described, viz: the units-order carrier is blocked by respective stops 144; the tens-order carrier is blocked by stop 172; and the hundreds-order carrier is blocked by a fixed stop 173 and the thousands order carrier by a special stop described later.

When shaft 154 reaches its leftmost position (as viewed in FIG. 3), the appropriate group of three gears 96 are brought into mesh with the upper racks 46 by rocking about pivot 102 as described, and shaft 154 is returned to the right, thereby rotating gears 96 counter-clockwise to store the ordinal values represented by the respective stops. Gears 96 remain is mesh with racks 46 and a second reciprocation of shaft 154 occurs. In the second reciprocation, however, the stop interponents 148 and 174 are disabled, by means described later, and the rack carriers 42 are stopped under control of line gears 96 in a manner described later. The amount of the second leftward movement of each of the three racks represents the magnitude of the digit stored in the corresponding gear 96 and is controlled by rotating each gear clockwise until it is stopped at its zero position. During the second leftward movement, the rack carriers position a series of printing-type rods. A corresponding series of print hammers are then operated to print the amount represented by the displaced racks, as later described. With the line gears 96 now at zero positions and still in mesh, shaft 154 is a gain returned to the right to thereby restore the racks to the positions shown in FIG. 3. At the end of the cycle, the line gears, which are again rotated counter-clockwise to their value-storing positions by the final rightward movement of the upper racks 46, are then disengaged.

Add-print Cycle—Print Phase

The add phase of the add-print cycle, which occurs during the first reciprocation of shaft 154, has been described. The second reciprocation of that shaft controls the print phase briefly outlined above and otherwise referred to as a "sub-total operation." The latter phase will now be described in detail. The single tooth of each disc 114 (FIG. 3) is provided with the previously mentioned blocking surface 116 (see also FIG. 6) for cooperation with the corresponding blocking surface on the nose of the associated lever 120. Unlimited counter-clockwise rotation of any disc 114 and the respective line gear 96 which is integral with it is possible. On the other hand, if gear 96 is rotated clockwise, the blocking surface of lever 120 engages surface 116 and blocks the one tooth disc and its integral line gear at their zero positions; therefore, any gears 96 in mesh with the racks during the leftward excursion of shaft 154 are rotated clockwise until blocked at zero. In this manner each rack is moved leftward an amount representing the value stored in the corresponding gear, which, it will be remembered, was displaced counter-clockwise to enter the value. For example, if the gear had been in a position rotated counter-clockwise five teeth from zero at the start of the sub-total operation, it would then permit a total leftward movement of five teeth of the upper rack 46 with which it is engaged. Furthermore, when that rack is returned rightward with the gear still engaged, a counter-clockwise rotation of five teeth is imparted to the gear, thus leaving it in the position which it had originally attained and re-entering its stored ordinal valve.

As previously mentioned, the guide slot 160 for stub shaft 154 is cut in plate 206 (FIG. 12) which may be rocked downward by means described later. Also as previously mentioned, the stop interponents 148 and 174 (FIG. 3) are spring-urged against the stub shaft 154. Consequently, when the plate 206 is moved downward, shaft 154 moves downward and the stop interponent 148 moves counter-clockwise about pivot 72. In this position ear 150 is out of the path of the solenoid stops 144. Similarly, the stop interponents 174 rock counter-clockwise about pivot 80 and the nose of the tens-order rack carrier interponent is out of the path of the tens-stop ear 172. Also, the interponent 174 on the hundreds-order rack carrier is moved out of the path of the fixed stop 173.

The plate 206 is moved downward to disable the stop interponents 148 and 174 during the print phase of each add-print cycle, when the excursion of the racks is to be limited by the respective zero stops in the register gears for printing or clearing either individual or team scores, thereby obtaining either a sub-total or a total operation, as described later.

Operation of Sensing and Add-Print Clutches (Programming Devices)

A sensing clutch is operated by a solenoid and a time-delay mechanism shown in FIG. 13. The solenoid 228 is energized whenever a key is depressed (or a ball thrown if automatic). The time delay is allowed for correcting a wrong entry so that the initiation of the sensing cycle may be prevented, if necessary, as described later. Solenoid 228 has a plunger connected at 229 to a bellcrank 230 which is pivotally mounted on a shaft 232. The bellcrank carries a disc 234 which has a radial slot 238. Operation of the solenoid rocks the bellcrank counter-clockwise (as viewed in FIG. 13) until disc 234 contacts a continuously rotating shaft 236. The shaft frictionally drives the disc counter-clockwise against a light torsion spring 244, which tends to hold the disc clockwise in the angular position shown by contact of the spring ends with a stud 240 on the disc and a stud 242 on the bellcrank. The disc rotates counter-clockwise until the slot 238 reaches the position of shaft 236. The width of the slot is such that when the disc is in position of alignment of the disc and slot, bellcrank 230 may be rocked further counter-clockwise with the shaft entering the slot. This action rocks shaft 232 counter-clockwise, by means of an ear 233 on a member 231 integrally secured to shaft 232, and engages the sensing clutch by rocking shaft 232, as later described.

The operating elements of all of the clutches are substantially the same. Reference is made to FIG. 11 showing a clutch which will be described later as to function and control, and which may be considered a typical clutch. Each clutch has a driving and a driven member, the clutch itself serving to engage the two. The driving member and driven member are both supported on the same center. The driving member is a disc 294 with one or more drive lugs 295 (five in FIG. 11). The driven member is a disc, or plate 296 on which is pivoted, at 705, a clutch dog 703 having projection 707 capable of being engaged by any drive lug on disc 294. The driving member may rotate continuously but dog 703 is normally prevented from engagement therewith by an ear 717 on a pawl 719 pivoted at 232. The clutch dog is urged toward engagement with member 294 by a spring 713 that is connected to the dog and to a stud 715 on plate 296. Spring 713 is light and is overcome by friction which tends to rotate the clutch plate counter-clockwise in the same direction as the driving member. The pawl 719 prevents any counter-clockwise movement of the clutch plate by blocking dog 703, which blocks a stud 711 on the plate, and by holding the projection 707 out of the path of the drive lugs. A spring 723 holds the dog in the position shown. In order to engage the clutch, pawl 719 is rocked counter-clockwise (as viewed in FIG. 11) to remove ear 717 from engagement with the dog. Spring 713 then urges the dog counter-clockwise about pivot 705 to engage projection 707 with lugs on member 294. Driving members 294 is then effective to rotate the clutch plate 296 counter-clockwise with it. Ear 717 may be restored at any time to the position shown and since the clutch plate rotates counter-clockwise, as shown by the arrow, dog 703 contacts ear 717 and further movement of plate 294 disengages the clutch. The previously mentioned sensing clutch has only one drive lug on the driving member, as does the add-print clutch, but otherwise, the latter two clutches are substantially identical to the clutch shown in FIG. 11.

The operations performed during the add-print cycle, as previously stated, require two reciprocations of the upper racks 46 (FIG. 3). To control these operations, a shaft 248 (FIGS. 8 and 14) which is driven through gearing by the add-print clutch 276, rotates once for each two rotations of a shaft 246 on which the add-print clutch and the sensing clutch 268 are mounted. Shaft 248 controls the single-action functions of add-print operations. These two shafts are mounted in machine frames 250 and 252 and are driven by means best shown in FIG. 14. A motor 253 rotates a gear 254 in mesh with a gear 255 which is mounted on and rotates a shaft 256. Secured to shaft 256 at the right of the figure is a gear 257 in mesh with a gear 258. Gear 258 is integral with a hub 262 which freely rotates on shaft 248. A small gear 259 on hub 262 meshes with a gear 260 freely mounted on shaft 246. Gear 260 continuously rotates and carries two separate ratchet discs 264 and 266, each having a single tooth. Disc 264 constantly rotates the driving member of the sensing clutch 268 and disc 266 rotates the driving member of the add-print clutch 276. The driven member (clutch plate) of the sensing clutch 268 is integral with a hub 269 rotatably mounted on shaft 246 and rotates three cams 270, 272 and 274 when the sensing clutch is engaged.

The add-print clutch 276 is integrally mounted on a hub 279 with a gear 278, in mesh with a gear 280 mounted on hub 281 on shaft 248. Shaft 246, gear 278, clutch 276 and hub 279 which is pinned to shaft 246 by a pin 283, turn in unison. Gear 280 is integral with hub 281 which is pinned to shaft 248 by a pin 285. The ratio of gear 278 to gear 280 is 1:2; therefore, shaft 246 rotates twice to provide a single rotation of shaft 248. Shaft 248 carries four cams 282, 284, 286 and 288. Cam 282 is integral with hub 281; cam 284 is integral with a hub 291 which is pinned to shaft 248 by a pin 293; and cams 286 and 288 are integral with a hub 289 which is pinned to shaft 248 by a pin 287. Hub 291, integral with a gear 290, drives a gear 292, having a hub on which is integrally mounted a clutch drive disc 294. The hub of gear 292 is rotatably mounted on shaft 246. Disc 294 drives a special tenth-frame clutch 296 and three associated cams 298, 300 and 302 whose functions are described later. For the present it is sufficient to understand that cams 270, 272 and 274 are associated with the sensing function and are freely mounted on shaft 246, whereas the four cams 282, 284, 286 and 288, associated with add-print operations, are on hubs which are pinned to shaft 248.

Shaft 246, which is driven by the add-print clutch, provides the reciprocation of stub shaft 154 through linkage shown in FIG. 14 at the left of frame 252 but better shown in FIG. 12. A narrow hub 303 secured to shaft 246 by pin 303a carries a short lever 304, pivotally connected at 305 to a link 306 pivoted at 307 to an arm 308 of a bellcrank pivoted at 312 on the frame 252 (FIG. 14). The other arm 310 (FIGS. 12 and 14) of the bellcrank is pivotally connected at 309 to the drive link 314 for shaft 154. As shaft 246 makes a complete rotation, bellcrank 308 rocks counter-clockwise and back through the link 306. This type of linkage provides a partial dwell at both ends of the reciprocation for better timing for printing and for engaging and disengaging the gears for addition.

Mechanism for engaging the sensing and add-print clutches by means of the time-delay mechanism is shown in FIGS. 8 and 15. It will be recalled that shaft 232 (as explained in connection with FIG. 13) rocks counter-clockwise (as viewed in FIG. 13) after time delay. A lever 316 is pinned to shaft 232 through its integral hub. Pivotally mounted at 319 on lever 316 is a latch 318 which is urged counter-clockwise by a spring (not shown) and which has a notch adapted to engage a stud 320 on a sensing-clutch pawl 322. Pawl 322 has an ear 328 for operating the sensing clutch 268 (FIG. 15) in the manner previously described in connection with FIG. 11, and is normally urged clockwise (FIG. 8) by a spring (not shown) to maintain the sensing clutch disengaged. Rocking of lever 316, however, rocks sensing-clutch pawl 322 counter-clockwise by means of the notch on latch 318 engaging stud 320, and thereby engages the sensing clutch. Solenoid 228, (FIG. 13) which rocks shaft 232, is deenergized during the sensing cycle by means described later if no add-print cycle is to ensue. If, however, an add-print cycle is to be initiated, shaft 232 and, consequently, lever 316 (FIG. 8) remain in their counter-clockwise positions and a stud 335 on the previously mentioned cam 274, which is driven counter-clockwise (FIG. 8) by the sensing clutch, contacts latch 318 rocking clockwise to release stud 320. This permits clutch pawl 322 to be spring-urged clockwise for disengaging the sensing clutch, which never rotates more than once during a sensing cycle.

Lever 316 not only engages the sensing clutch but also yieldably tends to engage the add-print clutch 276 by means of a spring 324 secured to a stud 325 on leeer 316 and to a stud 327 on an add-print-clutch pawl 323. Pawl 323 which has an ear 321 for operating the add-print clutch, does not rock counter-clockwise with the counter-clockwise rocking of lever 316, however, because a latch 334 pivoted on a shaft 330 normally engages a stud 336 on pawl 323, thereby maintaining the latter in its clockwise position against the tension of spring 324. Latch 334 has a nose 317 which lies in the path of a stud 337 on the sensing clutch plate. Near the end of a sensing-clutch cycle, latch 334 is rocked clockwise on shaft 330 by stud 337, thereby releasing stud 336. Therefore, if lever 316 is still counter-clockwise at the termination of the sensing cycle, the add-print clutch is engaged through the action of spring 324 on clutch arm 328.

Once the add-print clutch 276 engages, if remains engaged for two complete cycles by the action of a nose 342 of a lever 344, which rocks clockwise about shaft 330 when the add-print clutch 276 engages, thereby moving nose 342 clockwise behind a stud 343 on the add-print clutch pawl 323. Lever 344 has a roller 346 which follows the previously mentioned cam 282 on shaft 248 (see also FIG. 14) which, it is recalled, rotates once for each two rotations of the add-print clutch. Cam 282 maintains lever 344 clockwise, and therefore pawl 323 in clutch-engaging position for two cycles.

As mentioned in connection with FIG. 3, the latches 200 for the respective "count first ball" members and the ratchet latches 190 for the adjustment of the respective tens-stop members 162 are operated by the sensing clutch. As shown in FIG. 8, the means for operating these latches consists of a cam follower 349 on a lever 348 which is pivoted on a shaft 332. The end of lever 348 opposite roller 349 is bifurcated, as shown at 350, and embraces a stud 352 on one arm 354 of a bellcrank. The latter bellcrank is pivoted on a shaft 360 and has an arm 356 which carries a stud 358. Cam 274 (FIG. 15), driven by the sensing clutch, contacts roller 349 (FIG. 8) and rocks lever 348 clockwise during each sensing clutch cycle. Bellcrank 354, 356 is thereby rocked counter-clockwise during each sensing cycle. The mechanism for selectively operating the "count first ball" and tens-stop member in the carriage register which is positioned for value entry includes two solenoids 362 and 364. Solenoid 362 enables the adjustment of the tens-stop member whenever a strike key or a spare key is depressed. As shown in FIG. 16, solenoid 362, when energized, rocks a bellcrank 376 counter-clockwise about a pivot 377. Bellcrank 376 extends through a slot in a plate 378 which is controlled by that bellcrank and guided (see FIG. 8) in slots in a frame 382. A pair of ears 380 on plate 378 are guided in slots in the opposite sides of frames 382. Plate 378 underlies an ear 386 on a member 388 which is pivotally connected to a lever 366 at 389. Lever 366 is pivoted on shaft 360 and is integral with a lever 370 (see also FIGS. 5A and 7). Lever 370 operates a member 392 having a frmed ear 210 cop-perating with latches 190 and having a first slot 392a by which it is supported on a pair of shafts 390 and 391. Member 392 has a second slot 392b which engages a stud 224 on lever 370. Member 392 moves leftward and back (as viewed in FIGS. 7 and 8) to operate the ratchet 190 which is aligned therewith by the shiftable carriage.

The reciprocation of member 392 is controlled by solenoid 362 (see FIG. 16) which, as it lowers plate 378 (FIG. 8), allows counter-clockwise rocking of member 388 (FIGS. 7 and 8) about pivot 389 by the action of the action of a spring 393 connected between lever 366 and an ear 394 on member 388. The ear 394 also serves as a limit to the counter-clockwise movement of member 388 by engaging lever 366. In the counter-clockwise position of member 388, a shoulder 395 (FIG. 7) on that member lies in the path of a stud 358 on bellcrank arm 365 which, as previously explained, rocks counter-clockwise during each sensing cycle. Thus, whenever solenoid 362 is energized during a sensing cycle, bellcrank arm 356 rocks levers 366 and 370 counter-clockwise, through member 388, and ratchet lever 190 is operated through the leftward movement of member 392. Solenoid 362, it is recalled, is energized by either a strike or spare.

The "count first ball" member in each register is advanced when the corresponding latch 200 is released, as described previously in connection with FIG. 3. This latch is operated by an ear 206 of a member 385 which is mounted through a slot 385a (FIG. 9) on studs 390 and 391. Member 385 moves leftward, as now described, to release the latch 200 which is aligned with ear 206 by the shiftable carriage. As shown in FIG. 8, solenoid 364, which is energized by spare key depression, actuates a bellcrank 375 (FIG. 16) to lower a plate 396 which underlies an ear 398 (FIGS. 8 and 9) on a member 399 pivoted on an arm 368 at 404. This allows counter-clockwise movement of member 399 into the path of the previously described stud 358 on lever 356 by a spring 401 having one end attached to a stud 400 on member 399. The other end of spring 401 is attached to a lever 368 pivoted on shaft 360 and integral with a lever 372. Lever 372 has a stud 387 engaging a sot 385b on member 385. In a manner similar to the operation of the control mechanism for latches 190, previously described, the counter-clockwise rocking of lever 356 during a sensing cycle produces counter-clockwise rocking of levers 368 and 372, if solenoid 364 is already energized, thereby moving member 385 and its ear 206 leftward to release the aligned latch 200.

It has been previously noted that a spare following a strike signifies the completion of the previous frame and therefore an add-print cycle is initiated by the spare key in this case. Normally the "count first ball" member is restored during an add-print cycle. However, the setting of the "count first ball" member which occurred during the sensing cycle must be maintained through the add-print cycle when a spare initiates the add-print operation, since the setting of the "count first ball" member applies to the spare (or incomplete score frame) in this case. A latch 402 (FIGS. 8 and 9), which is pivoted at 404 and urged counter-clockwise by a spring 403 attached to stud 400, cooperates with a frame stud 406 which serves to hold lever 368 in counter-clockwise position once the latter is operated by lever 356. For this purpose, a flat end 407 of latch 402 engages the upper-right surface of stud 406. This holds latch 200 counter-cockwise until after the resetting of the "count first ball" member during the add-print cycle, which resetting is therefore ineffective, since a surface 407 of latch 40 remains in engagement with stud 406 as long as solenoid 364 is energized. Latch 402 is released from stud 406 by clockwise rocking of member 399 when plate 396 (FIG. 8) rises, because latch 402 engages an ear 405 on member 399 and is carried clockwise about pivot 404 with that member.

Mechanism for restoring the "count first ball" member and the tens-stop member in any group of register orders, by means of ear 212, is shown in FIGS. 8 and 10. A member 408 (FIG. 8), pivoted on shaft 332 has a roller 410 which follows a cam secured to the add-print shaft 248. Rotation of the add-print shaft (once during each add-print cycle, as previously described) causes counter-clockwise rocking of member 408 about pivot 332. Member 408 has a bifurcated end 411 embracing a stud 412 (FIG. 10) on a lever 414 which is pivoted on shaft 360 and which is integral with a lever 374. Lever 374 is rocked clockwise by the movement of member 408 and moves to the right a member 220 to which it is pivotally connected to lever 374 at 396. A spring 375 connects lever 374 to member 220, urging the latter counter-clockwise about pivot 396 (as viewed in FIG. 10). Member 220 carries the previously-described ear 212 and moves that ear rightward to engage the tooth 216 of the "count first ball" member or one of the teeth 214 of the tens-stop member for a one-tooth movement if either is out of its right-hand position.

Control Circuit and Mechanism

Means for controlling the cycling of the machine are shown in the schematic wiring diagram of FIG. 17. As previously explained, the machine continues to cycle until the time-delay solenoid 228 (FIG. 13) is released because, as explained in connection with FIG. 8, the pawl 323 of the add-print clutch is held counter-clockwise by spring 324 as long as solenoid 228 is energized. Each of the keyboard keys, when depressed, closes a circuit which includes the time-delay solenoid 228 (FIG. 17). The first-row and second-row key circuits also include respective lock-bail solenoids 428 and 430 which operate respective lock bails to hold any operated key down until the circuit is broken; therefore, an operated key is released by breaking a circuit that it established and this terminates the operation initiated by the key. A depressed key may be released during the sensing cycle, and if so, no add-print cycle ensues. A depressed key is normally released during an add-print cycle if such cycle occurs, but if the key is not released during the first add-print cycle, a second add-print cycle ensues. Once started, each operation is completed even though the circuit is broken during the cycle, due to the full-cycle clutches used throughout the machine.

The connections for the first, or top, row of the keyboard, corresponding to pins downed by the first ball, are shown in Section A of FIG. 17 and the second-row connections, corresponding to the total number of pins downed by both balls, are shown in Section B. Respective switches 416 are closed by first-row numbers keys; the strike key closes a switch 420; the first-ball foul key closes a switch 424; second-ball number keys close respective switches 418; the spare key closes a switch 422; the second-ball foul key closes a switch 426; and a pair of mark switches 425 and 427 are closed by the "split" an "chop" keys, respectively. Solenoid 428 is the keyboard lock-bail solenoid for first-row keys and solenoid 430 is the second-row lock-bail solenoid. The previously described units-rack control, or number solenoids 146 (see also FIG. 3) position the units stops as hereinafter described; other solenoids previously mentioned are shown in the drawing.

Either first-row or second-row keys operate the number solenoids 146. A "zero" solenoid 438 retracts the zero stop out of effective position when energized (see also FIG. 3), while all digit solenoids eject their respective stops when energized so as to be in position to stop the units rack carrier. The "zero" solenoid 438 is operated with each key since the zero stop, as explained, is normally effective and must be removed when any other stop is ejected into the path of the units rack carrier. The time-delay solenoid 228 is always operated by any key.

First-row keys are normally released during the sensing cycle by opening a cam-operated switch 440 in the following circuit: a current source 444, a lead 446, the switch 440, a normally closed switch 442, a lead 448, the lock-bail solenoid 428, a normally closed switch 1040, the selected switch 416, a pair of leads 450 and 452 corresponding to the selected key, the corresponding stop solenoid 146, the zero solenoid 438 and the time-delayed solenoid 228 to ground. A follower 451 on a cam 459 driven by the sensing clutch normally holds switch 440 closed. A depression 465 on the cam opens switch 440 to break this circuit during the sensing cycle and thereby deenergize solenoid 428 and release the depressed first-row key, as later described in detail.

Referring to the upper center of FIG. 3, a "count first ball" member 178 moves leftward when its corresponding latch 200 is released as previously described. A member 458 pivoted at 460 (see also FIG. 4) is cammed counter-clockwise whenever the surface 179 of the aligned "count first ball" member is leftward from the position shown. Member 458 is provided with a camming surface 461 engage surface 179 of the aligned member 178 for this purpose. Member 458, when rocked counter-clockwise, closes two switches 454 and 456 (FIGS. 3 and 17). Switch 454, when closed energizes solenoid 428 to hold the depressed first-row key down during the sensing cycle, even though switch 440 opens, to thereby initiate an add-print cycle. This is accomplished through the following circuit: current source 444, a lead 462, switch 454, lead 448, solenoid 428, switch 1040, the selected switch 416, leads 450 and 452 and solenoid 146 and solenoids 438 and 28 to ground. Switch 454 is opened during the add-print cycle by restoration of the "count first ball" member 178 (FIG. 3). A second switch 442 (FIG. 17) on a cam follower 443, cooperating with a depression 485a on a cam 485 which is driven by the add-print clutch, is opened simultaneously with the opening of switch 454, or later, to break the normal, first-described connection to lead 448.

It will be understood that depression of a second-row number key, other than spare, should always cause an add-print cycle to follow the sensing cycle and that depression of the spare key should do so if the next preceding frame was a strike. The normal second-row key circuit is as follows: source 444, a lead 464, a normally led 468, the second-row lock-bail solenoid 430, a normally closed switch 1041, the selected second-row switch 418, the corresponding leads 450 and 452 and solenoid 146, and solenoids 438 and 228 to ground.

The spare key, which is a second-row key, is normally released during a sensing cycle, and like any other depressed number key in the second row, must be held down if it is to initiate an add-print cycle. Since under special conditions, the spare key must be held down to initiate an add-print cycle, the previously mentioned switch 436 is included in the second-row circuit to achieve this purpose. Referring to the lefthand portion of FIG. 3, a member 470 (see also FIG. 17) is provided with a shoulder 472 which opens switch 436 when member 470 is moved downward. Member 470 is yieldably moved downward (by means later described) both during a sensing cycle and an add-print print cycle. Member 470 has an ear 474 which contacts the tens-stop member 162 whenever the latter is adjusted to add ten or more to the tens rack. Therefore, the movement of member 470 (to open switch 436) is blocked unless the tens-stop member is adjusted to zero.

In FIG. 17 it will be seen that, due to the above circuit, a depressed second-row number key would be released during the sensing cycle by the opening of switch 436 if this were permitted to deenergize the second-row lock-bail solenoid 430. An alternate path is therefore provided for the second-row number-keys circuit, as follows: source 444, lead 464, a lead 476, a cam-operated switch 478, a lead 480, a normally closed switch 484, a lead 482, a lead 468 through solenoid 430 and to ground through the previously descried number-key circuit. It will be noted that cam-operated switch 478 is normally open but is closed by a follower 453 on the sensing-clutch cam 459 as soon as sensing begins; thus, the breaking of switch 436 during a sensing cycle is ineffective to release a depressed second-row number key.

If the spare key is operated, the effective second-row circuit is as follows: source 444, lead 464, switch 436, lead 466, lead 468, lock-bail solenoid 430, switch 1041, spare-key switch 422, a lead 487, solenoid 364 (previously described to set the "count first ball" member—FIG. 8) a lead 488, a cam-operated switch 486, a lead 489, solenoid 362 (previously described to set the tens-stop member—FIG. 8), a lead 490 and the time-delay solenoid 228 to ground. It will be noted that the previously described alternate circuit for second-row number keys includes a switch 484. Operation of solenoid 364 by the spare key opens switch 484; therefore, when switch 436 is opened during a sensing cycle that is initiated by the spare key, it breaks the second-row circuit and the spare key is released as it normally should be. If, however, a spare follows a strike, an add-print operation should occur to record he previous strike frame. In this event the member 470 (see also FIG. 3) is blocked by the tens-stop member 162 and switch 436 remains closed to disable release of the spare key.

It was previously explained in connection with FIGS. 9 and 10 that the "count first ball" latch 200 is disabled when the "count first ball" member 178 is restored during an add-print cycle that is initiated by the spare key; therefore the restoration of member 178 is ineffective and that member returns to its released position. The circuit to the second-row lock-bail solenoid 430 is broken during the add-print cycle, to release the spare key, when the cam-operated switch 486 is opened during the latter part of the add-print cccle by the depression 485a on cam 485.

As has been explained in connection with FIG. 8, both solenoids 364 and 362 are included in the spare circuit. The strike circuit, however, includes only solenoid 362 and in FIG. 17 is as follows: source 444, lead 446, switches 440 and 442 and lead 448 to solenoid 428, or alternatively: source 444, lead 462, switch 454 and lead 448, to solenoid 428. In either case, the circuit from solenoid 428 includes switch 1040, the strike switch 420, a lead 492, solenoid 362, lead 490 and time-delay solenoid 228 to ground. The strike switch 420 therefore operates as any first-row key except that it includes solenoid 362 and does not operate the zero solenoid 438.

Means are provided to lock the second-row keys and light an indicator light when the "count first ball" member is set in the register that is aligned to receive the score. To accomplish this, switch 456 (FIG. 17 which, as previously mentioned, is closed by the particular "count first ball" member that is in scoring position, completes the following circuit: source 444, lead 464, switch 436, leads 466 and 468, solenoid 430 (to lock the second-row keys), switch 1041, the indicator lamp 24, a lead 493, a switch 494, a lead 495, and switch 456 to ground. Since the spare key, among others, sets the "count first ball" member (which setting should not be effective until the next frame) operation of solenoid 430 through the above circuit tends to lock the spare key down. Therefore the switch 494 is included in above circuit, so that operation of the spare key breaks the circuit by energizing the previously described solenoid 364, which opens switch 494. When the spare key is released, switch 494 recloses. However, the spare key, a second-row key, should not be operated if the "count first ball" member has been set prior to the current frame, and it cannot be operated in this case, due to locking of the second-row keys.

The "split" key closes switch 425 in the first row to directly operate a solenoid 432 to set a stop for printing the "split" mark as described later. The "chop" key also is a mark-printing key only and closes switch 427 in the second row to operate a solenoid 434 for controlling the printing of the "chop" mark. Neither of these keys initiates an operation. Each "foul" key, however, does initiate an operation since each represents a zero count. There is a difference between first-ball and second-ball fouls in the scoring. It will be remembered that the first ball score is not entered into the register (line gears 96—FIG. 3) unless the "count first ball" member is set; therefore a foul on the first ball completes the first-row circuit exactly the same as a zero score on the first ball, namely: source 444, lead 446, switchs 440 and 442, lead 448, lock solenoid 428, switch 1040, switch 424, lead 496, a solenoid 500, described later, and the time-delay solenoid 228 to ground. The first-row key switches 424 (foul) and 416 (zero) are connected in parallel to lead 496. The circuit, of course, is broken by switch 440 in the same manner as the circuit for any first-row key during sensing unless the "count first ball" member is set, in which case the by-pass switch 454 is closed to initiate an add-print cycle as previously described.

As previously stated, the zero-stop solenoid 438 pulls its stop out of the path of the units rack carrier (see also FIGS. 3, 18 and 18A) whenever any number key operates. Referring to FIG. 18A, the number solenoids 146 pull their stops 144 downward while the zero solenoid 438 pulls its stop 145 upward. These stops, including zero, are held in operated positions by a lock bar 510 whenever the latter is operated. The function of the lock bar is to preserve each first-ball setting for use in case a foul occurs on the second ball. The previously mentioned solenoid 500 (see also FIG. 17) rocks a bellcrank 514 against a spring 514a to release the lock bar and thereby release any stops 144 or 145 which have been retained by the lock bar; therefore depression of either the zero key or the first-ball foul key, both of which energize solenoid 500, releases the zero stop to its effective position.

The armature of each solenoid 146 and 438 is urged to its initial position by a respective spring 513 and 515 and has a respective latching cam 519 and 521 that cooperates with an aligned opening in lock bar 510. Energization of any solenoid 146 or 438 forces the cam 519 or 521 through the corresponding opening in bar 510, thereby forcing the lock bar to the right (as viewed in FIGS. 18 and 18A) to release any other latched armature, even though solenoid 500 is not energized. Spring 514a then returns bar 510 leftward to latch the armature of the newly energized solenoid.

A second-ball foul requires a count of the pins downed by first ball to be entered into the register (line gears 96—FIG. 3). Normally, an experienced scorekeeper would know this; however, the machine may be operated by a person who depresses a key for each ball thrown, or it may automatically receive information from the "pit" as to pins downed with each ball. The machine is therefore provided with means to automatically use the first-ball information if it already has been entered when a second-ball foul occurs. If it has not been entered at this time, the machine locks against other operation until the information as to the number of pins downed by the first ball is entered. The second-ball foul key operates in the following manner.

The second-ball foul key switch 426 (FIG. 17) connects a lead 504 in series with lead 464 and power source 444. Lead 504 is connected through a switch 506, a lead 508 and a solenoid 502 to ground. Solenoid 502 closes two switches 455 and 457. These two switches correspond to the respective switches 454 and 456 which are closed by "count first ball" member; like switches 454 and 455, they operate to maintain solenoid 428 operated or to lock the second-row keys and light the "count first ball" indicator. The circuit for locking the second-row keys and lighting the "count first ball" indicator comprises: source 444, lead 464, switch 436, leads 466 and 468, second-row lock-bail solenoid 430, switch 1041, lamp 24, lead 493, switch 494, lead 495 and switch 457 to ground. This circuit holds the second-ball foul key down and prevents any other second-row key from operating. A first-row number key may now be depressed, closing the following circuit: source 444, lead 462, a lead 463, switch 455, a lead 447, lead 448, solenoid 428, the selected switch 416 and stop solenoid 146, solenoid 438 and time-delay solenoid 228, to initiate an operation for entering the first-ball value. If, however, a first-row number key has been depressed when the first ball was rolled, the second-ball foul key closes a switch 512 in the keyboard, as hereinafter described and completes the following circuit: source 444, leads 462 and 463, switch 455, leads 447 and 448, solenoid 428, switch 1040 a lead 511, switch 512, lead 498 and solenoid 228 to ground. This initiates an add-print cycle by energizing solenoid 228. If any first-row number key had been depressed, the zero stop is locked out of the way and the number stop remains in the path of the units rack carrier to control the operation. If, however, the first-row key was a foul or a zero, then the zero stop is effective, due to the previous operation of solenoid 500 placed in the zero lead 496. As shown in FIGS. 18 and 18A, the lock bar 510 is rocked by bellcrank 514 when solenoid 500 is operated. Thus, a foul or zero on the first ball ensures that the zero stop is in its effective position. The circuit closed by switch 512 does not change the stop settings because it does not operate either the lock-bar solenoid 500 or any number-stop solenoid 156. The circuit that operates by depresion of the second-ball foul key is broken during the add-print cycle which registers the first-ball count. Follower 443 (FIG. 17) enters depression 485a of cam 485 to open switch 506 and deenergize solenoid 502, threreby opening switches 455 and 457.

Switch 512 (FIG. 17) is closed by depression of the second-ball foul key only after a first-row key has been depressed as the immediately preceding operation (and no second-row key depresed), by means described later herein.

A resistance, such as 501, may be put in any lead, such as 498, which by-passes solenoids, such as 438, normally in the circuit, in order to limit the current in time-delay solenoid 228.

Mechanism for yieldably operating the previously described member 470 to open switch 436 during both sensing and add-print operations, as described above, is shown in FIG. 8. Pivoted at 332 is an arm 532 of a bellcrank 536, arm 532 having a roller 534 cooperating with a cam driven by the add-print clutch and mounted on shaft 248. The other arm of the bellcrank 536 is pivotally connected at 542 to a link 540 which has a spring 545 connected to a stud 544 on a member 548 pivoted at 546. Stud 544 engages a slot on link 540. Member 548 has an integral arm 549 connected to member 470 by a stud 550 on member 470. Stud 550 engages a slot on arm 549. During each add-print cycle, arm 536 rocks clockwise, pulling up on link 540. This rocks member 548 counter-clockwise to pull member 470 downward. If member 470 is blocked by the tens-stop member as described, stud 544 yields in the slot in link 540 and spring 545 extends. Arm 536 also is rocked clockwise during each sensing cycle by a roller 538 on arm 536 cooperating with a cam driven by the sensing clutch.

It was previously explained in connection with FIG. 3 that the add-print cycle includes two reciprocations of stub shaft 154, and that the set stops control the extent of the first leftward reciprocation, the line gears 96 then being brought into engagement with racks 46 by counter-clockwise rocking of flatted shaft 110. The second reciprocation is for sub-total print operation. The set stops are ineffective to control extent of rack movement during the second reciprocation, but the zero stops associated with the line gears 96 control the leftward movement of their corresponding racks 46 during this reciprocation. Mechanism for engaging gears 96 and for controlling the first and second reciprocations of shaft 154 is shown in FIGS. 19 and 12, respectively.

FIG. 19 shows a follower 552 having roller 554 engaging a cam driven by the add-print clutch and mounted on shaft 248. Follower 552 is pivoted at 332 and carries an arm 556 having a stud 558 underlying a shoulder on a link 560. Link 560 is connected at 562 to a lever 564 on the flatted shaft 110. Follower 552 rocks arm 556 clockwise during each add-print cycle, thereby lifting link 560 and rocking shaft 110 counterclockwise to engage the line gears 96 (FIG. 3). Gears 96 are, under some conditions, disengaged by means described later.

FIG. 12 shows the guide plate 206 forming the slot 160 for stub shaft 154 which, when moved downward, disables the various stop interponents as previously explained. Means for moving plate 206 and shaft 154 downward include a follower 566 having a roller 567 engaging a cam driven by the add-print clutch and mouned on shaft 248. An arm 565 is integral with follower 566 and pivoted to a link 570 at 568. Link 570 is pivoted to plate 206 at 570a and moves plate 206 downward when follower 566 is rocked counterclockwise. Slotted supports for plate 206 on a pair of fixed studs 571 and 172 ensure parallel-plane movement of the plate.

Keyboard Structure

The keyboard shown in FIG. 2 has been described as to operation, response and conditioning. Its internal structure is shown in FIGS. 36 and 36A. The first-ball keys 20 and second-ball keys 22 are guided at the top of the keyboard by a plate 1042 and at the bottom by a plate 1044. Each pair of keys is urged upward by a spring 1046 mounted on a shaft 1047 which is supported by plate 1044. One end of spring 1046 engages a stud 1048 of a key stem in the first row and the other end of the spring engages a stud 1050 on the stem of the corresponding key in the second row. Each key closes a respective switch, as shown in FIG. 17, the switches of the first row being designated generally as 416 and those of the second row being designated generally as 418.

Each closed switch 416 or 418 completes a corresponding circuit to illuminate a respective indicator 32 in the keyboard. The closing of any switch circuit in the first row operates a lock-bail solenoid 428 (FIGS. 17 and 36A), and the closing of a switch circut by any second-row key operates a lock-bail solenoid 430.

Solenoid 428 pulls upward on an arm 1052 of a bell-crank which forms one end of a lock-bail 1054, the latter being supported on a pair of studs 1055 at each end thereof. Bail 1054 extends across the keyboard and cooperates with all keys of the first row. Operation of solenoid 428 moves bail 1054 clockwise (as viewed in FIG. 36A) against the stems of the first-row keys. The stem of each number key in the first row has a respective projection 1058 and, as shown in FIG. 36 wherein one key is shown in depressed position, bail 1054, when rocked clockwise, overlies projection 1058 of the depressed key and underlies projections 1058 of the remaining keys. Therefore, depression of a first-row key is effective, through operation of solenoid 428, to hold down the depressed key and lock all other first-row keys in their upward positions until the switch circuit is broken by means previously described.

The second-row keys operate in the same manner by means of solenoid 430 (FIGS. 36A and 17) which operates a lock bail 1056 for locking the second-row keys.

The release key 42 is pivoted at 1060 (FIG. 36) and operates to break either the first-row or the second-row switch circuit by means of an arm 1062 extending under a pair of normally closed switches 1040 and 1041, shown in FIG. 17. Each of the latter switches, which are in series with the respective solenoids 428 and 430, releases a respective lock bail 1054 or 1056 upon being opened by the release key and, because of the time delay previously described, prevents the operation of the sensing clutch if key 42 is depressed before the end of the delay time.

The "split" key 35 and "chop" key 34 (FIG. 36B), as previously explained, do not initiate operation of the machine. They do, however, close switches 425 and 427, respectively, (see also FIG. 17), for print control purposes previously described. Each key 34 or 35, when depressed, becomes latched and remains depressed until an operation-initiating key 416 or 418 is depressed and released. The stems of keys 35 and 34 do not have fixed projections, as do the other keys, but each carries a respective latch 1064 and 1070. Latch 1064, on the stem of the split key 35, is pivoted at 1066 on the stem and is urged counter-clockwise (FIG. 36B) by a spring 1068. Depression of key 35 permits an upper shoulder 1063 on latch 1064 to rock under plate 1042 to hold the key down, as shown.

Operation of a first-row number key 20 (FIG. 36) to record the number of pins downed when the split occurred operates bail 1054 as previously described. Bail 1054 has a cut-out section of its horizontal working surface in the area of key 35 (FIG. 36B). This surface is replaced by an ear 1074 on a lever 1076 pivoted on one of the studs 1055 and urged counter-clockwise by a spring 1077. Clockwise rocking of lever 1076, as described later, causes ear 1076 to contact latch 1064, thereby rocking the latch clockwise and releasing the latch from plate 1042. However, after a slight upward movement of the key stem, a lower shoulder 1072 on the latch contacts ear 1074 and the key is prevented from rising until lever 1076 rocks counter-clockwise. The slight upward movement of the key stem, already permitted at this time, prevents the upper shoulder 1063 from re-latching on plate 1042.

The split key operates, as explained, to print a "split" symbol and therefore may be accompanied by depression of either a first-row number key (if the first-ball pins should be counted) or a second-row number key. The operation of lever 1076 to hold the split key down for printing of the "split" symbol and subsequent release of that key may be accomplished by either a first-row or a second-row numeral key, or the split key may be released by depression of the release key. Bail 1054, as previously described, is operated whenever a first-row key is depressed; therefore, lever 1076, being positioned as substantially a part of the bail, is rocked by the formed portion of the bail against the tension of spring 1077a. Lever 1076 is pivotally connected to a link 1078 at 1077. Link 1078 has a slot embracing a stud 1080 which is mounted on an upper arm of a bellcrank 1082 pivoted on one of a pair of studs 1057 which support the second-row lock bail 1056. Operation of the second-row lock bail 1056 causes the latter to contact and rock bellcrank 1082 clockwise and is effective, therefore, through stud 1080 and link 1078, to rock lever 1076 clockwise to hold (for printing) and subsequently release the split key.

The operation of the release key also releases the split key through operation of bellcrank 1082. A link 1088 pivotally connected to the release key arm 1062 is also connected to bellcrank 1082 by means of a stud 1087 located on bellcrank and engaging with a slot 1086 on link 1088. Downward movement of link 1088, upon depression of the release key, rocks bellcrank 1082 clockwise, and by means of stud 1080 and link 1078, rocks link 1076 clockwise.

Bellcrank 1082 has an ear 1084 adapted to contact and release the latch 1070 on the "chop" key 34. Latch 1070 operates in the same manner as latch 1064 described in connection with the split key, and normally is released by the second-row lock bail 1056 which contacts a lower shoulder 1089 to hold key 34 for printing when a second-row numeral key is depressed for operation. Clockwise rocking of bellcrank 1082 releases key 34 by contact of ear 1084 with latch 1070, if the release key 42 is depressed as previously described.

To review, the "split" key is released by depressing either a first-row or a second-row number key, or by depressing the release key. The "chop" key is released by depressing either a second-row number key or the release key. The respective symbols are printed during the sensing cycle when either first-row or second-row number key is depressed.

Mechanism is provided automatically cycling the machine upon the occurrence of a second-ball foul, as described in connection with switch 512 and shown on FIGS. 17 and 36C. When a second-ball foul occurs, switch 512 is closed if a first-row number key had been depressed previous to the depression of second-ball foul key. The machine then cycles and the fist-ball key will have operated a stop by means of one of the solenoids 146 and will have left the stop in its effective position. Therefore, cycling of the machine enters the selected amount into gears 96 (FIG. 3). If, however, no first-row number key was depressed, the "count first ball" light indicates that this should be done, as described. The mechanism for closing switch 512 is shown in FIG. 36C.

A member 1090 is pivoted within a slot by a stud 1091. A spring 1094 tends to hold member 1090 leftward and also to lightly urge it clockwise about pivot 1091. An ear 1092 on member 1090 normally rests on the bottom plate 1044 to maintain member 1090 in the position shown. Operation of any first row key rocks bail 1054 clockwise about pivot 1055, as previously described. Bail 1054 contacts member 1090 and moves it rightward and ear 1092 drops over the edge of plate 1044, as shown by dotted lines. Member 1090 is therefore latched rightward each time a first-row number key is depressed. Member 1090 is released for leftward movement, whenever a second-row number key is depressed, by a stud 1095 on the arm of solenoid 430 (second-row lock bail) which moves upward whenever solenoid 430 is operated. Stud 1095 contacts member 1090 to rock it counter-clockwise and remove ear 1092 from engagement with the edge of plate 1044, and allow leftward movement of member 1090 by spring 1094. Member 1090 is therefore rightward (dotted line position) after any first-row number key is depressed and leftward after any second-row number key is depressed.

Member 1090 has an ear 1096 overlying an interponent 1098 pivoted at 1100 on the second-ball foul key 37. Interponent 1098 is lightly urged counter-clockwise by a spring 1102, and when member 1090 moves rightward, interponent 1098 is permitted to rock counter-clockwise to its dotted line position. The depression of the second-ball foul key when member 1090 is in this position closes switch 512 by means of a lower surface 1104 of interponent 1098. A small tip 1105 is provided on the interponent to prevent the removal of the interponent from engagement with switch 512 when solenoid 430 operates as a result of depressing the foul key 37. If it were not for tip 1105 on interponent 1098, operation of solenoid 430, which releases member 1090 from its latched position, would cause spring 1094 to pull the interponent out of engagement with the switch. Release of the key 37 restores member 1090 and interponent 1098 to normal. Depression of the second-ball foul key without having first depressed a first-row number key (member 1090 leftward) causes interponent 1098 to miss switch 512 and leave it open. Subsequent depression of a first-row key is ineffective to close the switch because interponent 1098 is then on the left-hand side of the switch. Both lock bails (solenoid 428 and 430) are operated but member 1090 does not latch rightward because stud 1095 is in its upward position.

Printing Mechanism

Printing of marks, as explained, occurs during the sensing cycle and printing of scores occurs during the add-print cycle. As previously explained, a frame is completed in one sense if all pins are knocked down with one ball, or otherwise when two balls are thrown. The score, however, is sometimes not determined until subsequent frames, so that in another sense the frame, or more properly the frame score, is not completed until the score is determined for that frame. The marks are to be displayed as the game progresses because it is not necessary for the score in a frame to be determined before displaying information regarding the marks of that frame.

The printing mechanism of this invention may be adapted to control print on strips each to constitute a line and may readily be adapted to control remote printing on complete sheets for display or record but for maximum utility, the adaptation now provided is for printing on small bits of metal or plastic, not intended to be disposable but cheap enough so that they can be. They are thick enough in cross section to provide for a groove on each side for guidance and retention in a frame. The surface is highly reflective and originally placed in two hoppers, from which they are introduced one at a time for printing of the mark or the score. After printing thereon they are dropped into a conveyor which carries them to the proper "line" guide of the display rack and are released to form the line score of the individual players. Two pieces, one containing the "mark" print and one the "score" print form one "frame" for one bowler and 10 such mark and score pieces in a vertical line constitute the score, frame by frame of each player. In addition to this a second printing of the individual scores is provided for a separate record of the individual scores and a printing of the team scores is also provided at each line to display the sum of the completed scores at each line position as each player completes his game. There are actually twelve printed "frames" in each line, and it is possible to get twelve marks including bonus throws for the last frame, if a strike, therefore both mark and score pieces are provided in the last two places. The vertical line positioning is provided to take advantage of gravity and the lines are turned for horizontal display by the optical system.

It is anticipated that the ink used will be of a type which will deposit rather heavily on the smooth surface of the individual "pieces" without smearing or running and to effectually block the reflection of the light for projection. After removal of the display rack from the machine the scores may be "lifted" from the pieces by applying the sticky side of transparent tape or an entire sheet of adhesive coated transparent material to the printed face of the pieces. Some of the ink adheres to the sticky side of the tape and the tape is then placed on a paper or in a book to provide a permanent record of the scores without separate copying. It was found in practice that the well known cellophane transparent tape may be used for the "lifting" or transferring of certain inks or carbon from certain types of surfaces to provide as many as three separate legible copies.

After obtaining the copies desired in the manner described the printed pieces may be cleaned with a solvent either before or after removing from the display rack. The record pieces are approximately twice as long as they are wide, with the mark piece and the score piece together forming a substantially square area for each frame of the scoring line for each player. The rack containing these record pieces is continuously illuminated and an image is projected on a screen. The display rack is positioned vertically as mentioned previously and the printed pieces which fall into place in the scoring lines by gravity are therefore "stacked," one adjacent to the other, to "build up" a scoring line and all printed information is immediately viewable.

The entire machine, when used to print individual pieces positioned by gravity for display, is intended to operate in a vertical position and is placed in the cabinet in a location described later. The racks shown in FIG. 3 will then move down and up in a vertical plane instead of the right to left reciprocation as described. The left side of FIG. 3 is positioned downward.

The control and printing of the individual record pieces will now be described. FIG. 21 shows the mark-printing mechanism and FIG. 22 the score-printing mechanism. Both printing mechanisms are operated by a print clutch which is engaged both during the sensing cycle and during the add-print cycle. The print clutch 586 (FIG. 21) is mounted on a rotating shaft 588 and when engaged, drives several cams to perform various functions. The clutch pawl 584 is pivoted on a shaft 580 which is rocked clockwise, to engage clutch 586 and thereby initiate each print cycle.

In order to actuate the clutch pawl 584 for engaging the print clutch 586 during the add-print cycle, shaft 582 (FIG. 8) carries an arm 658 having a follower 660 engageable with a cam on shaft 248 which makes one revolution for each add-print cycle. Referring to FIG. 21, the shaft 582 also has an arm 774 thereon. The arm 774 has a pivotal connection at 597 to a link 593. In turn, the link 593 has a slot 591 which receives a pin 589 on the print clutch pawl 584. This motion-transmitting means will function such that when the shaft 582 is rocked by the cam on shaft 248, the arm 774 is rocked, and link 593 will move the pawl 584 in a clockwise direction resulting in engagement of the print clutch during the add-print cycle.

As set forth above, the print clutch pawl 584 is pivoted on shaft 580, and such shaft also carries a fixed arm 585 having a tab 587 adapted to actuate the print clutch pawl 584 at other times. The pin-in-slot connection 589,591 functions to allow operation of the print clutch pawl 584 by the shaft 580 while the pin 589 moves in the slot 591 without causing motion of the link 593 and the arm 774. The pin-in-slot connection also permits the shaft 582 to operate the print clutch psel 584 without causing movement of the arm 585 and the shaft 580.

A series of mark-print members 590 (FIGS. 4 and 21) are normally retained in the positions shown by respective springs 592. Members 590 are mounted in two carriers 594 and 595 which are yieldably moved leftward by a pair of springs 596 and 597, respectively, (see also FIG. 23), which springs are connected to a shaft 598. Shaft 598 is moved leftward during each cycle of the print clutch 586 by a follower 645 (FIG. 23) which engages one of the cams driven by clutch 586. Follower 645 is pinned to a shaft 634. A lever 647, also pinned to shaft 634, pulls a link 605 leftward during each print-clutch cycle when shaft 634 is rocked by follower 645. Link 605 is connected to shaft 598 and pulls the latter leftward with it.

A series of numeral-print members 574 (FIG. 22) have individual springs 578 by which they are normally maintained in the positions shown. Members 574 are mounted in four carrier extensions 576 which are integral with the respective rack carriers 42 (FIGS. 3, 3A and 4), there being one carrier extension 576 for each ordinal rack 42 connected by forms 600 (see FIGS. 3, 4 and 14), so that movement of a rack carrier 42 also moves the corresponding carrier 576 (FIG. 22). The record pieces 602 and 603, for mark printing and score printing, respectively, are positioned for printing in a plate 604 by means described later.

There are two mark-print hammers 606 and 608 (FIGS. 4 and 21) and four numeral-print hammers 610 (FIGS. 4 and 22) all pivoted on a shaft 620 and all operated by the same mechanism and in the same manner. The two mark-print hammers 606 and 608 may be blocked by a plate 612 (FIGS. 21 and 23) under conditions described later; similarly, hammers 610 may be blocked by a plate 614. All of the hammers are spring-driven clockwise to the positions shown in FIGS. 21 and 22 with the actual printing being accomplished through inertia resulting from the drive imparted by the hammers through respective ears thereon, to the top surface of the aligned mark-print members 590 and numeral-print members 574. The drive for all hammers is provided by a stub shaft 616 mounted in a pair of bellcranks 618 forming a frame which is urged clockwise about shaft 620 by a spring 622. Shaft 616, which overlies the hammers, is limited in its clockwise movement by a pair of fixed stops 630 (FIGS. 22 and 23). Each hammer 606 and 608 is individually secured to a shaft 624 by a light spring 626 secured to a respective stud 628 on the hammer.

In operation, shaft 616 is rocked counter-clockwise by a follower 632 (FIGS. 21 and 23) engaging cam which is driven by the print clutch 586. Follower 632 is pivoted on shaft 634 and is integral with a lever 636 which is linked to one of the bellcranks 618 by a link 640 pivotally secured to lever 636 at 638, and to bellcrank 618 at 642. Counter-clockwise rocking of follower 632 about pivot 634 causes counter-clockwise rocking of bellcrank 618. The print cam which drives follower 632 is shaped such that there is a "dropoff" from the high of the cam. Spring 622 therefore causes sudden clockwise movement of stub shaft 616 against limit stop 630. Those print hammers which are not blocked by plates 612 and 614 strike the aligned mark-print members and numeral-print members for printing.

There are two print-hammer reciprocations in rapid succession during each print operation, i.e., there are two reciprocations during the mark printing in the sensing cycle and two more reciprocations during the score printing in the add-print cycle. The first reciprocation during either mark printing or score printing is for the purpose of inking the printing faces of members 590 or 574, respectively, and the second is for printing on the individual record pieces.

As previously mentioned, the record pieces to be printed are mounted on a plate 604. This plate is moved rightward by means of a follower 644 (FIG. 22) engaging a cam that is driven by the print clutch 586 and pivoted on the shaft 634. An arm 646 integral with follower 644 extends into a slot 648 in plate 604. An ink pad 650 is positioned in line with the faces of members 574 and 590. Plate 604 is moved rightward by counter-clockwise rocking of follower 644 and moves the record pieces to be printed out of the path of members 574 and 590. The record pieces to be printed are in individual holders 652 and 654 in special mountings pivoted at 602a and 603a respectively in plate 604. A top view of the relative positions of the holders 652 and 654 is shown in FIG. 24. The printing positions of the holders are shown in solid lines, with broken-line positions designated as 652a and 654a showing the positions at which operation of the print hammers causes the print members 574 and 590 to strike the ink pad as the plate 604 which carries the pieces is upward from position of FIG. 24 (rightward from position in FIGS. 21 and 22) and the pieces are out of the path of the type and the ink pad remains in stationary position.

The printing of the scores (FIG. 22) occurs during the add-print cycle. Blocking plate 614 (see also FIG. 23) is moved rightward by a lever 656 secured to a shaft 582 and operated by a follower 658 (FIG. 8) having a roller 660 engaging a cam that is driven by the add-print clutch on shaft 248. Lever 656 (FIG. 22) has a slot at its upper end engaging a stud 657 on an ear of plate 614 which, as best shown in FIG. 23, is effective to block and disable the numeral-print hammers 610. Plate 614 has a pair of slots through which it is guided by respective studs 662 and 664 on a frame member (not shown). The print hammers operate for score printing during their second reciprocation in the add-print cycle. At such time, the upper racks 46 (FIG. 3) are limited by the zero stops 114 associated with the line gears 96 and therefore print ordinal values corresponding to the displacement of the gears from zero. A nose 607 on each mark-print hammer 606, and a nose 611 on each numeral-print hammer 610 strikes whichever number printing member 590 or 574 is in alignment at the time the respective print hammers are reciprocated.

The mark-printing (FIG. 21) is performed and controlled as follows: blocking plate 612 is operated by clockwise rocking of a lever 666 having a slot engaging a stud 667 on plate 612. Lever 666 is secured to a shaft 580 that is rocked clockwise by a cam follower 668 (FIG. 8) having a roller 669 engaging a cam which is driven by the sensing clutch. Plate 612 (FIGS. 21 and 23) blocks the mark-print hammers 606 and 608, as previously mentioned. One of the two previously mentioned mark-print carriers, namely carrier 595 (FIG. 23) is associated with first-row keys only and carries two printing members 590, for "split" and "foul," respectively. These marks are printed to the left of the position where other marks are printed, i.e., they are printed in the upper lefthand corner of a printing frame. Either of these two marks may result in a spare; in this event both signs appear on the printed record piece to indicate that the bowler either converted a "split" or a "spare" or knocked all ten pins down following a first-ball foul. The printing of the first-ball indicia at the left also designates on the record whether a foul was a first-ball or second-ball foul. Carrier 595 does not cause any printing unless it is stopped substantially in the position shown by a "foul" stop 70 (FIGS. 21 and 23) operated by solenoid 500 (FIG. 17), or, unless it is stopped by a "split" stop 672 (FIGS. 21 and 23) operated by solenoid 432 (FIG. 17) as previously described. If neither stop is interposed, carrier 595 is blocked by a final stop 674 and no printing member 590 is under the hammer in this position.

The second mark-print carrier, i.e., carrier 594, carries five printing member 590 for the following marks: spare, strike, foul, chop and miss. It will be recalled in connection with FIG. 8 that solenoid 362 operates to position the tens-stop member 162 (FIGS. 3 and 3A) in response to either a strike or a spare while solenoid 364 operates only in response to depression of the spare key. These solenoids are linked with a pair of stops 676 and 678 (righthand side of FIG. 21), respectively. The stop members are pivoted to a bracket 675a and have extensions 676a and 678a which cooperate with solenoids 362 and 364, respectively. Stop 678 when operated, holds carrier 594 substantially in the position shown, where the print type indicating a "spare" is under hammer 607. In this case both stops 676 and 678 are interposed but stop 676 is ineffective. The depression of a strike key, however, interposes only stop 676 and this stop positions carrier 594 to print the "strike" mark. A stop 680 (lefthand side of FIG. 21) for the second-ball "foul" mark is positioned by solenoid 502 (FIG. 17), previously described, and a stop 682 (FIGS. 21 and 23) for the "chop" mark is operated by solenoid 434 (FIG. 17). If the carrier is allowed to go to the extreme stop 674, a short, horizontal dash is printed to signify a miss.

Display

As previously stated, all mark printing is done during the sensing cycle. The printed mark pieces, however, are not released for display until a frame is completed, (strike or two balls bowled). Mechanism for feeding and releasing the individual pieces is shown in FIG. 24. Two hoppers 684 and 686 are provided to hold the mark pieces 602 and the score pieces 603, respectively.

Record pieces 602 and 603 are identical. The pieces are yieldably pulled into a pair of guides 688 and 690 from the bottom of the stack in the hoppers by a hook 692 (only one is shown) pivoted at 698 on a slide 700 supported by a guide not shown. The slide 700 is urged rightward by spring 696 but retained by ear 700a against plate 718. Each cycle of the print clutch 586 moves a lever 702 (FIG. 22), secured to shaft 634, counter-clockwise by the follower 702a pivoted on shaft 634 and integral with lever 702. A twisted link 704 pivoted to lever 702 at 706 is moved to the right as viewed in FIG. 22, or upward as viewed in FIG. 24. Link 704 is connected at 708 to a bellcrank arm 710. As shown in FIG. 24, bellcrank 710 which is pivoted at 715, carries a stud 712 on an arm 714, and through a slot 716 in a plate 718, which slides on frame members, stresses a pair of springs 696 and 697 which tend to pull the two hooks, such as 692, to the right and thereby to pull the record pieces into the guides and respective holders. Guides 688 and 690 are shaped to turn the pieces 90° to enter complementary-shaped holders 652 and 654 (see also FIGS. 21 and 22) in a position to be printed. This action occurs only when plate 604 is in the position where the holders are aligned with the guides. In this position of plate 604 the printing members are inked in the manner previously described. Plate 604 is then moved downward, as viewed in FIG. 24 and as previously described, and the printing occurs. If a score piece or mark piece was not released during the previous operation, the movement of plate 718 to the right will stress spring 696 or 697. The action provides a piece in printing position at all times.

The score pieces are released any time an add-print cycle occurs and, as shown in FIG. 24, holder 654 is turned 90° by rightward movement of a link 720 which is guided on a fixed stud 722 and pivotally connected at 724 to a lever 726 pivoted at 728. The top of lever 726 has a slot which engages a stud 730 on the holder 654. The latter holder is pivoted at its center as described later, and clockwise movement of lever 726 results in a 90° counter-clockwise rotation of holder 654 about pivot 603a. This permits the numeral record piece to drop into a channel 732.

The mark pieces are dropped by a similar link 734 which is pivotally connected to a lever 740 by a stud 736 and guided through a slot by a fixed stud 738. Clockwise rocking of lever 740 through slot contact with a stud 746 on holder 652 rocks that holder 90° counter-clockwise about its center and permits the mark piece to drop into a channel 748.

Members 720 and 734 are operated by linkage shown in FIG. 23. A bellcrank 754 pivoted at 756 is rocked counter-clockwise during each cycle of the print clutch 586 by a twisted link 766 connected to a cam follower 769 by a bail 635 which has arms pivoted to link 766 and to follower 769. Follower 769 engages a cam driven by the print clutch 586. Two members 758 and 760 are pivoted at 756 and individually urged against a stud 762 on bellcrank 754 by a spring 764 on member 760 and a similar spring (not shown) on member 758. As bellcrank 754 rocks counter-clockwise, both members 758 and 760 (see also FIG. 21) tend to rock counter-clockwise but each may be blocked by a blocking member 770 or 768, respectively. Normally, a tail 772 of member 758 and a tail 773 of member 760 are held slightly away from the blocking members 770 and 768 by the blocking position of stud 762. It will be seen that if the blocks 768 and 770 are removed, lever 758 (FIG. 23) moves link 720 and lever 760 moves link 734 when bellcrank 754 is operated and, as described, releases the printed record pieces.

Mechanism for blocking the respective tails 772 and 773 of levers 758 and 760 is shown in FIG. 21. It will be recalled that operation of the print clutch 586 occurs during both a sensing cycle and an add-print cycle. A score piece is invariably released during an add-print cycle. Shaft 582, which rocks clockwise during each add-print cycle, carries a lever 774. The end of lever 774 constitutes the previously described member 770 which normally li ; in the path of member 758; therefore, cockwise ' cking of shaft 582 during an add-print operation releases lever 758 to drop the printed piece by operation of the print clutch 586.

A mark piece is released during sensing when a strike or spare key initiates the sensing since the frame is complete even though the score is not. Mechanism for relesasing the mark pieces includes means for removing the block 768 (FIGS. 21 and 23) from the path of tail 773 of mark-release lever 760. It will be recalled that lever 366 (FIG. 8) pivoted at 360 rocks counter-clockwise to advance a tens-stop member 162 (FIG. 3) through latch 190 each time a strike or spare key is depressed. Lever 366 has a stud 378 (FIGS. 21 and 23) engaging a slot in a member 776 whose tip constitutes the previously described block 768. Block 768 is normally held in the path of lever 760 by a spring 780 secured to the lever and to a fixed stud 781. Counter-clockwise rocking of lever 366 moves block 768 to the right and permits the print clutch 586 to release a printed mark piece during the sensing cycle in the manner described above. If neither a strike nor a spare is made, the mark piece is released later during the add-print cycle during which the score of that frame also is recorded. A mark piece is therefore released during an add-print cycle only if that cycle occurs with the tens-stop member 162 adjusted to zero. It will be recalled in connection with FIG. 8 that stud 550 is moved downward during sensing or an add-print operation if the tens-stop member 162 (FIG. 3) is adjusted to a zero. Stud 550 (FIG. 21) overlies an ear 782 of a lever 784 pivoted at 786. The right end of lever 784 terminates in an ear 788 which underlies an interponent 790 pivoted at 792 on lever 774, which lever rocks clockwise during add-print operations. Interponent 790 has an ear 794 which in its upward position, as shown in FIG. 21, abuts a shoulder 795 on block 768. Clockwise rocking of lever 774 during an add-print cycle with lever 784 counter-clockwise (the tens-stop member at zero) therefore causes interponent 790 to move block 768 to the right, thereby permitting lever 760 to release a printed mark piece (printed during sensing but not released because neither a strike nor a spare was entered).

As previously described, the carriage is moved into position relative to each scoring line by turning knob 14 (FIG. 1) on the table. The carriage 800, as shown in FIG. 4, is mounted on a threaded shaft 108 by which it is laterally driven through a pair of collars 796 and 798. As previously explained, each set of three gears 96 may be brought into alignment with the actuating racks 46. Each score piece printed from a particular set of three gears must be placed in the display line represented by that set of gears in order to display the score for each player. It was previously explained in connection with FIG. 24 that the printed record pieces are dropped into channels 732 (for scores) and 748 (for marks).

FIG. 25 shows the channels 732 and 748 in alignment with a carrier 804. This carrier is provided for transporting each printed record piece to the proper display line and is supported on a screw shaft 806. As shown in FIG. 26, carrier 804 also is supported for lateral movement on a shaft 812. The carrier has two compartments 808 and 810 slightly offset from each other and aligned with the correspondingly offset exits from channels 732 and 748, respectively. Carrier 804 is positioned by the print clutch 586 by means described later, and is in position to receive either mark pieces or score pieces or both. These are maintained in the compartments by a bottom plate 814 (FIG. 26) held in position by a spring 815 secured at 816 to the carrier.

A frame 818 which is removable and is, in effect, the "score sheet," has a series of line guides 820 and 822 (FIG. 25), two for each line, corresponding to "score" and "mark," respectively, which are slightly offset from the vertical to receive the record pieces from carrier 804 and guide them between the proper line guides. Frame 818 is supported by a frame plate 823 (FIG. 26) which also has two or more brackets 825 for supporting a shaft 824. A series of levers 826 are pivotally mounted on shaft 824, one lever 826 being aligned with each score line of plate 823. Each lever 826 has a nose 827 capable of extending through a respective aligned slot 829 in the frame plate 823 at the position of the score piece representing the ninth frame of the corresponding scoring line. Levers 826 control a special tenth frame clutch, described later.

Carrier 804 is normally positioned at the scoring line represented by the position of the selected register comprising a group of three gears 96 (FIG. 4), and is so positioned by the line-carriage-positioning means. During operation of the print clutch 586 (FIG. 23), however, the carrier is brought into alignment with the stationary channels 732 and 748 (FIGS. 25 and 26) to receive the printed record pieces. At the completion of the print operation carrier 804 is returned to the proper line position and the most recently printed record piece is dropped into the guides by clockwise rocking, as described hereinafter, of a pair of levers 836a (FIG. 26) freely pivoted on a shaft 884. A bail 832a, which is integral with levers 836a and which extends across the area of travel of carrier 804, is thereby moved leftward (FIG. 26) to pull plate 814 leftward so that it will not block the exits from compartments 808 and 810. Mechanism for accomplishing this is shown in FIGS. 27, 28 and 29.

As shown in FIG. 27, a gear 838 on the carriage-positioning screw shaft 108 (FIG. 4) is in mesh with a gear 840 (FIGS. 27 and 28) freely turning on a hub 862 which is rotatably mounted on a shaft 842. Gear 840 carries a stud 844 riveted to it. Freely mounted on shaft 847 is another gear 846 in mesh with a small gear 848 on screw shaft 806 (see also FIG. 25). Gear 846 carries a stud 850 which is also secured to a camming plate 852 (FIG. 29) described later. The two studs 850 and 844 are normally aligned, as shown in FIG. 28, by a pair of centralizing arms 854 and 856, both of which may contact both studs 850 and 844. Centralizing arm 854 is secured to shaft 842 (FIG. 27) while centralizing arm 856 is integral with hub 862 which is free to rotate on the shaft. A second hub 864 is pinned to shaft 842 by a pin 843 through a slot in hub 864 which permits limited lateral movement of that hub along the shaft. Hub 862 has a V-shaped projection normally engaging a V-shaped depression in hub 864, as shown at 866 in FIG. 27. Hub 864 is urged leftward (FIG. 27) by a spring 868 which is limited by a washer 869 that engages a pin 870 extending through shaft 842.

The two centralizing levers 854 and 9856 are urged in opposite directions by a torsion spring 859, one end of which is secured to a stud 858 on a plate 857 which is integral with hub 862. The other end of spring 859 is secured to a stud 860 on a disc 890 which is integral with hub 864, thereby providing a scissors centralizing action (see FIG. 28) which is effective if the studs 850 and 844 are displaced rotationally relative to one another. Normally, the two studs 858 and 860 are aligned and the V notch and nose 866 are in the positions shown.

Turning gear 838 (FIG. 27) to position the line gear carriage 800 (FIG. 4) causes a similar positioning of carrier 804 (see also FIG. 25) by rotating gear 840 (FIGS. 27 and 28), studs 844 and 850 (which remain aligned), gear 846, gear 848 and shaft 846.

Mechanism is provided to align carrier 804 with channels 732 and 748, as previously mentioned. In FIG. 27 it is recalled that cam 852 is integral with gear 846 by means of stud 850. Cam 852 is shown in FIG. 29, where it will be seen that its radius steadily increases on both sides of the shortest radius point 877. In the position of cam 852 shown in FIG. 29, gear 846 is at an angular position such that carrier 804 is located under channels 732 and 748 to receive the printed record pieces. Cam 852 and gear 846 are brought to this angular position by a roller 876 on a lever 872 pivoted at 874 and rocked counter-clockwise by a lever 878 and a link 880 operated by a cam follower 881 (FIG. 23) engaging a cam which is driven by the print clutch 586. At the termination of this operation, the scissors-centralizing spring 859 (FIG. 27) returns stud 850 into alignment with stud 844. In other words, no matter where carriage 800 is positioned, carrier 804 also is in that "line" position except during operation of the print clutch 586, at which time the carrier is in position to receive the printed record pieces. Upon termination of the operation of the print clutch 586, carrier 804 is spring-returned to the proper scoring line and releases the most recently printed record piece.

Mechanism for controlling the release of the printed record pieces is provided as follows. Shaft 884a (FIG. 26) serves as a limit to extensions 892a of levers 836a pivoted on shaft 884. Arms 892a are urged against the shaft 884a by spring 882a. Shaft 884a has a flat portion in the area of contact which normally allows arms 892a and levers 836a and bail 832a to assume a position clockwise from that shown with bail 832a holding plate 814 leftward. In the position shown in FIG. 26, lever 836a stands rotated counter-clockwise from its normal position, thereby retaining the record pieces in carrier 804 by allowing rightward movement of plate 814 by spring 815. Mechanism for rocking shaft 884a and therefore lever 836a to this position is shown in FIG. 27. It was previously explained that hub 862 and 864 normally tend to stay in the relative angular positions shown. Any relative displacement of these hubs causes a rightward movement of hub 864 (as viewed in FIG. 27) since the V projection 866 on hub 862 is moved out of the V notch in hub 864. The rightward movement of hub 864 moves disc 890 rightward. A bellcrank 886 pivoted at 888 has one arm positioned against disc 890 and the other arm under a lever 892 keyed to shaft 884a. Therefore, whenever the hubs 862 and 864 are relatively displaced, shaft 884a (FIG. 26) is rocked to the clockwise position shown, to retain the printed pieces when the carrier is out of aligned position with the correct individual line to receive the score or mark.

The shaft 884a (FIG. 26) is normally retained in position with the flat portion in contact with arms 892a by means of a torsion spring 886a shown in FIG. 27. This spring contacts a stud 870a on one end and the other end is limited against shaft 842.

Tenth-frame Operation

Shaft 884 is controlled for counter-clockwise movement from the position shown in FIG. 26 by means of a lever 885 and a link 887, for the purpose of initiating operation of the tenth-frame clutch, the function of which is described later. As previously mentioned, lever 826 in each line has a nose 827 positioned at that point in the score frame (which holds the printed record pieces) where the ninth-frame score piece is located after it is printed and released.

The tenth-frame clutch is engaged during the first part of an add-print cycle for any line in which there is a ninth-frame printed scorepiece. In other words, the actual printing of the tenth-frame score is determined to be the tenth frame by the presence of a printed score piece corresponding to the ninth frame of that line at the start of the add-print cycle.

The means for operating the tenth-frame clutch are shown in FIG. 26 and FIG. 11. FIG. 26 shows the ordinal sensing levers 826. That lever 826 which is aligned with carrier 804 is rocked clockwise about shaft 824 during each add-print cycle by the counter-clockwise rocking of lever 836 which, by means of shaft 832, pushes a pin 830 against an ear 828 of the aligned lever 826. Pin 830 is urged to the left, as viewed in FIG. 26, by a spring 834. The counter-clockwise rocking of lever 836 is caused by a lever 885 and a link 887, as shown in FIG. 11.

FIG. 11 was described in connection with typical clutch operation but actually shows the tenth-frame clutch, including the operating linkage. Link 887 (see also FIG. 26) is shown in FIG. 11 as being pivotally connected at 889 to a lever 883. Lever 883 is pivotally connected at 895 to a lever 891 and has a slot embracing a stud 890 on the clutch pawl 719. Lever 891 is integral with a shaft 893 which also has a cam follower lever 897 integrally secured to it. A cam 899 driven by the add-print clutch contacts a roller 871 on lever 897 to rock shaft 893 counter-clockwise. This action rocks lever 891 counter-clockwise to raise pivot 895 and pull up on link 887. When this movement is not blocked, link 883 pivots on stud 890; however, if movement of lever 887 is blocked, lever 883 pivots at 889 and pin 890 is pulled downward, thereby rocking clutch pawl 719 counter-clockwise about pivot 232 which rocks pawl 719 counter-clockwise to cause engagement of the tenth-frame clutch. The blocking of the upward movement of link 887 occurs if a printed record score piece has been placed in the ninth frame of the particular line by the mechanism described in FIG. 26. The presence of a printed record score piece in the ninth frame of a line therefore serves to initiate the operation of the tenth-frame clutch.

The purpose of the tenth-frame clutch is to control the totalizing of the individual bowlers's scores and the printing of the sum as each line is completed, as well as to clear the individual scoring registers and normalize the tens-stop member and the "count first ball" member associated with each line, and to perform other functions associated with game completion, including the transmission of a signal to reset the pins if the invention is used with an automatic pinsetting device.

It has been explained in connection with FIG. 14 that the drive for the tenth-frame clutch is through gear 290 which is integral with hub 291 pinned to shaft 248, and that shaft 248 rotates once during add-print operation. Gear 290 meshes with a gear 292 and the ratio of the gears is such that gear 290 makes 2.5 rotations for each rotation of the drive gear 290 for the tenth-frame clutch.

The reason for the 2.5 to 1 ratio of the drive for the tenth frame clutch is that there is provided three add-print cycles of operation for completion of the 10th frame functions. The tenth frame clutch being driven by the add-print clutch must have completed its functions to be disengaged with or prior to the disengagement of the add-print clutch to be free at the start of the next add-print cycle. Furthermore the add-print clutch must initiate the operation of the 10th frame clutch and would therefore have started a cycle before picking up the drive members. The 2.5 to 1 ratio of the 10th frame clutch drive to the add-print drive satisfies the conditions of control of the three add-print cycles.

The three cycles of the add-print clutch in the tenth frame are as follows: the first cycle adds the amount to the individual score and prints the score in the normal manner but also enters the 10th frame score of that bowler to the accumulator or team score totalizer, the second add-print cycle serves to print the accumulated amount of the totalizer and the thidrd cycle clears the third line register but also prints the amount so that there will be a second separate printing of the individual scores for each bowler (See FIG. 25). The accumulated total printed at each line is the sum of the preceding completed lines of that game.

Referring again to FIGS. 3 and 4, a set of four totalizing gears 892 are mounted on a shaft 894 located between plurality of plates 896 pivoted on a shaft 898. These gears are similar to the line gears 92 except that they do not change lateral relationship to the racks on carriers 42, there being one gear 892 associated with each of the four lower racks 44. The mode of operation of gears 892 is as follows: during the early part of the add-print cycle of the tenth frame, the 10th-frame clutch is engaged. There are five lugs 295 on the 10th-frame clutch drive member (FIG. 11) and these are positioned so that the clutch dog 703 will engage at a time when the add-print clutch is at half-cycle position. In the first tenth frame add-print cycle, the normal add operation for the line gears 96 (FIG. 3) is allowed to proceed through the first complete reciprocation of the racks 46 to add the score made in the tenth frame. The printing of the subtotal standing in line gears 96 also occurs at the time the racks are in their leftward positions and shaft 154 is in the left position 154a during the second excursion. The totalizer gears 892 are then brought into mesh with the lower racks 44 by clockwise rocking of a flatted shaft 900 through the linkage shown in FIG. 19.

A cam follower 902 has a roller 903 in contact with a cam (not shown) driven by the tenth-frame clutch (which, it will be recalled, rotates on the same shaft (246) as the sensing clutch). Clockwise rocking of follower 902 by the cam results in clockwise rocking of a lever 904 which is integral with follower 902 and which carries a hook link 906 pivotally mounted at 905 to lever 904. Link 906 normally engages a stud 908 on a lever 910 which is keyed to shaft 900; therefore, clockwise rocking of lever 904 serves to rock the flatted shaft 900 clockwise to engage the totalizer gears. The add-print clutch is held open by stud 340 (FIG. 15) on the add-print clutch pawl 323 in contact with a cam 873 driven by the tenth-frame clutch. This holds the add-print clutch open to sustain the add-print operation for two additional cycles. The restoration of shaft 154 (FIG. 3) to its rightward position therefore not only sets line gears 96 back to the ordinal values (as printed) but also enters the multiple-order value into the totalizer gears 892. The totalizer gears have a separate tens-carry mechanism comprising, in each order, two parallel links 912 and 914, pivoted to lever 896 at 922 and 924, respectively, and connected by a link 916 to which they are pivoted at 913 and 915, respectively. Rightward movement of shaft 154 with gears 892 in mesh with racks 44 results in clockwise movement of these gears. A camming surface on a single tooth 920 of each of four ordinal zero-stop members 917 fixed to the respective gears 892 engages a surface 918 of the corresponding lever 912 and, when respective gears 892 rotate clockwise from 9 to 0 position, surface 920 rocks its associated links 912 and 914 clockwise to raise the surface of the corresponding link 916. Each link 916 is in the path of an ear 928 of a latch 926 pivoted to the associated carrier 42 at 74. Each latch 926 has a notched tip 88 engaging ear 90 on its rack 44 which is slotted at 70 to engage stud 74 on carrier and permit one-tooth movement of rack 44 rightward relative to carrier 42 in the manner previously described in connection with the carry mechanism for line gears 96. This carry mechanism adds the value one to the next higher order whenever a totalizer gear 892 rotates from 9 to 0.

At the termination of the first add-print cycle of the tenth frame, line gears 96 are disengaged in the normal manner. During the second tenth frame add-print cycle, the normal engagement of these gears is disabled by the tenth-frame clutch by means of a stud 911 (FIG. 19) on the tenth-frame-clutch-cam assembly which at that time rocks a nose 930 of lever 560 clockwise about pivot 562 to remove the shoulder of lever 560 from engagement with stud 558 (which normally engages the line gears, as previously described). The totalizer gears 892 (FIG. 3) are still engaged, however, and during the first reciprocation of shaft 154 in the second add-print cycle (which reciprocation normally would cause an add process and could be omitted) the machine is functionally idle. The second reciprocation of shaft 154, however, causes the printing of the subtotal of the amount accumulated in the totalizer gears. Leftward movement of racks 44 causes counter-clockwise movement of gears 892. Blocking surfaces on the single tooth of each member 917 and the nose of its associated link 912 constitute respective ordinal zero stops to control the extent of excursion of racks 44. The normal operation of the print clutch 586 (FIG. 23) controls the printing; therefore, during the second add-print cycle with the 10th-frame clutch engaged, the sum of the selected scoring line, to that point, is printed.

At the end of the second add-print cycle of the tenth frame, the totalizer gears 892 are disengaged from racks 44 and a third add-print cycle serves to clear the line gears 96. During the first reciprocation the machine is again functionally idle. Line gears 96 are meshed with racks 46 by the normal add-print clutch operation, and during the second reciprocation the ordinal values standing in the line gears are printed a second time. This second printing serves to record the individual score of the current player separately. At the end of the leftward excursion of the racks to print the line gear values, the line gears are disengaged from racks 46 by a second stud on the tenth frame clutch cam assembly and, since the movement of these racks is limited by the zero stops 114 associated with the line gears, the latter are restored to zero. When the line gears are disengaged this time, they are in cleared or zero positions in preparation for the next game.

Means for restoring those racks 44 and 46 which are unlatched by tens carry is provided and will now be described. Normally, the restoration of these racks occurs during the first part of an add-print cycle. A shaft 942 (FIG. 3) is moved leftward at a speed greater than the leftward movement of the rack carriers 42 which, it will be recalled, move slowly at the beginning of the cycle due to the type of linkage provided. Shaft 942 engages the ends 944 and 946 of the racks 44 and 46, respectively, and if either is displaced due to tens carry it is relatched in normal position, as previously described. Mechanism for accomplishing this is shown in FIG. 20. Shaft 942 is secured to a link 964 hubbed on a shaft 898. Link 964 is urged clockwise by a spring (not shown) and is normally positioned in its clockwise position against a shoulder 953 on a link 952 which engages the smaller-diameter portion 955 of shaft 942, as shown. Link 952 is moved leftward by counter-clockwise rocking of a lever 950 by means of a cam follower 948 having a roller 949 engaging a cam which is driven by the add-print clutch on shaft 248.

This action occurs during each add-print cycle, but the rocking of shaft 942 leftward may be disabled by a bellcrank 958 underlying a stud 956 on link 952. Bellcrank 958 is pivoted on a shaft 332. An arm 960 on bellcrank 958 has a roller 961 engaging a cam which is driven by the 10th-frame clutch. Counter-clockwise rocking of bellcrank 958 removes the shoulder 953 of link 952 from contact with the reduced portion 955 of shaft 942 to disable the restoration of the racks which introduced a carry. This disablement occurs during the normal restoration of the second add-print cycle while the 10th-frame clutch is operating, because at that time the totalizer racks 44 (FIG. 3) are still engaged with gears 892 and restoration would subtract any carry values. The racks are restored, however during the next (third) add-print cycle, at which time the totalizer gears 892 have been disengaged from racks 44.

Bonus-ball Count

Means are provided to operate in conjunction with the tenth-frame clutch to indicate that a bonus ball should be thrown and to normalize all conditions after such ball is thrown and scored. It will be noted that the 10th-frame mark piece may indicate a strike or a spare, and that the resultant sensing cycle may or may not initiate an add-print cycle and, furthermore, that such add-print operation may be printing the score of the eighth or the ninth frame. The game, under these conditions, should be completed by scoring the bonus ball, or balls to which that player is entitled. It will be recalled that a sensing member 826 (FIG. 26) is provided which, when blocked by a score piece in the ninth frame of a line, initiates operation of the tenth-frame clutch. FIG. 38 shows a similar sensing member 966 which has a nose 969 projecting into the area of the ninth frame mark piece. This member 966 is pivoted on shaft 824 and is yieldably rocked clockwise during the sensing cycle. A member 970 has an ear 968 adapted to engage the ordinally-aligned sensing member 966. Member 970 is integral with a hub 971 which is keyed to a shaft 812 (see also FIG. 26) but free to be laterally moved by a retainer 803 attached to the previously described carrier 804. Mechanism for yieldably rocking shaft 812 comprises a lever 972 keyed to shaft 812 and yieldably connected by a spring 973 to a stud 975 within a slot 978 on a link 974; the spring 973 also connected to a stud 980 on link 974. Link 974 is pivoted at 974a to a cam follower 976 pivoted at 330. Follower 976 has a roller 976a engaging one of the cams driven by the sensing clutch on shaft 246. Carrier 804, along with member 970, is positioned at the scoring line which is to receive the mark piece (prior to the print-clutch operation). Ear 968 on lever 970 therefore contacts the aligned member 966 and tries to rock it clockwise. This movement is blocked if there is a mark piece in the ninth frame of the aligned scoring line (which signifies that the mark to be printed is a tenth-frame mark). A normally closed switch 982 is opened by action of an ear 989 on lever 972 if lever 972 is allowed to rock counter-clockwise. A normally open second switch 984, FIG. 30, is closed directly by solenoid 362 (FIG. 8) which, it will be recalled, controls the adjustment of the tens-stop member 162 during the sensing cycle for either a strike or a spare. It will be obvious then that switch 982 remains closed during sensing only if there is a mark piece in the ninth frame, and switch 984 is closed during sensing in response to either a strike or a spare. A third switch 965 (see also FIG. 38) is closed by a shoulder 967 on link 974 when the latter moves upward. Only if rocking of shaft 812 is blocked by a mark piece in the ninth frame in response to a strike or spare can all three switches 982, 984 and 965 be closed simultaneously; therefore, these switches will be closed simultaneously only when a strike or spare occurs as the 10th-frame mark.

FIG. 30 shows the wiring diagram which includes the three switches 982, 984 and 965. These switches are connected in series from a current source and are in series with a switch 979 to a solenoid 977. Switch 979 is operated by a follower 989a engaging a cam 989 which is driven by the 10th-frame clutch. Closing switches 984 and 965 with switch 982 closed therefore operates solenoid 977. This solenoid, once operated, will remain operated through a holding switch 981 which is closed by solenoid 977 and by-passes switches 984, 965 and 982 but is in series with switch 979. Operation of the 10th-frame clutch opens switch 979 as follower 989a enters a depression on cam 989; this deenergizes solenoid 977.

Operation of solenoid 977 also closes a switch 983 which operates an indicator 963 to indicate "bonus ball." Since solenoid 977 is operated during a sensing cycle and remains operated until a tenth-frame clutch cycle, the indicator light continues to show that a bonus ball is due until game is ended, i.e., until printing of tenth-frame score. This therefore allows two bonus balls if the 10th frame ball is a strike and one if a spare.

Means are also provided to signal a resetting of the pins or to perform other normalizing operations by a switch 985 closed by the "bonus ball" solenoid 977. This switch is in series with a switch 987 that is operated by a second follower 989b engaging cam 989. Switch 987 closes upon operation of the 10th-frame clutch, and is in series with a switch 986, closed by the "count first ball" switch member 458 (FIG. 3), and with a switch 988 (FIG. 30) that closes if the zero stop solenoid 438 (FIGS. 3, 17 and 18A) is operated to pull out the zero stop 145. The signal is dependent on the scoring of a bonus ball (switch 985, FIG. 30) which completes the 10th frame (switch 987) when the "count first ball" indicator is set (switch 986) and such first ball is not a strike (switch 988). Under these conditions the game is completed and there are pins standing on the alleys which should be reset for the next bowler. Switch 987 is closed early in the operation of the 10-th frame clutch. (switch 988 may alternatively be normally closed and opened by the strike key circuit). A switch 1108 is closed, to directly generate a reset signal, by operation of a solenoid 1106 which replaces resistor 501 (FIG. 17) in the first-ball foul lead except in the case where the pins are automatically reset as the result of a first-ball foul.

Optical System

The optical system of the machine provides for two separate score projections, one to the back of a translucent screen 6 (FIG. 1) which forms the face of the cabinet, and the other downward to the upper face 9 of the table. The two projections provided both employ a common light source, reflector, projecting lens and mirror. One additional mirror is provided to reflect to the screen and two additional mirrors, one of which is half silvered, are used for the downward projection.

Apparatus for projecting the image to the screen 6 is shown in FIGS. 34 (viewed from the rear of the cabinet), 34A (right side as viewed from the back of the cabinet), and 34B (top). The rack 818 (see also FIGS. 25 and 26) containing the printed record pieces is located at the left rear of the cabinet (as viewed from the back) and the plane of the rack is parallel to the side of the cabinet. As previously described, and shown best in FIG. 34A, the first-frame record pieces are at the bottom of the rack (next to the names), whereas the last-frame pieces are at the top. The top line of scores is at the rear of the cabinet. The image, therefore, must be optically rotated 90° in its plane and the plane optically rotated 90° to be viewed correctly from the front of the cabinet. FIG. 34 shows a reflector 1002 which is curved to focus light from a source 1004 to a point outside the machine which is twice as far from the reflector as the distance from the center of the reflector to rack 818. Reflector 1002 subtends an angle such that it reflects light onto the entire surface of the rack. The surfaces of the record pieces are highly reflective except for the printing thereon; therefore, the light from source 1004 is reflected from reflector 1002 to the record pieces and back to a position of focus in the plane of the reflector, at which position there is a lens 1006. The light passing through lens 1006 is reflected by a mirror 1008 whose plane is at a 45° angle from rack 818 to reflect the image upward. A second mirror 1010 has its plane approximately 40° from the horizontal and perpendicular to the plane of the record pieces. Mirror 1010 reflects the record image to a translucent screen 1012 (FIG. 34A). The image is then viewed correctly from the front of screen 6.

Means for projecting the record image downward are shown in FIGS. 35, 35A and 35B. The same reflector 1002, lens 1006 and mirror 1008 are used for this projection as for projecting onto screen 1012 (FIGS. 34A). The location of mirror 1010 is shown in FIG. 35A only, and is shown there in broken lines. Mirror 1008 reflects the image upward as previously described. A half-silvered mirror or "beam splitter" 1014 is placed between mirror 1008 and mirror 1010 at an angle of 45 degrees from the horizontal and perpendicular to the plane of rack 818. Half of the light from the record pieces penetrates mirror 1014 to mirror 1010 and half is reflected to a mirror 1016 which is angled to reflect the image from mirror 1014 downward to the table. FIG. 35A is a view from the right side of the cabinet (as viewed from the back), i.e., looking at the plane of the record pieces. Mirror 1016 is rearward in the cabinet. The angles of the mirrors 1008, 1014 and 1016 need not be exactly 45°, but are such that the final reflected images are properly placed. The angles as shown are effective to rotate the plane of the image so that it may be read correctly. A weak negative lens 1017 for properly focusing the downwardly projected image may be used and the mirrors may be mounted on adjustable brackets to facilitate exact settings. The second lens 1017 may be necessary to bring the image into sharp focus on both the translucent screen and the table unless the light paths both happen to be of equal length. An aperture 1018 (FIG. 35B) is provided in the bottom of the cabinet for exit of the light projected downward.

Carriage-shifting Mechanism

Mechanism for moving carriage 800 (containing the individual scores—FIG. 4) has been described and, it is recalled, includes screw shaft 108. This shaft is driven by means described later and is positioned in response to the setting of knob 14 (FIG. 1) by mechanism shown in FIGS. 31 and 31A.

A solenoid 1110 controls a carriage-positioning clutch 1111 which is engaged when solenoid 1110 is energized. Clutch 1111 is a single-cycle clutch, one rotation of which imparts one "line" (three gears) of movement to carriage 800. In the full-cycle, or stopped position of clutch 1111, the gears 96 containing the scores of one bowler are correctly positioned relative to the entry and mechanisms.

Screw shaft 108 is integral with a gear 1148 and this gear is in mesh with a large gear 1146. Gear 1146 is driven approximately one complete rotation against the tension of a spring 1140 and is then released, as described later. One end of spring 1140 is connected to a stud 1144 on gear 1146 and the other end is connected to a fixed stop 1138. Spring 1140 tends to rotate gear 1146 and screw shaft 108 in the direction opposite to that in which they are driven by clutch 1111. In normal position, carriage 800 is at its extreme rightward position (FIG. 4), representing bowling line "one," i.e., the entering racks 46 are in position to cooperate with the "first-player" set of line gears 96. Each rotation of clutch 1111 drives gear 1146 and screw shaft 108 to the next line, or player position of the carriage. After the sixth player position of the carriage, the drive connection from clutch 1111 is released and spring 1140 returns the carriage to the first-player position.

The drive to the gear 1146 is imparted through a drive link 1132 pivotally secured to gear 1146 at 1144 and having a shoulder 1133 in contact with a stud 1130 on a gear 1128 driven by the carriage-positioning clutch 1111. Gear 1128 is driven clockwise (FIG. 31A) by a gear 1126 (FIG. 31) which, in turn, is driven by clutch 1111. Link 1132 is urged into engagement with stud 1130 by a spring 1134, and has a stud 1136 extending through a slot 1137 in gear 1146. As gear 1128 rotates clockwise stud 1136 eventually contacts the fixed stop 1138 and cams link 1132 counter-clockwise about pivot 1144. This removes the shoulder 1133 of link 1132 from engagement with stud 1130 and spring 1140 rotates gear 1146 one turn counter-clockwise until shoulder 1133 again contacts stud 1130. In this manner drive gear 1128 rotates in one direction only (clockwise as viewed in FIG. 31A) but carriage 800 is moved from line "one" to line "six," then back to line "one." The ratio of gears 1126, 1128, 1146, 1148 is such that one rotation of clutch 1111 brings stud 1130 from a position where it holds the carriage at the sixth line to a position for re-engagement of shoulder 1133 with stud 1130 when the carriage is at its first-line position. The carriage-positioning clutch 1111 is driven by a continuously rotating member 1122 integrally secured to a shaft 1124 which rotates counter-clockwise (FIG. 31A). Clutch 1111 comprises a plate 1116 freely hubbed on shaft 1124 and a dog 1113 pivoted on plate 1116 and urged counter-clockwise by a spring 1120. Clutch 1111 is shown engaged and driven approximately 90° from its initial position. A stop 1112 is in the position shown when the solenoid 1110 is not energized. A nose 1114 of the clutch dog 1113 contacts stop 1112 and rocks the dog clockwise against a stop 1118 when the clutch reaches full-cycle position, thereby disengaging the clutch from drive member 1122. Energization of solenoid 1110 removes the stop 1112 from engagement with clutch dog 1113 and the dog engages the clutch. As long as solenoid 1110 is energized, clutch 1111 remains engaged, but when the solenoid is deenergized the clutch is disengaged at its next full-cycle position. Gear 1126 (FIG. 31) is fixed to its shaft as is the clutch plate 1116; therefore, gear 1126 rotates only when clutch 1111 is engaged.

Gear 1128 carries a conductive plate 1154, insulated at 1156 from the gear. A wiping contact 1150 (FIG. 31A) continuously engages the conductive plate on its smaller diameter. Other contacts 1152 are in positions to touch only the greater diameter of plate 1154, but this portion of the plate is only wide enough to engage one wiping contact arm 1152 at a time. The circuit established by contacts 1150 and 1152 is shown in FIG. 37, and is the means for positioning carriage 800 through control of knob 14 (FIG. 1) on the table. The angular position of the conductive plate 1154 (FIG. 37) is indicative of the carriage position, as previously described. A second conductive plate 1168 is positioned by knob 14 on the table and is complementary to plate 1154. A circuit through solenoid 1110 (carriage-position-clutch solenoid) is established at all positions of plates 1154 and 1168, except one. There is a respective lead 1156–1166 connecting each contact position of the carriage plate 1154 to a corresponding contact position of the knob plate 1168.

As knob 14 (FIG. 1) is turned to a selected player position, an energizing circuit is established from a power source 1175 (FIG. 37) through a lead 1174, solenoid 1110, a lead 1172, a master contact 1170, plate 1168, a lead 1156 or 1158, etc. (lead 1162 in FIG. 37) and plate 1154 to a contact 1150 connected to a reference potential. As long as the solenoid 1110 is energized, clutch 1111 remains engaged and plate 1154 rotates from one contact 1152 to another. When carriage 800 (FIG. 4) reaches the position in which plate 1154 engages a contact 1152 connected to a lead 1156–1166 corresponding to the cut-out position of the plate 1168 (lead 1164 in FIG. 37) solenoid 1110 becomes deenergized and clutch 1111 becomes disengaged. In this manner the carriage position is controlled by knob 14 on the table, which knob may be angularly set to any player's scoring line. The knob may be turned either direction (plate 1168) but the carriage-position clutch 1111 turns in only one direction. The carriage, however, continues to shift until the correct position is attained in the manner described.

In automatic operation, the carriage is positioned in response to the completion of a frame. This is indicated in the present machine by the release of a mark piece, except in the 10th frame. In such automatic operation, the carriage is stepped to the next player's scoring line with each completion of a frame by a bowler. However, there are not always the same number of bowlers on a team and the automatic positioning to the "next" scoring line is not always satisfactory. Means are provided therefore to set knob 14 on the table (under conditions of automatic operation) to the number of bowlers on the team. The carriage steps to the next scoring line until the last bowler on the team has completed his frame and the carriage is then automatically moved to the first bowler's scoring line. The circuit for accomplishing this is shown in FIG. 37A. The plate 1154 and contacts 1150 and 1152 at the machine are the same as in FIG. 37, except that a lead 1190 is connected to the common contact 1150 and number on lead 1156 is removed. The conductive plates at the player's knob 14 are changed so that the knob can be set for the number of players.

Two plates 1176 and 1182 are set by the knob. Plate 1182 has a cut-out section which is ineffective only in the number one position, i.e., only for a single bowler. Under these conditions, carriage 800 remains stationary and the circuit to the solenoid 1110 is ineffective through a contact 1184. Plate 1176 spans the remaining five scoring lines or positions in which carriage plate 1154 contacts a lead other than that in the number one position.

In operation, knob 14 and discs 1184 and 1176 are set counter-clockwise to the number 3, as an example. Leads 1158 and 1160 are disengaged from plate 1176 and the contact 1184 engages plate 1182. Carriage 800 and plate 1154 remain in the positions shown. A switch 1188 is closed momentarily by the mark-piece release member 760 (FIG. 23) to close the circuit from source 1175 through lead 1174 (FIG. 37A), solenoid 1110, lead 1172, contact 1184, plate 1182, a contact arm 1180, a lead 1186, switch 1188, a normally closed switch 1191 and lead 1190. Plate 1154, which moves with carriage 800, moves one stop clockwise to engage the contact 1152 which is connected to lead 1158, and since plate 1176 is not in contact with lead 1158, the carriage stops at this position.

Similarly, at position number 3 (lead 1160), the carriage stops after a momentary closing of switch 1188. At the next step, however, plate 1154 moves to contact lead 1162 which is in contact with plate 1176 and solenoid 1110 remains energized through leads 1164 and 1166 (carriage positions 4, 5 and 6) until the number one position is attained again. In this manner each closing of switch 1188 advances the carriage only one step for the number of players indicated by the knob, and after the last player of the group so indicated has bowled a frame, the carriage is automatically returned to its number one position.

As was previously stated, operation of the tenth-frame clutch must be completed before carriage 800 can be positioned for the next bowler. A switch 1191 (FIG. 37A) is opened by the bonus ball solenoid 977 (FIG. 30) and remains open for the first two add-print cycles of the tenth frame clutch (there are three in all). In the last cycle after switch 1191 is closed, switch 1191a (FIG. 37A) is momentarily closed by suitable means to energize solenoid 1110 and the carriage then moves to its next position.

A button switch 1192, depression of which bridges switch 1188, is provided to advance the carriage to the next player's scoring line if the bowlers are bowling out of turn. A single, brief depression of the button advances the carriage one step; alternatively, the button may be held down until the carriage reaches any desired position. The button for switch 1192 may be placed on the table at any convenient place.

Mark Count Scoring

The term "mark printing" as used in this description, includes the printing of any non-score aspect of a player's performance during a given frame, including strikes, spares, splits, chops, fouls and misses. It is common practice among bowlers to keep what is known as a "mark count" which, in team bowling, gives a substantially accurate indication as to which team is ahead without adding up any actual scores during the game, and which is dependent only upon strikes and spares. The practice of counting marks is as follows: When a player makes a strike, he is credited with one "point," or "mark," in the mark count. A second, and all succeeding consecutive strikes count two points, or marks, each. Regardless of the number of strikes made in sequence by a bowler, no more than two mark points are counted in a frame for one bowler. Whenever a player makes a spare, he is credited with one point, or mark, in the mark count. Nothing but strikes or spares contribute to the mark count. Means are provided in conjunction with the operating elements of the Automatic Scoring Device to indicate the mark count in the manner of present practice.

Mechanism for providing this operation is shown in FIG. 33. A mechanical counter 927 of any well known type, and located at any convenient place in the machine, is operated by a solenoid 990. A single electrical pulse applied to an input of the solenoid enters a count of one into the counter. The circuitry for controlling this counter operates in the following manner: Depression of the "spare" key operates solenoid 990 to enter one count by closing a switch 992 through operation of solenoid 364 (FIG. 8) which, it is recalled, is energized by depression of the spare key. It will be seen that switch 992 supplies current from a source 991 to solenoid 990 as long as solenoid 364 remains energized.

Solenoid 362 also is energized by depression of the spare key as previously explained, this solenoid being operated by both the strike and spare keys. In addition to switch 992 (FIG. 33), therefore, a pair of switches 995 and 996, controlled by solenoid 362, are closed by the spare key.

A strike may enter two counts by energizing solenoid 362 and closing switches 995 and 996. Switch 995 is in series with a normally closed switch 994 operated by a follower 993a sengaging a cam 993 which is driven by the sensing clutch, and switch 994 is in series with the input to solenoid 990. Switch 994 opens and recloses during each sensing cycle as cam follower 993a drops to a low portion 993 of the cam; therefore, operation of solenoid 990 enters two counts into the counter when switch 995 is closed. A strike which does not immediately follow another strike, however, must enter only one count; therefore, means are provided to hold the circuit to solenoid 990 closed during the sensing cycle when conditions exist which indicate that depression of the strike key should result in entry of only one count.

This is accomplished by switch 996 which is in series with a normally open switch 997 and the input to solenoid 990. Ear 472 on the previously described member 470 (see also FIG. 3) is adapted to close switch 997 when member 470 is moved downward. It will be recalled that member 470 moves downward during each sensing cycle, but is blocked only if the tens-stop member 162 is not at zero position. Therefore, if member 162 is in its zero position, indicating the absence of a strike in the preceding frame, the strike adds only one count because switch 997 keeps a circuit to solenoid 990 closed even though switch 994 breaks the circuit through switch 995.

A strike following a spare prevents switch 997 from closing, but should count only one mark. Therefore, other means are provided to keep a circuit to the input of solenoid 990 closed under this condition. It will be recalled that member 458 (FIG. 3) moves counterclockwise when when "count fire ball" member is set. A normally open switch 999 (FIG. 33), which is closed by rocking member 458, is connected in series with switch 996, a normally closed switch 998 and the input of solenoid 990. Therefore, when member 458 is rocked, indicating the occurrence of a spare in the preceding frame, a circuit is maintained closed through switches 996, 998 and 999, and a strike following a spare is effective to count only one.

Inasmuch as the "count first ball" member is also set when two consecutive strikes have been made, the third strike in a row finds switch 999 closed, but two counts should be registered under these conditions. Switch 998 opens when the tens-stop member 162 is moved from the position in which it adds twenty to the position in which it adds 30 to the score. A strike following two other strikes therefore enters two counts by opening and reclosing switch 994, because the circuit through switch 998 is broken by member 162.

Handicap and Pace-bowler Scores

Handicap scores are used in many leagues wherein the teams are not evenly matched. The handicap amount is figured on the basis of team average and is added to the team score. A typical handicap might be, for example, two thirds of the difference between the average of the high team and the average of the low team, which amount is then added to the team score of the low team. The low team may then win if it bowls in excess of its average to a greater degree than the high team exceeds its average, even though the actual pins rolled may be less.

Pace scores are generally inserted for a team bowler who is absent from the game and the amount is based on the absent bowler's average. There are times when an absent team member is replaced by a so-called pace bowler who bowls the game in the absent bowler's place. His score is kept in the normal manner but it is not added to the team score and the absent bowler's average is used in his place.

As previously mentioned, means are provided to register handicap and/or pace-bowler scores. Mechanism for entering scores under special conditions is shown in FIGS. 32 and 32A. A block, or "peg board," 1230 has three rows of holes so spaced that they coincide with the ordinal spacing and increment spacing of the totalizer gears 892, and marked on the face of the board to represent rows of ordinal decimal digits. A respective peg 1228 may be inserted into one hole of each row of holes in the board 1230 marked on the face to represent the digits. Three racks 1208 are supported on a pair of shafts 1210 and are urged rightward by respective springs 1212. Each rack 1208 has an ear 1226 adapted to contact the peg 1228 in each ordinal row of holes. The racks are normally barred from rightward movement by a plate 1214 supported and guided on a pair of studs 1216. Plate 1214 is urged rightward by a spring 1218 and normally latched in the position shown by a latch 1220 pivoted at 1222.

Each of the racks 1208 is in engagement with a respective idler gear 1206 pivoted on a fixed pivot 1207. Each idler 1206 is normally engaged with its respective totalizer gear 892. The gear 892 is shown engaged with the lower rack 44 in FIG. 32.

The mode of operation is as follows: Pegs 1228 are inserted in the proper holes and latch 1220 is operated by means described later. This releases plate 1214 for movement to the extreme right by spring 1218. The racks 1208 are stopped by contact of their respective ears 1226 with the pegs. Rightward movement of racks 1208 results in counter-clockwise rotation of gear 1206.

Each gear 892 is normally in mesh with its corresponding gear 1206 at this time. Gear 892 is therefore rotated clockwise a number of tooth increments determined by the position of the ordinally corresponding peg. The operation starts an add-print cycle by means described later and also engages totalizer gears 892 with the racks 44. The racks 44 therefore move leftward until they are blocked by the zero stops of gears 892 (FIG. 3), and since this is an add-print cycle, the ordinal values determined by pegs 1228 (FIG. 32) are entered into line gears 96 (FIG. 3) and are printed and added in the same manner as any score entry made through the keyboard.

At the end of the first leftward excursion of the add-print control mechanism, the accumulator gears 892 are disengaged from the racks 44 and are therefore standing at zero. In the meantime, the racks 1208 (FIG. 32) have been returned to normal position, as shown, and held thereby latch 1220. The handicap value is then read out of the scoring line in the normal manner.

As previously mentioned, six scoring lines are provided. The top line may be arbitrarily designated as pace, handicap, or correction. The peg board may be set up to the amount of handicap, or pace, and left for three games if no change in these figures is made necessary. Normally the latch 1220 is released at the table by a knob or button and serves to enter the handicap at the end of the game. Mechanism for controlling this operation from a button on the table is shown in FIG. 32A. A solenoid 1270 is energized by a switch (not shown) that establishes a circuit through a pair of solenoid terminals 1271 and 1273. Solenoid 1270 has a plunger 1268 carrying a stud 1269 that engages a slot 1265 on a bellcrank 1266. Energization of solenoid 1270 rocks bellcrank 1266 clockwise about a pivot 1267. Bellcrank 1266 has an ear 1232 adapted to contact a lower arm 1221 of latch 1220 and rock the latch clockwise about its pivot 1222 to release plate 1214. Plate 1214 moves rightward and contacts a lever 1252 which is pivoted at 1254 and, when rocked clockwise by the plate, closes a switch 1262. This starts an add-print cycle by operation of a solenoid 1286 (see also FIG. 13) which rocks a bellcrank 235 counter-clockwise, thereby causing the latter to contact ear 233 of member 231 to rock shaft 232 counter-clockwise for engaging the add-print clutch, as explained previously. The location of lever 1252 at the end of travel of plate 1214 insures that all racks 1208 and 44 (FIG. 32) will be positioned before the add-print cycle starts.

Solenoid 1286 (FIG. 32A) is in series with a solenoid 1264. Solenoid 1264 therefore remains energized as long as switch 1262 is closed. Switch 1262 is kept closed until plate 1214 is returned to its normal, leftward position, which occurs during the first leftward excursion of the add-print control mechanism, as explained later. Mechanism for so delaying the opening of switch 1262 includes a link 1256 pivotally connected to lever 1252 and to a lever 1246 pivoted at 1255. A spring 1260 provides a toggle action holding the lever 1246 limited against a first or second fixed limit, 1248 or 1250, so that once operated clockwise, it remains clockwise until rocked counter-clockwise by the left side of ear 1215 on plate 1214 as the latter is returned leftward to the position shown.

Solenoid 1264 has a plunger 1296 pivoted to a link 1294 at 1295. Link 1294 is pivoted at 1293 to a bellcrank 1290 which is pivoted on shaft 330 (see also FIGS. 8 and 15). Bellcrank 1290 has an arm 1285 overlying a stud 1298 on a lever 910 which is rocked clockwise and rocks flatted shaft 900 (see also FIG. 3) clockwise to engage the totalizer gears 892 (FIG. 32) with the racks 44, as previously explained. This action also engages the add-print clutch, as described above. The totalizer gears 892 are brought into mesh with racks 44, before the start of the add-print cycle, by the direct action of solenoid 1264. Means are also provided to remove the normal stops so that racks 44 may move forward under control of the totalizer zero stops 917 (FIG. 3). An ear 1292 on the bellcrank 1290 rocks a lever 1284 counter-clockwise, and a link 1280 pivoted at 1282 to lever 1284 pulls plate 206 (see also FIG. 12) downward to disable the stops, as previously explained.

The thousands-order rack carrier 42 has a special stop, as previously mentioned, since it is not engaged at any time with the line gears 96 and is associated only with the totalizer gears 892. This stop, 1205, is shown in FIG. 32 pivoted on a stud 1203 and is urged counter-clockwise by a spring 1209. A stud 1201 contacts the support frame 896 for the totalizer gears and, in the position shown, stop 1205 is clockwise out of the notch 1211 in the thousands-order rack carrier 42. Counter-clockwise rocking of support 896 about pivot 898 to disengage the totalizer gears from the racks allows spring 1209 to engage stop 1205 with notch 1211. In this manner stop 1205 is always effective to hold the thousands-order rack carrier against movement unless the totalizer gears are engaged with the lower racks 44.

Mechanism for restoring plate 1220 is shown partially in FIG. 32A and more fully in FIG. 12. FIG. 32A shows part of a segment 1300 in mesh with a small gear 1302. Gear 1302 is integral on a hub with gear 1304 and gear 1304 is in mesh with teeth on the plate 1214. FIG. 12 shows the gears 1304 and 1303 as well as the segment 1300 which is freely pivoted on shaft 312. Whenever plate 1214 is released it moves rightward and imparts counter-clockwise rotation to the gears. This action rocks segment 1300 clockwise about pivot 312. Segment 1300 has a shoulder 1308 in the path of a stud 1306 on the previously described bellcrank arm 310. Bellcrank 310 makes two reciprocations during an add-print cycle, as previously explained. The first counter-clockwise rocking of the bellcrank 310 therefore restores plate 1214 by contact of stud 1306 with shoulder 1308 of segment 1300 to rock the segment counter-clockwise. Plate 1214, once returned leftward, is latched in this position by latch 1220 until released again.

Latch 1220 (FIG. 32A) may also be operated to make corrections. To clear gears 96, a "Clear" button is provided on the machine to engage the add-print clutch 276 by energizing solenoid 1286 (FIG. 13); and the button engages the 10th-frame clutch by energizing solenoid 1279 (FIG. 11) while disengaging the totalizer gears 892 from racks 44 (FIG. 32) by energization of solenoid 1192 (FIGS. 19 and 32B). After the line gears 96 are clear, pegs 1228 are adjusted in accordance with the last correct figure in the score; then, latch 1220 is rocked directly (FIG. 32A) by an ear 1234 on a member 1236. The resulting add-print cycle enters the score from the pegboard directly into the line gears 96. The keyboard on the table is then operated exactly as it should have been for entering the correct score.

Means are provided to engage the 10th-frame clutch whenever solenoid 1270 is operated to enter a handicap, or pace, score. This solenoid is operated from the table only and is operated as the first operation at the end of a game (10th frame). Solenoid 1192 (FIG. 19) is operated to prevent the entry of a pace score into the totalizer when the carriage is positioned at the pace bowlers line.

The circuitry for operating solenoid 1192 (FIG. 19) is shown in FIG. 32B. In the case of the pace bowler, a pair of contacts 1200 are closed by a switch on the table under control of the players' knob 14 (FIG. 1) at the pace bowlers' position of the knob. A second pair of contacts 1198 are closed by a 10th frame clutch cam 1204 (FIG. 32B) at the 270° position (cyclic) of the first add-print cycle. It will be recalled that there are three add-print cycles in the tenth frame and the 270° position in each the racks 46 (FIG. 3) are at the leftward position limited by the zero stops of the line gears 96. The line gears are therefore at zero and the totalizer gears 892 are normally brought into engagement at this point in the 10th frame to enter the line score into the totalizer. Operation of solenoid 1192 (FIGS. 19 and 32B) prevents normal engagement of totalizer gears 892 with racks 44 so that the amount of the pace bowler's actual score will not enter the totalizer, however, the totalizer gears 892 must engage racks 44 for the adding and printing of the accumulated total at that time. This is controlled by a switch 1281 (FIGS. 32A and 32B) which is closed by cam 1204 at the 144° position of the 10th frame clutch. This is 180° (cyclic) position of the second add-print cycle and closing of switch 1281 energizes solenoid 1264 which, as previously described in connection with FIG. 32A, directly engages the totalizer gears. This is only a momentary operation but link 906 (FIG. 19) which is the normal totalizer engaging link, is, at this time of the tenth frame operation, in clockwise position and will therefore serve to latch stud 908 in clockwise position of lever 910. The coincidental energization of solenoid 1286 (FIG. 32A), which engages the add-print clutch, is ineffective at this time because the add-print clutch is already engaged. In the above manner the normal addition of the line score into the totalizer gears 892 is omitted in the case of a pace bowler.

The clearance of the totalizer gears 892 (FIG. 3) after the last bowler on the team has completed his game is accomplished by disengaging the totalizer gears 892 from racks 44 at the 270° position (cyclic) of the second add-print cycle during the operation of the 10th frame clutch. At this time the totalizer gears are at zero and controlling the printing of the team total, as described in connection with 10th frame clutch, and if left in mesh the total would be re-entered on the return of the racks 44.

The clearance of the totalizer is accomplished by disengaging the totalizer gears 892 (FIG. 32) from racks 44 at the 270° position of the second add-print cycle during operation of the 10th-frame clutch. At this time the total has been printed and the totalizer register gears are at zero, and the racks are about to be returned to the right to re-enter the amount printed. The totalizer disengagement prevents the re-entry. A pair of contacts 1196 (FIG. 32B) are closed by cam 1204 which, it is recalled, is driven by the 10th-frame clutch. A second pair of contacts 1194 in series with contacts 1196 complete an energizing circuit for solenoid 1192 and are closed when the last bowler in the group is indicated by know 14 (FIG. 1) on the player's table.

Automatic Score Entry

The preceding description concerns manual input through the keyboard and makes reference to automatic input operation. It will be understood that with the keyboard provided, the entire operation of bowling-score computing and display is accomplished as described. It will also be understood that the structure described above is capable of functioning correctly with information (as to the number of pins down) originating from a remote source. Therefore, automatic mechanism for determining the number of pins down after a ball is thrown is not necessary to the operation of the device, but is highly desirable and therefore provided herein to increase the utility of the machine. The securing and utilizing of such information does not in any way depend on the type of pin-setting equipment present in the alleys and would be equally useful if the pins were being set up by hand.

Mechanism is provided to detect the number of pins standing after a ball is thrown. In automatic operation it is necessary that the information as to pinfall after each ball bowled be directed and handled by the scoring device as first ball or second ball in each frame for each player. Mechanism is therefore provided to direct such information to the input of the scoring device so that it will cooperate with the elements of the score computing machine automatically as first or second ball information. Other mechanism directs information to each bowler's score in sequence by maintaining the proper "line" relationship to the operating elements as described previously (player advance initiated upon completion of each frame). Finally, mechanism is provided for channelling "pit" information from each of a pair of alleys to corresponding ones of a pair of score-computing machines until all of the bowlers on each of two teams have completed a frame and thereafter channelling the information from each alley to the opposite machine, to thereby conform with the rules of scoring team bowling.

Mechanism for detecting pin fall is shown in FIGS. 39 and 40. FIG. 39 is a top view of linkage 1348 interconnected to form an open framework. This linkage is connected directly to individual pin-detecting elements which are supported on a similar framework described later. The pin-detecting equipment is mounted on independent supports and is located above the pins. Allowance is made for movement in a vertical direction so as not to interfere with the operation of pin-setting equipment, if the latter is present. Certain modifications as to the configuration of the framework may have to be made to prevent interference with different types of pin-setting equipment, but esentially the framework may be constructed as shown and described herein.

There is one pin-detecting mechanism for each of the ten pins in an alley, all of these being operated by the linkage 1348. A single-cycle clutch 1352 (FIG. 39) is engaged by a solenoid 1354 which is energized by a bowled ball as described later. One rotation is imparted to a shaft 1344 (see also FIG. 40) by each cycle of operation of clutch 1352. Shaft 1344 is mounted, through a series of bearings 1350, on a main support frame (not shown). A pair of links 1338 are each pivotally connnected at 1340 to a respective pair of eccentrics 1342 mounted for rotation with shaft 1344. Links 1338 are pivotally connected at 1339 to the operating linkage 1348; therefore, a reciprocating movement is imparted to the linkage when shaft 1344 is rotated.

A pin-detecting mechanism comprises the elements shown in FIG. 40. Located above and on alternate sides of each bowling pin, a pair of plates, or levers 1305 are pivotally mounted on respective stub shafts 1302 (see also FIG. 39), each supported on the main frame. Plates 1305 are pivotally connected at 1336 to linkage 1348, which is reciprocated by the eccentrics 1342. A second plate 1304 is also pivotally mounted on each shaft 1302. This plate is urged counter-clockwise about its stub shaft 1302 by a respective spring 1330, one end of which contacts a stationary stud 1332 and the other end of which contacts a stud 1334 fixed to the associated plate 1304. Pivotally secured at 1320 to each plate 1304 is a respective latch member 1306. The two latch members 1306 for each pin position are integral with a single light-weight bail 1346. The latches 1306 and bail 1346 are urged clockwise about pivots 1320 by a pair of springs 1328, each connected between a latch 1306 and the corresponding stud 1334. A stud 1318 on each plate 1304 limits this movement. Each latch 1306 may engage a respective stud 1316 on the corresponding plate 1305.

In operation, plates 1305 are rocked clockwise about shafts 1302 and by means of studs 1316, latches 1306 and pivots 1320, the plates 1304 also move clockwise against the tension of their springs 1330. Plates 1304 normally follow the reciprocation of plates 1305 such that the arc described by bail 1346 covers the area in which the associated pin may remain standing. Bail 1346 does not contact fallen pins. If a standing pin is encountered by the bail, its latches 1306 are rocked counter-clockwise about pivot 1320 and release the latches from engagement with studs 1316. Springs 1330 then rock plates 1304 and the integral bail 1346 counter-clockwise to a limit against fixed studs 1332. In this position a formed ear 1324 on one plate 1304 in each pair closes a respective switch 1326, which indicates that a pin remains standing in that position. Springs 1328 are very light and the angle on the latch is such that a very light touch against a standing pin is sufficient to release latches 1306 and swing the bail assembly counter-clockwise to close switch 1326. If no pin is encountered, the latches are not released and, after reciprocation, the assembly returns to the position shown in FIG. 40.

It will be noted that the angular position of the eccentrics 1342 is such that when shaft 1344 rotates, a slight leftward movement is imparted thereby to the frame linkage 1348 through link 1338. This results in a limited counter-clockwise rocking of plates 1305 which moves studs 1316 to the dotted line position shown. Any previously released latches 1306 are therefore cammed counter-clockwise about pivots 1320 by studs 1316 bearing on their front surfaces 1314, thereby engaging the previously released latches. All of the latches 1306 are therefore engaged when eccentrics 1342 swing rightwardly and all of the bails 1346 are then rocked clockwise shortly after the start of the cycle. All switches 1326 are closed momentarily at the start of the cycle when latches 1306 are re-engaged as described above, but this action is ineffective, as will be seen later. It should be noted, however, that all switches 1326 that are closed after and as a result of a ball being thrown remain closed until the next ball is thrown. Indication of the pins remaining standing therefore is available for the maximum time possible.

Switch 1600 for operating solenoid 1354 (FIG. 39) as a result of a ball thrown is shown in FIG. 40A. A pair of arms 1602 pivoted on a frame member 1603 and 1604 support a cushioned stop 1606 extending across the back of the pit. A strong spring 1608 between stud 1610 on the arm 1602 and stud 1611 on the suuport 1603 tend to hold the arms 1602 clockwise in the position shown against an ear 1609 on the frame. Switch 1600 is held normally open by the arm 1602 as shown. A ball hitting cushion 1606 rocks arms 1602 counter-clockwise and will allow switch 1600 to close. Limited movement of arm 1602 is allowed as cushion 1606 hits cushion 1612 fixed between the frame supports which also cushions the ball. Spring 1608 is such that the switch is only operated once.

Use of the pins-down information for scoring occurs during the last half of the cycling of shaft 1344 (FIGS. 39 and 40) by a scanning of switches 1326 in a circuit shown in FIG. 41. Shaft 1344 carries a sensing plate 1356 with an arm 1364 shown in the figure 180 degrees from its starting position. By this time in the cycle all switches 1326 that correspond to standing pins have been closed in the manner described. A current source 1358 is connected in parallel through switches 1326 through a set of leads 1360 to a set of contacts 1362 in the path of arm 1364. Any closed switch 1326 therefore completes a circuit from source 1358 through the associated lead 1360 and contact 1362. When plate 1356 rotates to the proper position, the circuit is completed through arm 1364, conducting plate 1356, a continuously engaged contact 1365, a lead 1366, a normally closed switch 471, a solenoid 1368 (energized thereby), a lead 1369 and a power return terminal 1371. Since arm 1364 engages only one contact 1362 at a time, there is a separate pulse to solenoid 1368 for each switch 1326 that is closed. Solenoid 1368 operates a stepping switch 1370 which, in the well known manner, moves a contact arm 1372, into successive engagement with a series of ten contacts 1370 in accordance with the number of times it is energized. Stepping switch 1370 normally stands with arm 1372 in the position shown and is utilized in a manner described later. Arm 1372 is connected through a terminal 1440 to a source of power as described later. It will be noted, however, that if it makes one step counterclockwise, a lead 1374 designating nine pines down is energized, or if it moves two steps counter-clockwise (two pins standing) a second lead 1374 is energized, designating eight pins down, etc. The switches 1326, shaft 1344 and related equipment are located at the pit. The lead 1366 extends between the pit and the players' table. Solenoid 1368, the stepping switch 1370 and means for automatically utilizing information are located at the players' table.

The wiring diagram of the circuit for utilizing information from the pit is shown in FIG. 42. The previously described stepping switch 1370 (see also FIG. 41) and arm 1372 are shown in FIG. 42 with a holding pawl 1402 which is urged counter-clockwise about a pivot 1401 by a spring 1403. Pawl 1402 engages a series of ratchet teeth 1373 on switch 1370 and thereby maintains switch 1370 at the position to which it is advanced by solenoid 1368 (FIG. 41) as previously described. Switch 1370 (FIG. 42) is urged clockwise to the position shown by a spring (not shown) and is released to assume this position by a solenoid 1404 which, when energized, rocks pawl 1402 clockwise about its pivot to disengage ratchet teeth 1373.

In the position shown, stepping switch 1370 indicates ten pins down after a ball is bowled. This may represent either a strike or a spare, depending on whether such ball is the first or the second ball of a frame. The determination of whether the ball is the first or the second is provided by control of the switch-release solenoid 1404 at the proper time and the sensing of the stepping-switch position at the beginning of a pin-count cycle. The mode of operation is as follows: Each ball bowled initiates a pin-count cycle, and, at the start of the first pin-count cycle, the switch 1370 normally is in its released, or home position, as shown. In this position all other switches are in their normal conditions and the next ball is treated as a first ball. If any pins are left standing after the next ball, the stepping switch 1370 is advanced one step counter-clockwise for each such pin. The score-computing machine cycles in the same manner as if a first-row key were depressed, utilizing the count as indicated by the position of the stepping switch. (It will be recalled that the computing machine enters first-ball information only if such should be counted). The stepping switch remains in the position to which it was advanced by pins remaining after the first ball was thrown. At the start of the next pin-count cycle, the stepping switch is sensed and since it is not in normal (released) position, a solenoid 1414 (FIG. 42) is energized which closes contacts to the second-ball entry circuit (FIG. 17). Solenoid 1414 (FIG. 42) is held for the entire utilization of this "second ball" count information by the score computing mechanism. At the termination of the cycle, the stepping-switch-release solenoid 1404 is energized and the next pin-count cycle will therefore relate to a "first ball." It will be noted if the "first-ball" is a strike, the stepping switch is at its home position and therefore the next ball should be and is treated as a "first ball." The stepping switch is released under control of the "mark" release lever in the computing machine.

A cam 1345 (FIG. 42) is fixed to the pin-count-cycle shaft 1344 which turns one rotation to sense and count the pins that remain standing, as previously described. Shortly after the start of the cycle, three switches 1418, 1419 and 1428 are closed by cam 1345. Switch 1428 connects a power source 1420 directly to the time delay solenoid 228 (see also FIG. 14) in the machine to start the computing cycle. Switc 1418 connects power source 1420 to a lead 1464 and serves as a holding supply, described later. Switch 1419 closes only momentarily during the early part of the pin-count cycle and, when closed, connects power source 1420 to a lead 1412. Lead 1412 terminates in a contact 1411 capable of cooperating with a disc 1408 integral with stepping switch 1370. There is a notch 1413 in disc 1408 such that when the disc stands in the position shown, no connection is made to lead 1412 through the disc. If, however, the stepping switch is in any other position (one or more pins standing), the closing of switch 1419 energizes the previously mentioned solenoid 1414 through lead 1412, disc 1408, a constantly engaged contact 1409 and a lead 1410. Energization of solenoid 1414 conditions a circuit for the second-ball count. Once solenoid 1414 is energized it is held energized until the computing mechanism terminates its cycle. A first holding circuit for solenoid 1414 is established through switch 1418, operated by cam 1345. Switch 1418 remains closed during the count cycle and supplies power from source 1420 through lead 1464 and a switch 1416 that is closed by solenoid 1414. Another holding circuit is established later in the count cycle, as described hereinafter. Following the closing and opening of switch 1419, another switch 1426 is closed momentarily by cam 1345 and energizes the stepping-switch-release solenoid 1404 to thereby restore the stepping switch in preparation for the new count. Switch 1426 momentarily supplies power from terminal 1420 through a lead 1466 and a lead 1406 to the release solenoid 1404.

It will be noted that the restoration of the stepping switch has no effect on the setting of the second-ball solenoid 1414 since, if the stepping switch were originally at its normal, home position, solenoid 1414 would not have been energized by previous closing of switch 1419 because of notch 1413 in disc 1408. If, however, the stepping switch had been out of its home position the holding switch 1416 would be effective and the release of the stepping switch for the new count could be effected without deenergizing solenoid 1414.

As previously stated, when the second-ball solenoid 1414 is not energized, it maintains first-ball conditions and the circuit operation under these conditions is described first. In FIG. 17 there is a terminal 429 connected to the contacts of the first-ball line of key switches 416, 420 and 424. It will be recalled that any closed switch in this line of switches completes a circuit from terminal 444 through the corresponding stop solenoid, through solenoid 438 and through the time delay solenoid 228 to ground.

Terminal 444 is shown in FIG. 42 and is energized through a toggle switch 1471 on the players' table from a power source 1470 when the normal keyboard is in use and switch 1471 is in its broken-line position. Switch 1471 may supply power through a terminal 445, a solenoid 1430, a holding switch 1432 that is closed when solenoid 1430 is energized, and terminal 444 to the previously described computer circuitry. Power is supplied to terminal 444 in this manner until the supply circuit is broken during the computer cycling to terminate the operation as previously described in connection with keyboard operation. Solenoid 1430 is normally deenergized but is energized to supply power to terminal 444 during each normal cycle of the computing machine. Solenoid 1430 is initially energized when a switch 1434, operated by cam 1345, is closed momentarily during the latter part of the pin-count cycle. Power source 1470 is thereby connected through 445, solenoid 1430, a lead 1433, switch 1434 to ground. This operates solenoid 1430 which closes switch 1432, supplying power to terminal 444, as described above. From terminal 444, a circuit is completed through the normal circuitry of FIG. 17, in the same manner as during the manual operation previously described, to a first-ball terminal 429 (shown also in FIG. 42), through a switch 1436 that normally is in the position shown, a lead 1438, switch 1440 that is closed by solenoid 1430, a lead 1442 that constitutes the input lead to stepping switch 1370, then through the actuated lead 1374 to the corresponding stop solenoid (FIG. 17), solenoid 438 and the time delay relay 228 to ground. This circuit remains closed until it is broken by normal operation of the computing mechanism, as previously described in connection with FIG. 17. Thus, first-ball operation of the computing mechanism, initiated by a pin-count cycle, is the same as that initiated by depression of a first-ball key, the stepping switch 1370 (FIG. 42) substituting for the key switch 416 (FIG. 17).

Similarly, second-ball operation initiated by the pin-count cycle is the same as that initiated by depression of a second-ball key. In this case, switch 1419 (FIG. 42) which is closed by cam 1345 at the start of the pin-count cycle, will complete a circuit from power terminal 1420 through a lead 1412, disc 1408 (which is displaced from its home position because the first-ball cycle did not energize the switch release solenoid 1404), through lead 1410 and solenoid 1414 to ground. When solenoid 1414 is energized, it sets up second-ball conditions by operating several switches. The hold-circuit switch 1416 is closed and switch 1436 is reversed by connecting it to a second-ball terminal 431 (see also FIG. 17). Other switches, described later, also are operated by solenoid 1414. The second-ball circuit of FIG. 17 is connected to the power source 1470 (FIG. 42) through solenoid 1430, switch 1432, terminal 444 (see also FIG. 17) through the normal circuitry of FIG. 17 to the second-ball terminal 431, switch 1436 (FIG. 42), lead 1438, switch 1440, lead 1442, stepping switch 1370, the actuated lead 1374, and to ground through the circuit of FIG. 17, as described above.

The second-ball solenoid 1414, once energized, is maintained energized during the pin-count cycle by switch 1418 which is closed by the count-cycle cam 1345 and supplies holding current to solenoid 1414 from terminal 1420 through switch 1418, a lead 1464 and switch 1416 which is closed by solenoid 1414. Before switch 1418 opens, switch 1434 is closed by cam 1345 to energize a solenoid 1430 through a lead 1433 ad thereby close a switch 1462, which maintains solenoid 1414 energized after switch 1418 re-opens and until the computing cycle is completed to deenergize solenoid 1430. This second hold circuit for solenoid 1414 is as follows: Power terminal 1420, a lead 1424, a lead 1425, switch 1462, a lead 1463, a lead 1460, lead 1464, switch 1416 and solenoid 1414 to ground. It is obvious that if solenoid 1414 is not energized at the time switch 1462 is closed, switch 1416 is open and no energization of solenoid 1414 can occur. Once energized, however, solenoid 1414 remains energized until solenoid 1430 is deenergized and switch 1462 is opened thereby. Thus, second-ball conditions of the circuit of FIG. 42, which conditions are determined at the beginning of the pin-count cycle, are maintained until the second-ball information is utilized by the computing mechanism.

It was previously stated that the "mark"-release lever 760 (FIG. 23) serves during the computing of the score, to release the stepping switch 1370 (FIG. 42) to its normal position. This is accomplished by means of a switch 1422 operated by lever 760 (FIG. 23). Switch 1422 (FIG. 42) energizes the release solenoid 1404 by applying power thereto from terminal 1420 through a lead 1424 and lead 1406.

Other switches shown in FIG. 42 control the automatic operation in case of a foul. Normally, a foul is detected automatically by well known apparatus not a part of this invention but cooperating therewith to register the correct score. A solenoid 1457 is energized by foul-detecting equipment which closes a switch 1458 and normally maintains the latter switch closed for a few seconds and then opens it. When solenoid 1430 is energized, solenoid 1457 receives energizing current from power source 1420 through leads 1424 and 1425, switch 1462 and lead 1463, and the circuit is completed through solenoid 1457 and switch 1458 to ground. Once energized, solenoid 1457 remains energized until the end of the computing cycle by closing a switch 1456 in parallel with switch 1458.

Switch 1458 is shown in the schematic diagram of FIG 42A with foul detection circuitry. A light source 1620 forms a beam to a photo cell 1622 which cell conducts current when the light shines upon it but is practically non-conductive when dark. Circuit source leads to this photo cell are 1624 and 1625 and a relay 1626 is in series with the photo cell. Relay 1626 normally holds open a switch 1627. Breaking of the light beam reduces current to relay 1626 thereby closing switch 1627 which connects source 1623, lead 1629, foul signal 1628, a solenoid 1630, a thermal switch 1634, to ground. Closing of switch 1627 is momentary but operation of solenoid 1630 closes switch 1632 which is in parallel with switch 1627, thereby holding the foul signal current from source 1623, after switch 1627 opens by energization of relay 1626. A thermal switch 1634 breaks the circuit after a predetermined time delay. Solenoid 1630 closes switch 1458 (see also FIG. 42) and holds it as long as foul signal is effective.

The foul solenoid 1457, when energized, opens the previously mentioned switch 471 (FIG. 41) which disables stepping of stepping switch 1370, thereby leaving it in its normal, home position. In the absence of a foul, this position of the stepping switch would indicate a strike (no pins remain standing after the first ball) and would supply power from contact 1444 (FIG. 42) through a lead 1445, a switch 1446 and a switch 1448 to contact 433, which is shown on FIG. 17 connected to the strike-key lead 492. Switch 1446 (FIG. 42) is disconnected from the strike circuit by the energization of solenoid 1457 and is connected through a lead 1449, a switch 1450, a lead 1451 and a double-wound solenoid 1453 which is connected in series to the zero lead 1374 from switch 1370. Thus, a foul on the first ball counts as a zero and enters zero into the computer if conditions require that the first ball be counted.

If a foul occurs on the second ball the number of pins downed by the first ball will be entered, as previously explained in connection with manual operation. It will be recalled that a second-ball foul closes switch 512 (FIG. 17) if the previous first-ball pins were counted. In automatic operation first-ball pins are always counted; therefore, a second-ball foul always completes a circuit from terminal 449 to terminal 429. This is accomplished by a switch 1452 (FIG. 42) that is closed by the foul solenoid 1457 and a switch 1454 that is closed by the second-ball solenoid 1414, these two switches then being connected in series between terminals 449 and 429.

Normally, if stepping switch 1370 is in its home position after the second ball, a spare is entered through contact 1444, a lead 1445, switch 1446 controlled by solenoid 1457 but is in its upper position in the absence of a foul, a switch 1448 controlled by solenoid 1414 and in its lower position for a second ball, and through terminal 435 connected to the "spare" circuit in FIG. 17. A second-ball foul, however, breaks this circuit by reversing switch 1446 and connecting it to lead 1449. Switch 1450 is connected to lead 1449 and is opened by the second-ball solenoid 1414; therefore, a zero is not registered in case of a second-ball foul. It will be recalled that during manual entry, switch 426 (FIG. 17) was closed to energize solenoid 502 from terminal 444 through switches 426 and 506. During automatic operation, terminal 444, is connected to solenoid 502 by a switch 1481 (FIG. 42), closed by the foul solenoid 1457, a switch 1483, closed by the second-ball solenoid 1414 and a terminal 1485 (see also FIG. 17). The automatic operation of the machine in response to a second-ball foul therefore corresponds to the manual operation previously described.

It may happen that one foul occurs on the first ball and another foul occurs on the second ball of the same frame. In any event, a ball following a first-ball foul should be recognized as a second ball. The double-wound solenoid 1453 is in series with lead 1451 through which the zero output lead 1374 from stepping switch 1370 is energized in response to a first-ball foul, as previously described. A switch 1455 connects leads 1410 and 1412 whenever solenoid 1453 is energized. Therefore, if a second-ball foul occurs after a first-ball foul, the closure of switch 1419 by cam 1345 completes a circuit for energizing the second-ball solenoid 1414 from terminal 1420 through switch 1419, lead 1412, switch 1455 and lead 1410. Solenoid 1453, once energized in response to a first-ball foul, is maintained energized through a first hold switch 1469 and a second hold switch 1467. Switch 1469 is opened by operation of the second-ball solenoid 1414; therefore, any operation following a first-ball foul is treated as a second-ball operation and thereafter first-ball conditions prevail when solenoid 1453 is thereby released.

FIG. 43 shows mechanism for automatically controlling the reception of information from the pit when the scoring device is being used for team play in which the bowlers use both alleys of a pair in accordance with league rules. In this form of play, the bowlers on team A start on alley A and the bowlers on team B start on alley B. When all bowlers on both teams have completed a frame, the bowlers on team A bowl on alley B and the bowlers on team B bowl on alley A.

As previously mentioned, only one computing machine of a pair of used for team A and the remaining machine is always used for team B, regardless of the alleys on which they bowl. FIG. 43 shows a portion of a double-throw switch 1475 which is interposed between the output leads 1374 (FIGS. 41 and 42) from the stepping switch 1370 and the input leads 452 (FIG. 17) to the stop solenoids.

A series of contacts 1474 (FIG. 43), which are connected directly to the respective output leads 1374 of the stepping switch, are engaged by a corresponding series of contacts 1478 which are moved by switch 1475 and which lead to the stop solenoids in the computing machine. There is one contact 1474 for each output lead from the stepping switch associated with alley A and a similar contact 1474 for each output lead from alley B. There is a contact 1478 leading to each digit-stop position on machine A and a corresponding contact 1478 leading to each digit-stop position on machine B. Each A-B pair of input leads 1374 may be cross-connected to the corresponding B-A pair of output contacts 1478 by means of a series of crossed contacts 1476, one of which is connected to each output lead 1374. In the position of switch 1475 shown in FIG. 43, contacts 1478 have been moved by switch 1475 to engage contacts 1476 to thereby connect each lead 1374 from stepping switch 1370 of alley A to the associated contact 1478 of computing machine B, and vice versa. It will be seen therefore that each computing machine of a pair may utlize the information from either stepping switch of a pair but not from both at the same time.

The mechanism for reversing the contacts of switch 1475 includes a bellcrank 1480 having a roller 1482 that is urged clockwise by a spring 1481 to follow the contour of a cam 1483 freely mounted on a stud 1486. Cam 1483 is integral with a ratchet 1488 which has eight teeth. Roller 1482 is shown in contact with a low portion of cam 1483, in which position the contacts 1478 of switch 1475 engage the respective contacts 1476. If cam 1483 is advanced one ratchet stop clockwise, the follower 1480 will be counter-clockwise to place roller 1482 on a high portion of the cam, then contacts 1478 are moved into engagement with contacts 1474. The next ratchet step of cam 1483 again places switches 1475 in the position shown. Ratchet 1488 is advanced one step at a time by a pawl 1490 urged against the ratchet by a spring 1492. Pawl 1490 is pivoted on a lever 1494 at 1498 and lever 1494 is mounted on a fixed pivot 1496. A solenoid 1502, when energized, rocks lever 1494 clockwise through a pivotal connection therewith at 1500, and pawl 1490 rotates ratchet 1488 and cam 1483 clockwise one step. Solenoid 1502 is energized when both computing machines are positioned at the first bowler's score receiving position.

A switch 1506 in series with solenoid 1502, is closed by machine A when the carriate 800 (FIG. 4) of machine A is at its first bowler's position and a similar switch 1504 (FIG. 43) in series with switch 1506 and closed when the carriage of machine B is at its first bowler's position. When both switches 1504 and 1506 are closed, they connect a power source 1512 to the input of solenoid 1502. It will be recalled that after the last player on a team bowls, the carriage automatically adjusts to its first position.

The players on the other team may not be through with the frame, however, and the setting of switch 1475 should not be changed. Since switches 1504 and 1506 are in series, the energization of solenoid 1502 cannot occur until both teams have completed the frame. A toggle switch 1510, operated from the players' table is in series with switches 1506 and 1504 and is closed for team bowling to provide the automatic operation described. When switch 1510 is not connected in series with switches 1504 and 1506, power from terminal 1512 is supplied to solenoid 1502 through a lead 1511, a switch 1513 that is opened by an arm 1515 on bellcrank 1480 when roller 1482 engages a high portion of cam 1483, and a lead 1517. Thus, any time switch 1510 is in its raised, or "off" position, solenoid 1502 is energized and switch 1475 is returned to its initial position (opposite that shown in FIG. 43) if it happens to be in the reversed position shown. This action also deenergizes solenoid 1502 by opening switch 1513. This insures normal play (not team) connections to the machines.

A normally open button switch 1508 is connected across switches 1506 and 1504 and, when depressed, reverses switch 1475 by energizing solenoid 1502 to allow a bowler to "make up" a frame missed or for correction. A circuit is provided for visually indicating the alley from which the information is being directed to each computing machine. Two lamps 1516 and 1518 are located on the A side of the players's table and two lamps 1520 and 1522 are on the B side of the table. A contact 1489, moved by switch 1475, engages a contact 1486 to connect lamps 1518 and 1522 to a power terminal 1495 and inform players that A machine is receiving information from B alley and B machine is connected to A alley.

When switch 1475 is in its normal position, lamps 1516 and 1520 are energized through a contact 1484 to show that information for A and B machines is coming from A and B alleys, respectively. Other switches may be included in the main cross switch supplement or complete the circuitry of FIG. 42 to respective stepping switches so that each operates as a unit to the respective machines.

FIG. 44 shows the means for locating the pointers 10 in position represented by the carriage position of each respective line. It will be recalled that a pointer is projected onto the screen and also onto the table (FIG. 1) for each section (A and B) to indicate the line receiving the score in each section. The pointer for section A (FIG. 44) is secured to a cord 1530 supported on pulleys 1532, 1534, 1536 and 1538, and may be moved relative to the first six lines or "A" section of the score frame 823. The movement of the carriage is less than the movement of the arrow; therefore, pulleys of smaller diameter 1535 and 1537 are integral with the pulleys 1536 and 1538, respectively, and a cord 1541 is placed around the smaller diameter pulleys. The carriage of machine A is connected at 1540 to the cord 1541 and in the position shown is at the position in which the first set of three line gears is in position to engage the racks. The arrow is therefore positioned at the top line.

The second, or B section, is associated with another machine, as previously described, and the arrow is secured to cord 1549 supported by pulleys 1542, 1544, 1546 and 1548. The pulleys are driven by the cord 1551 secured at 1550 to the second, or B machine carriage, which is shown in position to be engaged with the racks at the second set of line gears; therefore, the arrow will be projected to indicate that the second line is receiving the score.

FIG. 45 shows a lateral view of the pulleys and arrows 10, to show the relative location of parts for avoiding interference therebetween.

The method of supporting the display rack for convenient access and removal is shown in FIG. 46. The display racks 823 are supported on a pair of brackets 1658 and a pair of brackets 1659 secured to a door 1652. The door is supported by hinges 1660 in the right side of the display cabinet as viewed from the front. The door is located below and in alignment with the score calculating and printing mechanism so that when the door is closed the display racks are in position to receive the printed pieces as described previously.

The display rack of FIG. 26 is bordered by a frame member 1650 on each side and 1650a on the bottom secured together to make a solid frame. The supports 825 for the shaft 824 previously described are secured to frame members 1650 and are integral with a bail 1654 which extends across the back of the display rack. A similar bail 1656 extends across the back on the lower side of display rack and is secured to the frame by arms 825a on each side. A notch in each bracket 1659 supports the bail 1656 on the lower side and a notch in each bracket 1658 supports the upper bail 1654. The brackets are so located as to provide accurate positioning of the frame relative to the machine and locating pins may be used in the door to provide accurate and solid support when it is closed.

A slot 1651 is provided in the frame 1650 to insert the card or metal plate which contains the names of the bowlers for correct display at each line position.

It was previously pointed out that the printing and display were not necessarily restricted to the form shown and that the machine could be utilized to compute scores and to print a record which could be utilized in a different manner. For example, a strip might be printed for the marks and a strip for the scores and not necessarily projected. Each being printed as developed would serve as a record and no relative displacement of the marks and scores would be apparent. Furthermore a printing of the marks only in conjunction with a single register at each line would greatly increase the utility of such register since it would provide a means of checking any score to ensure that the amount in a register represents the correct score. It is desirable under these circumstances especially that all ball information be printed and the elements provided in this specification will, with slight modification, provide this type of operation.

It will be recalled (FIGS. 21 and 23) that printing of first ball information such as foul and split was provided with one type carrier and second ball information such as spare, foul, miss, chop was provided with another type carrier which also printed a strike so that either strike or spare would be printed in the usual place for such marks. A fixed stop 674 was provided to control the printing when none of the stops to control other specific marks was effective.

FIG. 47 shows means for control of printing all ball information and to distinguish such as first or second ball information. Modification to the racks is necessary to provide printing type for each number 0-9 inclusive and further travel of the type carriers will be necessary.

It will be recalled that shaft 598 moves leftward (FIG. 21) during each sensing cycle and a respective spring 596 and 597 on each of the racks 594 and 595 causes the carriers to follow the excursion of the shaft 598 until stopped by one of the various stops. Provision of means to print all ball information is made to be accomplished by a common number stop for each digit. This is a modified stop 144a (FIG. 47A) positioned to be effective by the stop solenoids 146 (FIG. 3) provided and previously described but with effective stop areas in the path of movement of the first and second ball mark print carrier members (FIGS. 21, 47, 47A) and the units digit rack which controls entry for score. The modified stops are supported and guided by a comb frame 1670. Means are provided to allow the release of only one ball information type carrier at a time. A T-shaped member 1672 is pivoted at 1673 and has an ear 1677 in position to block an ear 1676 of the second ball (information) type carrier and when rocked clockwise will position ear 1674 to block ear 1675 of the first ball type carrier. A spring 1678 tends to hold it counter-clockwise to provide for printing of first ball information. Means for blocking the type hammer of the second or alternatively of the first ball information are also provided and shown in FIG. 47B. The print hammers 606, 608 (FIGS. 21, 23) are normally blocked by a single block 612 which is removed whenever marks are to be printed as described. In modified use it is removed with each sensing cycle and a plate 1680 pivoted on one of the guide studs 612a (FIG. 47B) is effective to normally block the second ball type hammer. A solenoid 1682 is operated by strike key circuit or second ball switch circuit controlled by solenoid 1414 both shown in FIG. 42 circuitry. Operation of solenoid 1682 (FIG. 47B) swings plate 1680 clockwise to block first ball print hammer and at the same time rock type carrier block member 1672 (FIG. 47) clockwise to block the travel of the first ball print type carrier. The two members are connected by link 1684 pivoted to the member 1672 and hooked to an arm to block 1680.

It will be seen then that with above modification of previously described structure all ball information may be printed for record and check purposes. A ribbon or carbon of any well known type may be provided in lieu of the ink pad.

The machine may be readily adapted to printing on score sheets with the elements previously described which provide information for printing as well as for control of the positioning of the printing elements relative to the score sheet to register the scores in the proper frame space.

FIG. 48 shows a proposed structure for this method of printing for record or display. A table 1700 is mounted for movement both rightward and leftward as shown in the drawing and also for movement in a plane perpendicular to that plane. The movement leftward is provided to advance the score sheet to the next scoring frame position relative to the printing elements and the movement toward and away from the viewer is provided to position the score sheet at the proper player's line position.

The line position adjustment of the table is provided by a pair of rollers 1702 on the right and a pair 1703 on the left. They are contained and guided in channels 1704 and 1705 respectively. These channels are secured to a movable carriage 1706 which is capable of rightward and leftward movement by a pair of rollers 1708 at the left and 1710 at the right. These are guided by channels 1712 and 1713 to provide straight line movement of the carrier 1706 leftward and rightward. The carriage 1706 is mounted for this movement on a platform 1714 guided by a pair of fixed pins 1716 at the left and a pair 1718 on the right through slots in the plate 1714 to allow limited rightward travel of the plate 1714 from the position shown.

The various movements so allowed are provided and controlled in the following manner. The players line position is dependent on the position of the score register carriage (800 FIG. 4) which moves a toothed rack 1720 rightward or leftward (FIG. 48). The rack 1720 is in engagement with a gear 1722 secured to a worm shaft 1724. The worm shaft 1724 carries two plates 1726 and 1727 which embrace and guide the table 1700. The worn shaft is mounted for support on stationary machine frame members (not shown). The worm positions the plate members 1726 and 1727 in accordance with the line receiving the score and thereby positions and guides the table 1700 to print the score at the proper players line.

The carriage 1706 is spring urged leftward relative to the plate 1714 by spring 1730 and is retained by an escapement member 1734 which when reciprocated about pivot 1736 fixed to the plate will allow a one tooth movement leftward by teeth 1735 on the carriage 1706. The escapement member 1734 is rocked each time the carriage 800 reaches the first player position to advance the score sheet to the next frame position by upward movement of arm 1740 which underlies arm 1738 of the escapement member.

It was previously stated that score printing must be done in lower frame positions as a result of the bonus count in the higher or subsequent frames. The carriage 1706 is advanced leftward with each frame as described and therefore must be moved rightward to position the score sheet to a lower frame position relative to the print elements (576) when a bonus count is entered. This is provided by mechanism described later but allowed by slots through which studs 1716 and 1718 extend so that the entire plate 1714 may move rightward. A spring 1732 is provided to maintain the plate 1714 in the position shown. A latch 1734' is provided on a fixed pivot 1736' and will hold the plate 1714 in one of three positions by ear 1735' in contact with a tooth 1737. Latch 1734' is lightly spring urged counter-clockwise by a spring (not shown). Plate 1714 is released to normal position with each add print cycle by an arm 1742 rocked upward by a cam on the add print clutch to rock the latch 1734' clockwise or by an arm 1743 rocked upward whenever the carriage is moved to the next player line position.

The plate 1714 is positioned correctly for printing bonus scores in the proper frame position by means shown in FIGS. 48 and 49. The tens stop member 162 (FIG. 3) is used to control this positioning. The tens stop member 162 is modified (FIG. 49) to include a blocking surface 1750 for an ear 1754 on a bellcrank 1756 pivoted at 1757. The blocking surface 1750 is in the position shown when the tens stop member is at zero. As the tens stop advances (leftward) to position to add ten to the register, the block 1752 is effective, and in a position to add twenty the block 1753 is effective. Each allows further rocking of bellcrank 1756. Bellcrank 1756 is rocked counter-clockwise by a link 1758, pivoted to the bellcrank and also pivotally secured to cam follower 1760. Cam follower 1760 is pivoted on a fixed pivot 1764 and strongly urged clockwise by spring 1766. Roller 1761 engages a cam 1763 on the sensing clutch 268. Each time the sensing clutch operates the roller 1761 enters the depression 1763 early in the sensing cycle and spring 1766 is effective to rock bellcrank 1756 counter-clockwise until limited by one of the stop surfaces on the tens stop member.

A score of 30 added to the line can only occur with three consecutive strikes and this is displaced two frames from the current frame. For example, a strike in the fifth frame following a strike in the third and fourth frames will register the score in the third frame (two displaced). A score of 20–29 inc. is also possible after two strikes and is displaced two frames. A score of twenty, however, caused by a strike following a spare or a spare following a strike will only be displaced one frame and similarly a score of 10–20 inc. may be displaced only one frame. The tens stop member is always displaced one step to add ten whenever a strike or spare occurs and is in this position at the beginning of a subsequent frame. After a double (two consecutive strikes) and only after a double the tens stop is positioned at 20 at the beginning of the next frame. The tens stop is therefore sensed by bellcrank 1756 (FIG. 49) at the beginning of each sensing cycle and if the tens stop is at zero it is blocked with no movement, if at ten position it will rock one step to limit against 1752 and if at twenty, two increments of movement are allowed by block 1753.

The movement of bellcrank 1756 is used to position plate 1714 (FIG. 48) by linkage shown in FIGS. 48 and 49. An arm 1770 of a bellcrank pivoted at 1772 (FIG. 48) extends in the path of bellcrank 1756. The other arm 1774 extends in front of a lever 1776 pivoted at 1778 on a long stud on frame 1780 on which both bellcranks 1756 and 1770 are pivoted at 1757 and 1772, respectively. Rocking of bellcrank 1756 as described causes counter-clockwise movement of lever 1776 about pivot 1778 to the extent allowed by the tens stop control as explained. This movement provides one or two steps of movement of plate 1714 dependent on the set position of the tens-stop member and will therefore, provide the correct relative displacement of the printing elements with regard to the score sheet.

It is obvious that the score sheet may remain fixed and that remote printing elements may be controlled for movement in the same manner as described above for the score sheet and thereby for printing in the proper line and in the proper frame position. The amounts to be printed whether input, symbols or scores are all available within the machine provided and described above and the control of the correct print positions is also provided and described.

It is suggested that certain symbols such as "chop" may be different in different parts of the country and should be changed accordingly. Also, that certain bowlers are superstitious about printing of a score when a number of strikes are bowled in sequence. The tens-stop member when at the 30 position may be linked to the score block plate 614 (FIG. 23) to prevent such printing but otherwise all scoring occurs as usual. This would then show blank frames in all cases where 30 is added to the score.

I claim:

1. In a device for calculating bowling scores and having means for setting up successive frame scores of 0–30 for individual bowlers, the combination, to wit: a plurality of registers, each register corresponding to an individual bowler and each register comprising at least three positionable, decimally ordered memory elements, each element having an initial zero position and a plurality of other positions representing decimal digits; a set of reciprocable entry members adapted to be operatively associated with the respective memory elements of any selected register and adapted, upon reciprocation thereof, to advance the associated memory elements to positions representing higher-valued decimal digits; means including a shiftable carriage for associating said set of entry members with the memory elements of a selected register; means for reciprocating said entry members; a respective selectively operable stop mechanism controlled by said setting-up means for limiting the reciprocating movement of each of the two lowest-order entry members to thereby limit the advance of the associated memory elements; the lowest-order stop limiting reciprocating movement of the lowest-order entry member in the frame the stop is operated and the next order stop limiting reciprocating movement of the next order entry member in one or more succeeding frames when operated in the first of a series of frames; and tens carry mechanism interrelating each of the two lowest-order memory elements of the selected register and the next-higher-order entry members for incrementally altering the reciprocating movement of the latter in response to the advance of a memory element from a position representing a decimal digit 9 to a position representing a decimal digit 0.

2. The calculating device defined in claim 1 wherein the stop mechanism for the lowest-order entry member includes a plurality of lugs spaced in the direction of reciprocation of the lowest-order entry member, with: a respective solenoid for controlling each stop lug to move a lug into position for stopping said lowest-order entry member in response to energization of the corresponding solenoid; and electrical connections from said setting-up means to said solenoids for selectively energizing the latter in response to ball information.

3. The calculating device defined in claim 1, with: means cooperating with said registers for detecting the completion of an accumulated frame score; and mechanism operated by said detecting means for shifting said carriage in response to each completion of an accumulated frame score to thereby operatively associate successive registers with said entry members.

4. In a device for calculating scores of a bowling game wherein a maximum of two balls are bowled during each of a succession of scoring frames, the combination, to wit: a plurality of registers, each register corresponding to an individual bowler and each register comprising at least three decimally ordered memory elements adapted to be actuated for receiving and accumulating ordinal decimal values representing successive frame scores for said individual bowler; tens carry means interposed between the successive decimal orders of each register for transmitting carry-value actuations from one memory element to the next higher order memory element of the same register; cyclically operable ordinal actuating means for differentially driving the respective memory elements of a register that is operatively associated with said actuating means; shifting means for operatively associating said ordinal actuating means with the respective memory elements of successive registers; value entry means operable for differentially conditioning said actuating means in accordance with the scores attributable to the first ball of each scoring frame and to both balls of each scoring frame; a first cyclically operable programming device; means operable in response to each operation of the value entry means for cycling said first programming device; a second cyclically operable programming device serving to program the addition of completed frame scores into a corresponding register; means for determining the completion of a frame score; and means operable under control of said first programming device for cycling said second programming device in response to operation of said determining means upon the completion of a frame score to add the completed frame score into a corresponding register.

5. The calculating device defined in claim 4, wherein said value entry means includes a keyboard having a plurality of manually-depressable keys corresponding to the various possible scores.

6. The calculating device defined in claim 4, wherein said value entry means includes an electrical circuit, with: means for transmitting electrical signals representing the score attributable to only the first ball of a frame and the score attributable to both balls of a frame to said electrical circuit.

7. In an apparatus for calculating scores of a bowling game wherein a maximum of two balls are bowled during each of a succession of scoring frames, the combination, to wit: value-setting means for setting up a first score attributable solely to the first ball of a scoring frame and a second score attributable collectively to both balls of a scoring frame; a score register in said apparatus corresponding to a bowler and adapted to receive and store score values of an individual bowler; an actuator adapted to interconnect said value-setting means and said register and effective, upon operation thereof, for entering a score value from said value-setting means into said register; means for determining the first-ball or both-ball character of a score value set up by said value-setting means; and means controlled by said determining means and normally effective for operating said actuator only in response to the setting up of said second score.

8. The apparatus defined in claim 7, with: a plurality of additional score registers corresponding to respective additional bowlers; means for associating said value-setting means with successive ones of said score registers; and means selectively operable under manual control for clearing a predetermined score register and only said predetermined register.

9. The apparatus defined in claim 7, with: a plurality of additional score registers; and means, independent of said value-setting means and operable under manual control, for entering a value into a predetermined one of said score registers.

10. The apparatus defined in claim 7, wherein said value-setting means includes a keyboard having two sets of keys for setting up said first and second score, respectively.

11. The apparatus defined in claim 10, with: a plurality of indicator lamps associated with said keyboard, each indicator lamp corresponding to a respective one of said keys and bearing an indicium representing the significance of its corresponding key; and means operable, in response to depression of a key, for illuminating the corresponding indicator lamp.

12. The apparatus defined in claim 10, wherein a predetermined scoring circumstance requires said first score to be entered into said register, with: means for detectng the occurrence of said circumstance; and means operable under control of said detecting means for locking against operation the set of keys for setting up said second score.

13. The apparatus defined in claim 12, with: a plurality of additional registers, each corresponding to an individual bowler; a respective one of said determining means associated with each of said additional registers; and shiftable means for associating said determining means with successive registers.

14. The apparatus defined in claim 7, wherein a predetermined scoring circumstance requires said first score to be entered into said register, with: means connected to said value-setting means for temporarily storing a manifestation of said first score; means for entering the occurrence of said circumstance; and means operable under control of said entering means, in response to the entry of said circumstance, for operating said actuator to enter sad first score from said temporary storing means into said register.

15. The apparatus defined in claim 14, wherein said actuator includes a yieldingly reciprocable member and wherein said temporary storing means includes a plurality of stop members positionable to block said reciprocable member at differential positions during its reciprocation and a locking member cooperating with said stop members for locking the latter in any set position, with: releasing means effective, upon operation thereof, for unlocking said locking member; and means for operating said releasing means.

16. The apparatus defined in claim 14, with: means normally effective, upon the setting-up of said second score, for changing said stored manifestation to correspond to said second score; and means operable under control of said entering means, in response to the entry of said scoring circumstance, for disabling said changing means.

17. The apparatus defined in claim 14, with: means for detecting the setting-up of said first score; and means operable by said last-named detecting means for locking said actuator-operating means unless said first score has been set up.

18. The apparatus defined in claim 7, wherein a predetermined scoring circumstance requires said first score to be entered into said register, with: a member having set and reset positions of operation for selectively controlling the entry of said first score into said register; means for detecting the occurrence of said scoring circumstance; and means operable by said detecting means, in response to the occurrence of said scoring circumstance, for moving said member from its reset state to its set state.

19. The apparatus defined in claim 18, with: an indicator having first and second states for indicating, respectively, the presence and absence of said scoring circumstance; and means controlled by said member, in response to the assumption of its first and second states, for causing said indicator to assume its first and second states, respectively.

20. The apparatus defined in claim 18, with: means for restoring said member to its reset state upon entry of said first score into said register; and means operable, in response to entry of a score of ten attributable to both balls of a scoring frame, for disabling said restoring means.

21. The apparatus defined in claim 18, wherein said means for reversing the member comprises a normally deenergized first solenoid effective, upon energization thereof, for reversing said member, with: a tens-stop device having a plurality of positions for controlling entry of multiples of 10, corresponding to the respective position of said tens-stop, by said actuator into said register; a normally deenergized second solenoid effective, upon energization thereof, for changing the position of said tens-stop to represent a next-higher multiple of ten; means operable by said value-setting means, in response to the setting up of a frame score of 10, for energizing said second solenoid; and means operable by said value-setting means, only in response to the setting-up of a frame score of 10 attributable collectively to both balls of a scoring frame, for energizing said first solenoid.

22. The apparatus defined in claim 18, wherein said predetermined scoring circumstance is a disqualification with respect to the first ball of a scoring frame.

23. The apparatus defined in claim 18, with: means for sensing the entry of a ninth-frame second score into said register; and means controlled by said sensing means for reversing said member from its set state to its reset state.

24. The apparatus defined in claim 18, wherein a maximum base frame score is ten and wherein a bonus frame score is awarded for a base frame score of ten, with: a plural-state device having states corresponding to respective multiples of 10; means for setting said plural-state member to a state representing 10n, where $10(n+1) > S \geqq 10n$, where n is an integer and where S is the total frame score including base score and bonus; and means operable, in response to the setting of said plural-state member to a state representing twenty or more, for setting said member.

25. The apparatus defined in claim 24, with: a plurality of additional registers, each corresponding to an individual bowler; a respective bistable device, a respective setting means, a respective plural-state device and a respective plural-state device-setting means, as defined, associated with each of said additional registers; and shiftable means for associating said value-setting means, actuator, determining means and detecting means with successive registers.

26. An apparatus as defined in claim 18 with means responsive to the set state of said member serving to cause entry of the next ball score into the corresponding register.

27. The apparatus defined in claim 7, with: a plurality of additional registers, each adapted to receive and store score values of respective additional bowlers; shift means for associating said actuator with sucessive ones of said registers; and means controlled by said actuator-operating means for operating said shift means.

28. The apparatus defined in claim 27, with: manually operable means for operating said shift means.

29. The apparatus defined in claim 27, with: means for sensing the setting-up of a score value of ten in the tenth scoring frame for a bowler; and means controlled by said sensing means for disabling said shift means.

30. The apparatus defined in claim 29, with: an indicator effective, upon operation thereof, for indicating the requirement of bowling an additional ball following the tenth scoring frame for a bowler; and means controlled by said sensing means for oeprating said indicator.

31. The apparatus defined in claim 7, with: a plurality of additional score registers, each corresponding to a respective additional bowler; means for associating said value-setting means with successive ones of said score registers; a totalizer register adapted to receive and accumulate values; means for sensing the completion of a predetermined scoring frame for each of said bowlers; means controlled by said sensing means and normally effective, in response to the sensing of the completion of said predetermined scoring frame for a given bowler, for transferring into said totalizer register the value stored in the score register corresponding to said given bowler.

32. The apparatus defined in claim 31, with: selectively operable means for disabling said transferring means with respect to a predetermined score register.

33. The apparatus defined in claim 31, with: means for sensing the completion of said predetermined scoring frame by a predetermined bowler; and means controlled by said last-named sensing means for recording the value accumulated in said totalizer register and for clearing said totalizer register.

34. The apparatus defined in claim 31, with: selectively operable means for entering a value directly into said totalizer register under manual control and independently of said transferring means.

35. The apparatus defined in claim 34, with: means for setting-up said last-named value; and manually operable means for entering said set-up value into said totalizer register.

36. In an apparatus for recording scores of a bowling game wherein balls are bowled during each of a succession of scoring frames to earn cumulative scores based upon numbers of bowling pins downed by said balls and bonus values resulting from strikes and spares, the combination, to-wit a: score register for receiving and storing cumulative scores; means for entering into said apparatus values corresponding to pins downed; value-setting means controlled by said entering means for setting up frame scores based upon pins downed by said balls and bonus values resulting from strikes and spares; means controlled by said value-setting means for entering the frame scores into the register; means for supporting a printing medium providing a printing surface; and printing means controlled by said value-setting means for printing indicia, representative of said cumulative scores in said register when a frame score is entered, on said printing surface.

37. The recording apparatus defined in claim 36, wherein said printing means includes a respective printing face for each printable indicium; an inking surface; means controlled by said value-setting means for selectively engaging the printing faces of only the indicia-to-be-printed with said inking surface; and means for delaying said printing operation until the conclusion of said inking operation.

38. In an apparatus for recording scores of a bowling game wherein a maximum of two balls are bowled during each of a succession of scoring frames to earn scores based upon numbers of bowling pins downed by said balls, the combination, to wit; value-setting means for setting up said scores; means for supporting a printing medium providing a print surface; printing means controlled by said value-setting means for printing indicia, representative of said scores, on said printing surface; projecting means for displaying said printed scores; and means for completely concealing said printing means from said projecting means to prevent any projection of the former by the latter.

39. The recording apparatus defined in claim 36, with: mark-setting means for setting up representations of circumstances environmental to said scores; and additional printing means controlled by said mark-setting means for printing indicia, representing said environmental circumstances, on said surface.

40. In an apparatus for recording scores of a bowling game wherein a maximum of two balls are bowled during each of a succession of scoring frames to earn scores based upon numbers of bowling pins downed by said balls, the combination, to wit: value-setting means for setting up said scores; means for supporting a printing medium providing a printing surface; printing means controlled by said value-setting means for printing indicia, representative of said scores, on said printing surface; mark-setting means for setting up representations of circumstances environmental to said scores; additional printing means controlled by said mark-setting means for printing indicia, representing said environmental circumstances, on said printing surface; means for indicating the requirement for bowling of an additional ball following the tenth scoring frame; means for sensing the printing of a ninth-frame mark indicium; and means controlled by said sensing means for operating said indicating means.

41. The recording apparatus defined in claim 36, with: means for determining the completion of a frame score; and means, including said first-named controlling means, for delaying the printing of said score-representing indicia until the determination of the completion of a frame score.

42. The apparatus defined in claim 41, with means for visually displaying information printed in one printing operation prior to a subsequent printing operation.

43. The apparatus defined in claim 42, wherein the information relating to one scoring frame remains displayed during the printing and display of information relating to a subsequent scoring frame.

44. The apparatus defined in claim 42, with selectively operable means for removing from displaying position the printed information relating to a scoring frame.

45. The apparatus defined in claim 44, with: means for adjusting said value-setting means to correct an incorrectly set-up score.

46. The apparatus defined in claim 45, with: manually operable means for adjusting said mark-setting means to enter an omitted mark or correct an entered mark.

47. The apparatus defined in claim 41, wherein said printing surface is divided into two physical parts for receiving the printing of said score indicia and said mark indicia, respectively, with means for moving each part of said surface to respective display positions forthwith in response to the printing thereon.

48. The apparatus defined in claim 47, with: respective means at said display positions for receiving said parts of the printing surface; means for holding each of said parts at its respective printing position; and means, including said moving means, for releasing said parts to permit the latter to fall by gravity to their respective display positions.

49. The apparatus defined in claim 47, with: a 10th-frame programming device; means for sensing the presence of a ninth-frame score-print surface at its display position; and means controlled by said sensing means for operating said programming device.

50. The apparatus defined in claim 36, wherein said printing surface is physically divided into discrete pieces; display means comprising a plurality of receiving units for said pieces; and means for directing successively printed pieces into successive ones of said receiving units.

51. The apparatus defined in claim 50, wherein said value-setting means includes (a) value-entering means, (b) means for associating said value-entering means with successive ones of said registers, and (c) means for entering values from said value-entering means into the register associated therewith; and wherein said directing means is controlled by said associating means for directing said printed pieces to the receiving unit corresponding to the register which is associated with said value-entering means.

52. An apparatus as in claim 36 including a cyclically operable programming device for controlling tenth-frame operations; means for detecting the printing of the ninth-frame score; and means operable by said detecting means for cycling said programming device.

53. In an apparatus for recording scores of a bowling game wherein a maximum of two balls are bowled during each of a succession of scoring frames to earn scores based upon numbers of bowling pins downed by said balls, the combination, to wit: value-setting means for setting up a first score attributable solely to the first ball of a scoring frame and a second score attributable collectively to both balls of a scoring frame; means for supporting a printing medium providing a printing surface; printing means effective, upon operation thereof, to print indicia representing a set-up score on said surface; means for determining the first-ball or both-ball character of a score value set up by said value-setting means; and means controlled by said determining means and normally effective for operating said printing means in response to the setting up of said second score.

54. The recording apparatus defined in claim 53, with; a tenth-frame programming device; means for detecting the ninth-frame operation of said printing means; and means operable under control of said detecting means for initiating operation of said programming means.

55. The recording apparatus defined in claim 53, with: mark-entry means for setting up representations of circumstances environmental to the respective first and second balls of a scoring frame; means effective upon operation thereof, and including a part of said printing means, for printing indicia, representing said circumstances, on said surface at respective positions that are distinguished as to first-ball and second-ball circumstances.

56. The apparatus defined in claim 55, with: means for displaying said printed indicia for viewing, wherein the display position for displaying a first-ball indicium is to the left of the display position for displaying a second-ball indicium as said indicia are viewed.

57. The apparatus defined in claim 55, with: an interchangeable rack adapted to hold said surface for displaying said indicia.

58. The apparatus defined in claim 55, with: means for holding said surface at a position for displaying said indicia; a viewing screen; and optical means interposed between said display position and said screen for rotating an image of said display position substantially 90° in its own plane and for rotating said plane substantially 90° for viewing on said screen.

59. The apparatus defined in claim 58, with: a single cabinet enclosing said optical means, said screen and said recording machine.

60. The apparatus defined in claim 58, with: a second viewing screen; and optical means interposed between said display position and said second for rotating the plane of an image of said display position substantially 90° for viewing on said second screen.

61. The apparatus defined in claim 60, wherein the respective optical means associated with said first and second screens include at least one optical element in common.

62. The recording apparatus defined in claim 53, wherein said printing means comprises a plurality of printing members and a movable carrier for supporting said printing members, with: means controlled by said value-setting means for differentially limiting the movement of said carrier.

63. The recording apparatus defined in claim 62, with: first detecting means for detecting the setting-up of a score of ten attributable solely to the first ball of a scoring frame; second detecting means for detecting the setting-up of a score of ten attributable collectively to both balls of a scoring frame; first and second stop members constituting parts of said limiting means, said stop members being mutually spaced in the direction of movement of said carrier and normally out of the path of said carrier; means operable by one of said detecting means for inserting both of said top members into the path of said carriers; and means operable solely by the other detecting means for inserting only the second stop member into the path of said carrier.

64. In an apparatus for recording scores of a bowling game wherein a maximum of two balls are bowled during each of a succession of scoring frames to earn frame scores based upon numbers of bowling pins downed by said balls and bonus values resulting from strikes and spares, the combination, to wit: means for entering in said apparatus pinfall values corresponding to pins downed; value-establishing means controlled by said entry means settable to a plurality of states to represent respective ones of said scores; a score register in said machine adapted to accumulate cumulative score values of an individual bowler based upon the number of pins downed and bonus values resulting from strikes and spares; means to interconnect said value-establishing means and said register and effective, upon operation thereof, for entering a score value from said value-establishing means into said register; means for operating said interconnecting means; means for supporting a printing medium providing a printing surface; printing mechanism controlled by said register for printing the accumulated score of each scoring frame on said printing surface; means for clearing said register; and means for operating said clearing means to clear said register at the end of a game.

65. An apparatus as in claim 64 with: a second register; means for transferring a value from the first register to said second register; means for clearing said first register; means for sensing the printing of the ninth-frame score; and means controlled by said sensing means for operating said transferring means and said clearing means.

66. An apparatus as in claim 64 with: a plurality of additional score registers corresponding to respective additional bowlers; means for associating said value-establishing means with various ones of said registers; a plurality of print-displaying receiving devices corresponding to respective ones of said registers; and means controlled by said associating means for moving the printed portion of said surface to the receiving device corresponding to the register that is associated with said value-establishing means.

67. The apparatus defined in claim 66, with: indicating means operable by said associating means for indicating which register is associated with said value-establishing means.

68. The recording apparatus defined in claim 66, wherein said associated means includes a manually operable knob mounted externally of said machine.

69. The recording apparatus defined in claim 66, wherein said associating means includes means for detecting the bowling of the last ball of a scoring frame.

70. The recording apparatus defined in claim 66, wherein said associating means includes: a one-cycle clutch; means driven by said clutch and adapted to associate said value-establishing means with a next successive register during one cycle of said clutch; first sensing means for sensing the association of said value-establishing means with a first predetermined one of said registers; means controlled by said first sensing means for associating said value-establishing means with a second predetermined and non-consecutive one of said registers; second sensing means for sensing the completion of a scoring frame; and means controlled by said second sensing means for initiating a cycle of said clutch.

71. The recording apparatus defined in claim 66, with: a totalizing register adapted to accumulate values entered therein; means for sensing the values standing in said score registers; and means operable under control of said sensing means for transferring said last-named values into said totalizing register.

72. The recording apparatus in claim 71, with: means including a part of said printing mechanism, for printing on said surface a value standing in said totalizing register.

73. The apparatus defined in claim 53 in which said means controlled by said determining means is normally effective for operating said printing means for printing first-ball indicia on one portion of said surface and for printing both-ball indicia on a second portion of said surface.

74. In an apparatus for computing scores of a bowling game wherein a maximum of two balls are normally rolled by each of a plurality of players on a team during each of successive scoring frames to earn cumulative score values based upon pinfall resulting from the rolling of said balls including bonus values attributable to marks including strikes and spares, there being attributable to the strikes and spares made by the players of a team a predetermined mark count value, in combination, means for entering into the apparatus pinfall values including strikes and spares earned from the rolling of said balls, computing means controlled by said entry means for computing said cumulative scores, and means controlled by the entry means for totalizing player mark count values thereby to provide a running team mark count value indicative of the team score.

75. An apparatus as in claim 74 wherein said last-named means includes a counting device having an energizing input; first means for determining the occurrence of an isolated frame score of ten for a bowler; second determining means for determining the occurrence of frame scores of ten attributable solely to the first ball of each of two consecutive scoring frames of one bowler; first actuating means controlled by said first determining means for once energizing said input; and second actuating means controlled by said second determining means for twice energizing said input.

76. An apparatus for recording scores of a bowling game as in claim 36 with: a plurality of additional registers each corresponding to a bowler and adapted to receive and store score values of a corresponding bowler in which said means for entering completed frame scores transfers the scores into the register of the corresponding bowler and where said means for printing indicia representative of said cumulative score in said register when a frame score is entered in said register prints the frame score for the respective bowler at a corresponding location.

77. The apparatus as defined in claim 76 together with means for displaying the information corresponding to completed frames.

78. A calculating device defined in claim 4 wherein said value entry means includes an electrical circuit, with: means adapted to transfer signals attributable to the first ball of a frame and the score attributable to both balls of a frame to said electrical circuit.

79. A calculating device as in claim 78 wherein said value entry means also includes a keyboard having a plurality of manually operable keys corresponding to various possible pin information.

80. An apparatus as defined in claim 7 wherein said scores are achieved by downing bowling pins with balls, wherein said determining means includes an electrical circuit, wherein said value setting means includes a keyboard for controlling said circuit and includes means adapted to receive signals generated in response to each of said bowling pins downed to control said circuit and means for selectively associating either said keyboard or said signal receiving means with said actuator.

[81. An apparatus for calculating scores of a bowling game wherein normally first and second balls are bowled to knock down pins during each of a succession of scoring frames comprising a plurality of registers each corresonding to a bowler and adapted to receive and store score values of a corresponding bowler, means for entering information representing pinfall for each of said first and second balls, means responsive to the entry of pinfall for at least one of said balls to cause the apparatus to undergo a cycle of operation, means operable during said cycle serving to add pinfall corresponding to a first ball to a preceding frame when a preceding frame score requires such addition, means operable during said cycle for adding the total pinfall corresponding to both balls to the preceding frame when a strike has been scored in the preceding frame, means operable during said cycle serving to condition the apparatus to add pinfall from succeeding frames when the score requires such addition, and means operable during said cycle to add pinfall during said frame if the pinfall is less than 10.]

82. *An apparatus for calculating scores of a bowling game wherein normally first and second balls are bowled to knock down pins during each of a succession of scoring frames comprising a plurality of registers each corresponding to a bowler and adapted to receive and store score values of a corresponding bowler, means for entering information representing pinfall for each of said first and second balls, means responsive to the entry of pinfall for at least one of said balls, to cause the apparatus to undergo a cycle of operation, means operable during said cycle serving to add pinfall corresponding to a first ball to a preceding frame when a preceding frame score requires such addition, means operable during said cycle for adding the total pinfall corresponding to both balls to the preceding frame when a strike has been scored in the preceding frame, means operable during said cycle serving to condition the apparatus to add pinfall from succeeding frames when the score requires such addition, means operable during said cycle to add pinfall during said frame if the pinfall is less than 10,* [An apparatus as in claim 81 including additionally] printing means responsive to said adding means on completion of a frame score value for printing the score value, and means operable during said cycle for controlling the printing means so that score values are printed in the proper position.

83. An apparatus as in claim 82 including means for displaying score values.

84. An apparatus as in claim 82 including printing means operable during said cycle for printing ball information, and means operable during said cycle for controlling the printing so that the ball and score representations are printed in the proper position.

[85. An apparatus as in claim 81 including additionally counting means serving to count the frames bowled, and means controlled by said frame counting means serving to assure continuation of bowling for strikes and spares in the last frame.]

86. *An apparatus for calculating scores of a bowling game wherein normally first and second balls are bowled to knock down pins during each of a succession of scoring frames comprising a plurality of registers each corresponding to a bowler and adapted to receive and store score values of a corresponding bowler, means for entering information representing pinfall for each of said first and second balls, means responsive to the entry of pinfall for at least one of said balls, to cause the apparatus to undergo a cycle of operation, means operable during said cycle serving to add pinfall corresponding to a first ball to a preceding frame when a preceding frame score requires such addition, means operable during said cycle for adding the total pinfall corresponding to both balls to the preceding frame*

*when a strike has been scored in the preceding frame, means operable during said cycle serving to condition the apparatus to add pinfall from succeeding frames when the score requires such addition, means operable during said cycle to add pinfall during said frame if the pinfall is less than 10.* [An apparatus as in claim 81 including additionally] a totalizer means serving to total the score values of selected registers, and means operable during said cycle and upon completion of a 10th frame score value to transfer the individual score value from the register into the totalizer means.

87. An apparatus as in claim 86 which additionally includes means for clearing the individual registers upon completion of a 10th frame score value.

88. An apparatus as in claim 87 additionally including means operable during said cycle for printing the score values of each frame.

89. An apparatus as in claim 88 including means for continuously displaying the score values of each frame.

90. *An apparatus for calculating scores of a bowling game wherein normally first and second balls are bowled to knock down pins during each of a succession of scoring frames comprising a plurality of registers each corresponding to a bowler and adapted to receive and store score values of a corresponding bowler, means for entering information representing pinfall for each of said first and second balls, means responsive to the entry of pinfall for at least one of said balls, to cause the apparatus to undergo a cycle of operation, means operable during said cycle serving to add pinfall corresponding to a first ball to a preceding frame when a preceding frame score requires such addition, means operable during said cycle for adding the total pinfall corresponding to both balls to the preceding frame when a strike has been scored in the preceding frame, means operable during said cycle serving to condition the apparatus to add pinfall from succeeding frames when the score requires such addition, means operable during said cycle to add pinfall during said frame if the pinfall is less than 10,* [An apparatus as in claim 81 including additionally] means for counting marks, and means for displaying said mark count.

91. An apparatus as in claim 90 including means for displaying the score values.

92. An apparatus as in claim 90 including means for displaying representations corresponding to strikes, spares and splits.

93. An apparatus as in claim 92 including means for displaying representations corresponding to first and second ball pin count.

[94. An apparatus as in claim 81 including means operable during said cycle for conditioning the apparatus to add ten and the pinfall of the first ball of the next frame to the preceding frame when a strike has been scored in the preceding frame and the first ball is a strike.]

95. An apparatus as defined in claim 36 additionally including printing means for printing an indicium representative of ball information.

96. The apparatus defined in claim 7 with means for entering a disqualification with respect to the first ball of a scoring frame; means normally operable only in response to the setting-up of a score of ten attributable collectively to both balls of a scoring frame, for recording a score of said character; and means controlled jointly by said determining means and by said disqualification entry means for operating said recording means in response to the setting-up of a score of ten attributable solely to the second ball of a frame when a first ball disqualification is entered.

97. The apparatus defined in claim 7 with: means for entering disqualifications with respect to the first and second balls of a scoring frame; means for temporarily storing a first ball score; first recording means for recording an indication of a first ball disqualification; second recording means for recording an indication of a second ball disqualification and for recording a frame score; means operable upon entry of a disqualification and controlled by said determining means, in response to the entry of the first ball disqualification, for setting-up a first ball score of zero and for operating said first recording means; means operable by entry of disqualification and controlled by said determining means, in response to the entry of a second ball disqualification, for entering the first ball score from said storing means into said register and for operating said second recording means.

98. In an apparatus for calculating scores of a bowling game as in claim 7 including a predetermined number of scores registers in said machine corresponding to a predetermined number of bowlers; said actuator adapted to interconnect said value setting means and said registers and effective, upon operation thereof, for entering a score value from the value setting means into a corresponding register.

99. An apparatus as in claim 98 including means selectively operable for bypassing a predetermined register.

100. An apparatus as in claim 98 wherein the score values are entered into successive registers including means selectively operable for associating said value setting means successively with less than said predetermined number of score registers.

101. In an apparatus for indicating scores of a bowling game wherein bowling balls are rolled during each of successive scoring frames to earn cumulative score values corresponding to completion of each of said frames and completion of said game based upon pinfall resulting from the rolling of said balls, in combination, means for receiving and indicating during the progress of the game concurrently at separate locations respectively successive cumulative score values for said frames attributable to said pinfall, means for accumulating score values, means for determining completion of a frame score, and means for controlling said receiving and indicating means in response to the determination of completion of a frame score to indicate the cumulative score values of said accumulating means for each of said frames at separate locations respectively during the remainder of the game.

102. An apparatus as in claim 101 wherein said indicating means includes means for recording at separate locations for each frame said cumulative score values.

103. An apparatus as in claim 101 including means for receiving and indicating during the progress of the game at separate locations respectively bonus marks attributable to said pinfall for each of said frames, means for entering into said apparatus bonus mark information, and means for entering bonus marks into said receiving and indicating means for indicating the bonus marks for each of said frames at separate locations.

104. An apparatus as in claim 103 wherein said indicating means includes means for recording at separate locations for each frame said cumulative score values and said bonus marks.

105. An apparatus as in claim 101 including means for receiving and indicating throughout the progress of the game at separate locations respectively pinfall attributable to each of said balls for each of said frames, means for entering into said apparatus said pinfall, and means for entering said pinfall into said receiving and indicaing means for indicating the pinfall for each of said balls at separate locations for each of said frames.

106. An apparatus as in claim 105 wherein said indicating means includes means for recording at separate locations for each of said frames said cumulative frame scores and pinfall.

107. An apparatus as in claim 101 including means for receiving and indicating during the progress of the game at separate locations respectively marks attributable to said balls for each of said frames, and means for entering said marks into said receiving and indicating means for indicating the marks for each of said balls at separate locations for each of said frames.

108. An apparatus as in claim 107 wherein said indicating means includes means for recording at separate locations for each frame said cumulative frame scores and marks.

109. In an apparatus for recording scores of a bowling game wherein bowling balls are rolled during each of successive scoring frames to earn cumulative score values corresponding to completion of each of said frames and completion of said game based upon pinfall resulting from the rolling of said balls, in combination, means for receiving and recording at separate locations respectively successive cumulative score values for said frames attributable to said pinfall as the game progresses, means for accumulating score values, means for predetermining completion of a frame score, and means for controlling said receiving and recording means in response to the determination of completion of a frame score to record the cumulative score values of said accumulating means for each of said frames at separate locations respectively and maintain the same for at least the duration of the game.

110. An apparatus as in claim 109 wherein said recording means includes means for printing a record of the cumulative score values.

111. An apparatus as in claim 110 including additionally means for displaying said record.

112. An apparatus as in claim 109 including means for receiving and recording the progress of the game at separate locations respectively bonus marks attributable to said pinfall for each of said frames, and means for entering bonus marks into said receiving and recording means to record the same.

113. An apparatus as in claim 112 wherein said recording means includes means for printing a printed record of cumulative score values and bonus marks.

114. An apparatus as in claim 113 including additionally means for displaying said records.

115. An apparatus as in claim 109 including means for receiving and recording throughout the progress of the game at separate loctions respectively pinfall attributable to each of said balls for each of said frames, and means for entering said pinfall into said receiving and recording means.

116. An apparatus as in claim 115 wherein said recording means includes means for printing a printed record of said cumulative score values, and pinfall.

117. An apparatus as in claim 116 including additionally means for displaying said records.

118. An apparatus as in claim 109 including means for receiving and recording during the progress of the game at separate locations respectively marks attributable to said balls for each of said frames, and means for entering said marks into said receiving and recording means.

119. An apparatus as in claim 118 wherein said recording means includes means for printing a printed record of said cumulative score values, and marks.

120. An apparatus as in claim 119, including additionally means for displaying said records.

121. In an apparatus for computing and indicating scores of a bowling game wherein bowling balls are rolled during each of successive scoring frames to earn cumulative score values corresponding to completion of each of the frames and completion of the game based upon pinfall resulting from the rolling of said balls and bonus values resulting from strikes and spares, in combination, means for entering into the machine pinfall values earned from the rolling of said balls, means for computing from the pinfall values said cumulative score values, means for transferring pinfall values from said entry means to said means for computing, means for indicating during the progress of the game concurrently at separate locations respectively successive cumulative score values corresponding to said frames, and means for transferring said cumulative score values from the computing means into the indicating means frame by frame for indication during the remainder of the game.

122. An apparatus as in claim 121 wherein said indicating means includes means for recording said cumulative score values.

123. An apparatus as in claim 121 wherein said indicating means includes means for printing for each frame respectively a record of the cumulative score values.

124. An apparatus as in claim 123 including additionally means for displaying said record.

125. Apparatus as defined in claim 123 for computing and indicating successive cumulative frame score values for each of a plurality of players, wherein said computing means includes a plurality of individual player score value storage means respectively for storing player cumulative frame score values, and including means for successively associating said printing means with respective player score value storage means to transfer a particular player score value to the printing means for printing.

126. An apparatus as in claim 121 wherein said means for entering into the machine pinfall values includes additionally means for entering bonus marks earned from the rolling of said balls; said means for computing from said pinfall values computes additionally from the bonus marks said cumulative score values; said means for transferring pinfall values transfers additionally the bonus marks from said entry means to said means for computing, and said means for indicating during the progress of the game at separate locations respectively cumulative score values indicates additionally the bonus marks corresponding to each of the frames.

127. An apparatus as in claim 126 wherein said indicating means includes means for recording said cumulative score values and bonus marks.

128. An apparatus as in claim 126 wherein said indicating means includes means for printing at separate locations respectively a record of the cumulative score values and bonus marks.

129. An apparatus as in claim 128 including additionally means for displaying said record.

130. An apparatus as in claim 121 wherein said means for entering into the machine pinfall values includes additional means for entering marks earned from the rolling of said balls, said means for computing from said pinfall values computes additionally from the marks said cumulative score values, said means for transferring pinfall values transfers additionally marks from said entry means to said means for computing, said means for indicating during the progress of the game at separate locations respectively for each frame cumulative score values, indicates additionally marks and pinfall.

131. An apparatus as in claim 130 wherein said indicating means includes means for recording said cumulative score values, marks and pinfall.

132. An apparatus as in claim 130 wherein said indicating means prints at separate locations respectively a record of the cumulative score values, marks and pinfall.

133. An apparatus as in claim 132 including additionally means for displaying said record.

134. In an apparatus for recording the score of bowling games, the combination of value setting means for setting up scores, means connected to said value setting means to provide pinfall count thereto, printing means controlled by said value setting means for printing indicia representative of a score creditable to a player, means for delaying the printing of a score by said printing means after each pinfall count is received by said value setting means, and manual means for preventing the printing of an incorrect score during the delay of said printing.

135. In an apparatus for recording the score of bowling games, the combination of value setting means for setting up scores, means connected to said value setting means to provide pinfall count thereto, means for accumulating scores, means for entering scores from said value setting means into said accumulating means, printing means controlled by said accumulating means for printing indicia representative of an accumulated score creditable to a player, means for delaying the entry of a score into said accumulating means from the value setting means after each pinfall count is received by said value setting means, and manual means for preventing entry of an incorrect score from the value setting means into the accumulating means during the delay.

136. An apparatus as in claim 121 adapted to receive pinfall from a plurality of players including means for printing during the progress of the game at separate locations respectively for each player and each frame the cumulative score values corresponding to the frames and players, and means for transferring said cumulative score values from the computing means into the printing means.

137. In an apparatus for computing scores of a bowling game wherein bowling balls are rolled during each of successive scoring frames to earn cumulative score values resulting from the rolling of said balls, in combination, value setting means for establishing score values attributable to the rolling of said balls, a cumulative score value storage means for storing cumulative score values, means for clearing said cumulative score value storage means, means for entering a correct cumulative score value at a selected frame, and means for entering correct pinfall values into the value setting means for succeeding frames to correct erroneous entries.

138. In an apparatus for indicating scores of a bowling game wherein bowling balls are rolled during each of successive scoring frames to earn cumulative score values corresponding to completion of each of said frames and completion of said game based upon pinfall resulting from the rolling of said balls and bonus values resulting from strikes and spares, in combination, means for accumulating and indicating during the progress of the game concurrently at separate locations respectively successive cumulative score values for said frames attributable to said pinfall, entry means for setting up pinfall values, and means controlled by said entry means for entering said pinfall values into the accumulating and indicating means for indication of the cumulative score value for each frame during the remainder of the game.

139. In an apparatus for computing and indicating scores of a bowling game wherein bowling balls are rolled during each of successive scoring frames to earn cumulative score values corresponding to completion of the successive frames based upon pinfall resulting from the rolling of said balls, in combination, means for entering into the machine pinfall values earned from the rolling of said balls, means controlled by the entering means for computing from the entered pinfall values said cumulative score values, means for printing successive cumulative score values upon completion of each of the frames, means for supporting the printed cumulative score values at separate locations respectively, a viewing screen for displaying the printed cumulative score values, and an optical system for projecting the printed score values to the viewing screen during the progress of the game including a light source, means for directing light from the light source to the printed score values, and means for projecting an image of the printed score values to the viewing screen.

140. In an apparatus for computing and indicating scores of a bowling game wherein bowling balls are rolled during each of successive scoring frames to earn cumulative score values corresponding to completion of the successive frames based upon pinfall resulting from the rolling of said balls, in combination, means for entering into the apparatus pinfall values earned from the rolling of said balls, means controlled by the entering means for computing from the entered pinfall values said cumulative score values, means for supporting a score sheet having a plurality of areas in line for receiving successive printed cumulative score values, means for printing successive cumulative score values, and means mounting the printing means and score sheet supporting means for relative movement to register the printing means with successive frame areas on the score sheet.

141. The combination as defined in claim 140, wherein the score sheet supporting means is mounted for movement relative to the printing means to register the printer with successive frame areas on the score sheet.

142. The combination defined in claim 140, wherein the printing means comprises a plurality of slide bars corresponding respectively with the units, tens and hundreds digits of score values, each having a plurality of movable type slugs bearing respectively the digits zero to nine.

143. The combination as defined in claim 140 wherein the printing means and score sheet supporting means are mounted for relative movement in two directions at right angles to each other to register the printer with plural bowler lines parallel to each other on the score sheet and with successive frames in each line.

144. A combination as defined in claim 138, wherein said means for accumulating and indicating includes means for printing cumulative score values, means for supporting a media on which a score value is printed, and means for moving said media to a display position after printing.

145. In an apparatus for computing scores of a bowling game wherein bowling balls are rolled by each of a plurality of players on a team during each of successive scoring frames to earn cumulative score values corresponding to completion of each of the frames and completion of the game based upon pinfall resulting from the rolling of said balls, in combination, means for entering into the apparatus pinfall values earned from the rolling of said balls, player score computing means controlled by said entry means for computing said cumulative player scores, said player score computing means including cumulative score value storage means corresponding respectively to the players, and team score computing means for computing the team score from the total player game score in said cumulative score value storage means including means for adding completed player game score from said cumulative score value storage means player by player as each player completes his game thereby to provide player by player subtotal and total team scores.

146. A combination as defined in claim 145, including means for printing added player game scores player-by-player.

147. In an apparatus of the type described, means for establishing pinfall values attributable to the rolling of balls in successive scoring frames by a plurality of bowlers, means responsive to the value establishing means for computing frame-by-frame cumulative scores for each of the bowlers, printing means responsive to the computing means for printing the cumulative bowler frame scores, and an optical system including two viewing screens and means for projecting the printed score to each of the screens.

148. A combination as defined in claim 147 wherein one of said viewing screens is generally horizontally disposed and the other is generally vertically disposed.

149. In an apparatus for computing scores of a bowling game wherein bowling balls are rolled by a plurality of players who may bowl in random order during each of successive scoring frames to earn cumulative score values resulting from the rolling of said balls, in combination, value setting means for establishing score values attributable to the rolling of said balls, a cumulative score value storage means for each of a plurality of players, means for successively transferring score values attributable to successive players from said value setting means to the corresponding individual player score storage means, a manual bowler selector for controlling the transferring means to select at random the player score storage means with which the transferring means is to be associated comprising a plurality of manually operable switch means, one corresponding to each player, manually conditionable to the exclusion of the other switch means following completion of transfer of a score value to one storage means to selectively associate the transferring means with any other selected storage means and maintain association of said transferring means and said selected player storage means until a selected player's switch means corresponding to another selected storage means is conditioned.

150. In an apparatus for computing scores of a bowling game wherein bowling balls are rolled by a plurality of players during each of successive scoring frames to earn cumulative score values resulting from the rolling of said balls, in combination, value setting means for establishing score values attributable to the rolling of [sadi] *said* balls, a cumulative score value storage means for each of a plurality of players, means for successively [transferrng] *transferring* score values attributable to successive players from said value setting means to the corresponding individual player cumulative score value storage means, and manually operable mean for correcting by increasing or decreasing the cumulative score value in a selected cumulative score value storage means.

151. An apparatus as in claim 101 including means for receiving and indicating during the progress of the game at separate locations respectively cumulative score values for each of a plurality of players for each of said frames.

152. An apparatus as in claim 109 including means for receiving and recording during the progress of the game at separate locations respectively cumulative score values for each of a plurality of players for each of said frames.

153. An apparatus as in claim 142 wherein said means for receiving and recording comprises means for printing said cumulative score values.

154. An apparatus as defined in claim 153 including mean for displaying the printed scores.

155. An apparatus as defined in claim 153 including means for projecting the printed scores to a viewing screen.

156. An apparatus as in claim 153 including means for totalizing the player scores and printing the totalized score.

157. A combination as defined in claim 153 including means for totalizing completed player game scores player-by-player and means for printing the player-by-player subtotal and total scores.

158. An apparatus as in claim 121 including means for computing cumulative score values for each of a plurality of players, and means for indicating during the progress of the game at separate locations respectively cumulative score values for each of said players corresponding to each of said frames.

159. An apparatus as in claim 138 including means for accumulating and indicating during the progress of the game at separate locations respectively cumulative score values for each of a plurality of players for each of said frames.

160. In an apparatus for computing scores of bowling game wherein bowling balls are rolled by each of a plurality of players on a team during each of successive scoring frames to earn cumulative score values corresponding to completion of each of the frames and completion of the game based upon pinfall resulting from the rolling of said balls, in combination, means for entering into the apparatus pinfall values earned from the rolling of said balls, computing means controlled by said entry means for computing said cumulative scores, means for computing the team score from the player scores, and means for adding to said team score a handicap score or the average score of an absent bowler.

161. Apparatus as in claim 160 including means for recording said team handicap or average score of an absent bowler.

162. In an apparatus for computing scores of a bowling game wherein bowling balls are rolled by each of a plurality of players on a team during each of successive scoring frames to earn cumulative score values corresponding to completion of each of the frames and completion of the game based upon pinfall resulting from the rollng of said balls, in combination, means for entering into the apparatus pinfall values earned from the rollng of said balls, computing means controlled by said entry means for computing said cumulative scores, means for allowing a pace bowler to bowl and compute his score, means for computing the team score from the total player game scores, and means for inhibiting the entry of the pace bowler score into the team score computing means.

163. An apparatus for computing scores of a bowling game wherein a maximum of two balls are normally rolled during each of successive score frames to earn cumulative score values based upon pinfall resulting from the rolling of said balls, in combination, means for entering into the apparatus pinfall values earned from the rolling of said balls, computing means controlled by said entry means for computing said cumulative scores, cumulative score value storage means for each of said plurality of players, means for determining the completion of a game, means responsive to the determining means for providing an end of game signal, and means responsive to the end of game signal for clearing the respective player's cumulative score storage means.

164. An apparatus as in claim 145 including means for determining the completion of a game, means responsive to the determiningmeans for providing an end of game signal, said team score computing means being responsive to the end of game signal for controlling said means for adding completed player game score to add the total player score from said cumulative score value storage means.

165. Apparatus as in claim 164 including means responsive to said end of game signal for connecting said team score computing means to successive individual player cumulative score value storage means.

166. An apparatus for indicating pinfall of a bowling game wherein first and second balls are rolled during each of a succession of scoring frames, comprising means for indicating throughout the progress of the game a single value [representataive] *representative* of the actual numerical pinfall for each ball rolled for each frame, a plurality of signalling devices corresponding to pin positions and adapted in a first state to signal the presence of a corresponding pin and in a second state to signal the absence of a corresponding pin, means for interrogating said plurality of signallng devices to develop a signal for each device in one of said states to indicate the number of pins present or absent after the rolling of each ball, and totalizing means connected to receive said signals, totalize the same and energizing he indicating means.

167. Apparatus as in claim 166 wherein said indicating means includes means for recording during the progress of the game at separate locations respectively for each of said frames said pinfall values.

168. Apparatus as in claim 167 including means for receiving and recording throughout the progress of the game at separate locations respectively marks attributable to each of said balls for each of said frames, means for entering said marks, and means for transferring said marks from the entry means into the receiving and recording means.

169. Apparatus as in claim 168 wherein said means for receiving and recording includes means for printing said first and second ball pinfall and mark information at separate locations respectively for each frame.

170. An apparatus as defined in claim 167 including additionally a plurality of indicating lamps, each adapted to show a specific numerical value, responsive to said totalizing means.

171. An apparatus as in claim 170 wherein said means for recording comprises means for printing during the progress of the game at separate locations respectively the pinfall values for each of said frames, and including means for operating said indicating means and printing means to show the pinfall for each ball rolled.

172. Apparatus as in claim 166 wherein said indicating means includes means for printing the pinfall values for each of said frames.

173. Apparatus as defined in claim 150 wherein the correction means comprises means for clearing said selected score value storage means, and means for entering a corrected cumulative score value into said storage means.

174. An apparatus as in claim 7 including pin sensing means located adjacent a bowling lane pit position for sensing the number of pins remaining upright after each ball is bowled, and means controlled by said pin sensing means for communicating to a part of said value setting means a signal representing said number of pins.

175. The apparatus defined in claim 174 wherein said pin-sensing means includes: a plural-state device; and means controlled by said pin-sensing means for setting said plural-state device to a state representing the number of said pins down after the bowling of a ball.

176. The apparatus defined in claim 174 with: means located at said pit position for detecting the bowling of a ball; and means controlled by said ball detecting means for communicating to a part of said determining means a signal representing the bowling of a ball.

177. The apparatus defined in claim 176 with: means including said sensing means and operable, in response to the sensing of no upright pins following the bowling of the first ball of a scoring frame, for controlling said determining means to identify the next-bowled ball as the first ball of a scoring frame.

178. The apparatus defined in claim 176, wherein said pin-sensing means includes: a plurality of bistable devices corresponding to respective ones of said pins; means controlled jointly said pin-sensing means and by said ball detecting means for reversing the states of various ones of said bistable devices in accordance with the number of pins remaining upright after a ball is bowled; a plural-state device; means for scanning said bistable devices to determine the state of each device; and means controlled by said scanning means for setting said plural-state device to a state representing the number of pins down after said last-named ball is bowled.

179. The apparatus defined in claim 178 with: means including a part of said determining means, for controlling said first-named communicating means to communicate said first-named signal to said part of the value-setting means after the bowling of a predetermined ball.

180. The apparatus defined in claim 178 with: means controlled by said ball detecting means for again reversing the state of said various bistable devices.

181. The apparatus defined in claim 178 with: score-recording and display means controlled by said register; and means controlled by a part of said score-recording and display means for resetting said plural-state device to an initial state.

182. The apparatus defined in claim 174 with: a second apparatus of the type defined, associated with a second pit position; a second pin-sensing means of the type defined, located at said second pit position; second communicating means normally interconnecting said second pin-sensing means with a part of the value-setting means in said second machine; and means for cross-connecting said first and second pin-sensing means with the first and second value-setting means, respectively.

183. The apparatus defined in claim 182 with: a plurality of additional score registers in each of said apparatus; respective means in each apparatus for associating the value-setting means of said machine with successive score registers thereof; means normally effective to disable said cross-connecting means; and means controlled by said associating means for rendering said disabling means ineffective when a predetermined register of each apparatus is associated with the value-setting means of the same apparatus.

184. The apparatus defined in claim 182 with switching means for disabling said cross-connecting means.

185. The apparatus defined in claim 182 with: control means for selectively operating said cross-connecting means.

186. The apparatus defined in claim 182 with: indicator means having two indicating conditions; and means controlled by said cross-connecting means for reversing the condition of said indicating means.

187. An apparatus as in claim 174 including means for detecting a disqualification with respect to the first ball of a scoring frame; means normally operable, only in response to the setting-up of a score of ten attributable collectively to both balls of a scoring frame, for recording a score of said character; and means controlled jointly by said determining means and said detecting means for operating said recording means in response to the setting-up of a score of ten attributable solely to the second ball of a frame when a first-ball disqualification is detected.

188. An apparatus as in claim 174 including means for detecting disqualifications with respect to the respective first and second balls of a scoring frame; means for temporarily storing a set-up first ball score; first recording means for recording an indication of a first-ball disqualification; second recording means for recording an indication of a second-ball disqualification and for recording a frame score; means operable by said detecting means and controlled by said determining means, in response to the detection of a first-ball disqualification, for setting up a first-ball score of zero and for operating said first recording means; means operable by said detecting means and controlled by said determining means, in response to the detection of a second-ball disqualificaton, for entering the first-ball score from-said second storing means into said register and for operating said second recording means.

189. The apparatus defined in claim 188, wherein said disqualification-detecting means includes: means for generating an output signal, means for automatically detecting the bowling of a ball; a light source; means ror receiving light from said source; and means controlled jointly by said receiving means and said bowling-detecting means and operable, only upon the concurrence of the detection of a bowled ball and the interruption of light to said receiving means, for operating said generating means, with output connections from said generating means to said first and second recording means.

190. In a machine for recording scores of a bowling game wherein a maximum of two balls are bowled during each of a succession of scoring frames to earn cumulative scores based upon the number of bowling pins downed by said balls, the combination, to-wit: score registers for receiving and storing cumulative score values, value-setting means for setting up said scores; means controlled by said value-setting means for entering completed frame scores into said registers; means for supporting a printing medium providing a printing surface; printing means controlled by said value-setting means for printing indicia representative of said cumulative scores on said printing surface; mark setting means for setting up representations of circumstances environmental to said scores; additional printing means controlled by said mark setting means for printing indicia representing said environmental circumstances on said surface; means for determining the bowling of a ball to which one of said environmental circumstances relates; and means for operating the additional printing means in response to said determination, to print the indicia representing said one environmental circumstance.

191. The recording machine defined in claim 190 with: means for determining the completion of a frame score; and means, including said first-named controlled means for delaying the printing of said score-representing indicia until the determination of the completion of a frame score.

192. The machine defined in claim 191, with means for visually displaying information printed in one printing operation prior to a subsequent printing operation.

193. The machine defined in claim 192, wherein the information relating to one scoring frame remains displayed during the printing and display of information relating to a subsequent scoring frame.

194. The machine defined in claim 192, with selectively operable means for removing from displaying position the printed information relating to a scoring frame.

195. The machine defined in claim 194 with: means for adjusting said value-setting means to correct an incorrectly set-up score.

196. The machine defined in claim 195 with: manually operable means for adjusting said mark-setting means to enter an omitted mark or correct an entered mark.

197. The machine defined in claim 192, wherein said printing surface is divided into two physical parts for receiving the printing of said score indicia and said mark indicia, respectively, with means for moving each part of said surface to respective display positions forthwith in response to the printing thereon.

198. The machine defined in claim 197 with: respective means at said display positions for receiving said parts of the printing surface; means for holding each of said parts at its respective printing position; and means, including said moving means, for releasing said parts to permit the latter to fall by gravity to their respective display positions.

199. The machine defined in claim 197 with: a 10th-frame programming device; means for sensing the completion of a ninth-frame; and means controlled by said sensing means for operating said programming device.

200. An apparatus as in claim 36 wherein said entry means comprises means for detecting and totalizing pins downed and transmitting a signal corresponding to pins downed.

201. Apparatus as in claim 200 which additionally includes means for manually entering score values into said machine and for controlling the operation of the machine.

202. In a device for calculating scores of a bowling game as in claim 4, means for automatically detecting the bowling of a ball; and means operable by said detecting means for cycling the first programming device.

203. In a pinfall indicator, means for sensing the presence or absence of pins on a bowling lane after each ball is bowled, printing means for giving an indication representative of total numerical pinfall for each ball of a discrete playing frame, and means responsive to said sensing means for totalizing the numerical pinfall after each ball of a frame for controlling said printing means to print the total, numerical pinfall for each ball.

204. The combination as in claim 203 including means for indicating throughout the progress of a game at separate locations for each frame, the actual, numerical pinfall totals for each ball.

205. In an apparatus for indicating scores of a bowling game wherein bowling balls are rolled during each of successive scoring frames to earn cumulative score values corresponding to completion of each of said frames and completion of said game based upon pinfall resulting from the rolling of said balls, in combination, pin sensing means for sensing the pins which remain standing each time a ball is rolled, means for receiving and indicating throughout the progress of the game at separate locations respectively cumulative score values for each of said frame attributable to said pinfall, means for accumulating score values, totalizing means associated with said pin sensing means for totalizing the numerical pinfall and operative in response to the number of fallen pins after each ball of a discrete playing frame for entering the numerical pinfall into said accumulating means, means for determining completion of a frame score, and means responsive to the determination of completion of a frame score for transferring cumulative score values from the accumulating means to the indicating means to indicate the cumulative score values for each of said frames at separate locations.

206. An apparatus as in claim 205 wherein said apparatus includes means for recording at separate locations for each frame said cumulative score values.

207. An apparatus as in claim 205 including second means for receiving and indicating throughout the progress of the game at separate locations respectively bonus marks attributable to said pinfall for each of said frames, said sensing means including means for generating bonus mark information, and means for entering bonus mark information into said second receiving and indicating means for indicating the bonus marks for each of said frames at separate locations.

208. An apparatus as in claim 207 wherein said apparatus includes means for recording at separate locations for each frame said cumulative score values and said bonus marks.

209. An apparatus as in claim 207 wherein said second means for receiving and indicating throughout the progress of the game at separate locations respectively bonus marks attributable to each of said balls for each of said frames includes additionally means for indicating throughout the progress of the game at separate locations respectively pinfall.

210. An apparatus as in claim 209 wherein said apparatus includes means for recording at separate locations for each of said frames said cumulative frame scores, pinfall and marks.

211. An apparatus as in claim 206 wherein said apparatus includes means for printing at separate locations respectively a permanent record of the cumulative score values.

212. An apparatus as in claim 206 including additionally means for displaying said record.

213. An apparatus as in claim 109 including bowling pin detecting means, means associated with said detecting means for totalizing pinfall; and means for transferring pinfall from said totalizing means to said accumulating means.

214. An apparatus as in claim 213 wherein said recording means includes means for printing at separate locations respectively a printed record of said cumulative score values.

215. An apparatus as in claim 213 including additionally means for displaying said record.

216. An apparatus as in claim 213 including means for receiving and recording throughout the progress of the game at separate locations respectively pinfall and marks attributable to each of said balls for each of said frames, means associated with said detecting means for forming mark information signals, and means for entering said pinfall and mark information signals into said receiving and recording means.

217. An apparatus as in claim 216 wherein said recording means includes means for printing at separate locations respectively a printed record of said cumulative score values, pinfall and marks.

218. An apparatus as in claim 216 including additionally means for displaying said records.

219. In an apparatus for recording scores of a bowling game wherein bowling balls are rolled during each of a succession of scoring frames to earn cumulative score values, in combination, means for receiving and recording throughout the progress of the game at separate locations respectively for each of said frames first and second ball pinfall and bonus mark information, pin detecting means, means associated with said pin detecting means for deriving total pinfall and bonus mark information, and means for transferring said first and second ball pinfall and bonus mark information from said deriving means into the receiving and recording means to record and maintain the same for the duration of the game.

220. An apparatus as in claim 219 wherein said receiving and recording means includes means for printing said first and second ball pinfall and bonus mark information at separate locations respectively for each frame.

221. An apparatus as in claim 121 wherein said entering means includes pin detecting means, and totalizing means associated with said pin detecting means for totalizing the pinfall for each of said balls.

222. An apparatus as in claim 221 including means for recording said cumulative score values.

223. An apparatus as in claim 221 wherein said indicating means prints at separate locations for each frame respectively a record of the cumulative score values.

224. An apparatus as in claim 223 including additionally means for displaying said record.

225. An apparatus as in claim 221 in which said totalizing means includes means for generating bonus marks, said computing means computing from the pinfall values and the bonus marks the cumulative score, and said indicating means serving to indicate additionally the bonus marks.

226. An apparatus as in claim 225 wherein said apparatus includes additionally means for recording said cumulative score values and bonus marks.

227. An apparatus as in claim 225 wherein said indicating means prints at separate locations respectively a record of the cumulative score values and bonus marks.

228. An apparatus as in claim 225 including additionally means for displaying said record.

229. An apparatus as In claim 221 in which said totalizing means includes means for generating marks, said computing means computes from the pinfall values and marks the cumulative score, and said indicating means serves to indicate additionally the marks.

230. An apparatus as in claim 229 wherein said machine includes additionally means for recording said cumulative score values, marks and pinfall.

231. An apparatus as in claim 229 wherein said indicating means prints at separate locations respectively a record of the cumulative score values, marks and pinfall.

232. An apparatus as in claim 229 including additionally means for displaying said record.

233. In a mechanism for indicating pinfall in a bowling alley, a plurality of signalling mechanisms each for indicating an actual numerical pinfall total each time a ball is rolled, means responsive to the signalling mechanisms for displaying throughout the progress of the game the pinfall total for each ball, and totalizing means operative in response to the number of fallen pins after each ball of a discrete playing frame is rolled for selectively energizing one of said signalling mechanisms to indicate the total pinfall of each ball of each frame.

234. A mechanism as in claim 233 including means for indicating strikes and spares for each discrete playing frame.

235. The combination as in claim 233 including means for incapacitating said signalling mechanism whenever an illegal ball is rolled.

236. Apparatus as in claim 235 including means for detecting the rolling of an illegal ball and generating an illegal ball signal, said incapacitating means being responsive to said signal.

237. Apparatus as in claim 166 including means controlling the totalizing means to store information as to totalized pinfall pending completion of interrogation and totalization and then energize the indicating means.

238. Bowling scoring apparatus as in claim 237 in which said interrogating and storage means are electrical.

239. Bowling scoring apparatus as in claim 166 including additionally means operatively connected to said interrogating means and operative in response to the absence of standing pins determined by said interrogating means after a second ball of said frame is rolled for indicating to a bowler that a spare has been made.

240. Bowling scoring apparatus as in claim 166 including additionally means operatively connected to said interrogating means and operative in response to the absence of standing pins determined by said interrogating means after a first ball of said frame is rolled for indicating to a bowler that a strike has been made.

241. In combination with a bowling apparatus having first and second ball operating cycles for each discrete playing frame of a bowling game, a first signalling mechanism for indicating the actual, numerical pinfall for a discrete frame only, after the first ball of a frame is rolled, a second signalling mechanism for indicating the actual, numerical pinfall for said discrete frame only, after the second ball of said frame is rolled, a plurality of pin sensing means for detecting the presence or absence of standing pins after each ball of said frame is rolled, means associated with said sensing means for interrogating said sensing means one by one to determine the number of fallen pins after each ball of said frame is rolled, storage means actuated by said interrogating means during a first ball cycle for temporarily storing information as to the total number of fallen pins after a first ball of a frame is rolled and actuated by said interrogating means during a second ball cycle for temporarily storing information as to the total number of fallen pins after a second ball of a frame is rolled, and means operative during the first and second ball operating cycles for causing said temporary storage means to actuate said first signalling mechanism during said first ball cycle and said second signalling mechanism during said second ball cycle to visually indicate for said discrete frame only, the number of fallen pins during each cycle of said frame.

242. An apparatus for computing and indicating scores of a bowling game wherein bowling balls are rolled during each of successive scoring frames to earn cumulative score values corresponding to completion of successive frames based upon pinfall resulting from the rolling of said balls, comprising manually operable means for entering into the apparatus numerical pinfall values earned from the rolling of said balls, means for detecting and totalizing pinfall and supplying pinfall values to the apparatus, means for computing cumulative score values from pinfall values, and means for manually selectively connecting or disconnecting said supply means relative to said computing means.

243. An apparatus as in claim 145 wherein said means for entering pinfall values includes means for detecting and totalizing pinfall and supplying pinfall values.

244. An apparatus as in claim 160, wherein said means for entering pinfall values includes means for detecting and totalizing pinfall and supplying pinfall values.

245. An apparatus as in claim 162 wherein said means for entering pinfall values includes means for detecting and totalizing pinfall and supplying pinfall values.

246. In an apparatus for recording the score of bowling games, the combination of value setting means for setting up scores, automatic pinfall detecting means connected to said value setting means to provide pinfall counts and manual pinfall count means connected to said value setting means to provide pinfall counts, printing means controlled by said value setting means for printing indicia representative of a score creditable to a player, means for delaying the printing of a score by said printing means after each pinfall count is received by said value setting means, and manual means for preventing the printing of an incorrect score during the delay of said printing.

247. In an apparatus for computing score values for a bowling game wherein bowling balls are rolled on a bowling alley during each of successive scoring frames to earn score values based at least in part on strikes and spares resulting from the rolling of said balls, there being attributable to the strikes and spares predetermined mark count values, in combination, means associated with the pit end of the alley for detecting strikes and spares, and means controlled by said detecting means for determining the mark count value attributable to each mark and for totalizing the mark count values 248. A combination as defined in claim 247 including means for visibly indicating the totalized mark count values.

249. In an apparatus for computing scores of a bowling game wherein bowling balls are rolled on a bowling alley by a plurality of players on a team during successive scoring frames to earn cumulative score values based upon strikes, spares, and pinfall less than ten, resulting from the rolling of said ball, there being attributable to the strikes and spares predetermined mark count values indicative of the team score, in combination, means associated with the pit end of the alley for detecting strikes, spares and pinfall less than ten, means controlled by said detecting means for computing cumulative score values for each of the players, and means controlled by said detecting means for determining the mark count value attributable to each mark and for totalizing the mark count values.

250. A combination as defined in claim 249 including means for visibly indicating the totalized mark count values.

251. In an apparatus for computing scores of a bowling game wherein bowling balls are rolled at bowling pins on a bowling alley during successive scoring frames to earn cumulative scores based upon pinfall resulting from the rolling of said balls, in combination, means associated with the pit end of the alley and responsive to the rolling of each ball for sensing the pin spot area of the alley to detect pinfall, means for storing successive cumulative scores corresponding to completion of each of the frames, means responsive to said sensing means for establishing cumulative scores in the storing means, manually operable means for clearing said storing means in the event of an error in the cumulative score therein, and manually operable means for supplying correct pinfall information to said establishing means to provide a correct cumulative score in the storing means.

252. An apparatus for indicating pinfall of a bowling game wherein first and second balls are rolled during each of a succession of scoring frames, comprising a plurality of sensing means one for each pin position having a first and second state serving to detect the presence or absence of corresponding pins, means for sequentially scanning said pin sensing means to develop a discrete signal for each of said sensing means in one of said states, and means responsive to said discrete signals for digitally totalizing the signals and indicating a single numerical value representative of the actual pinfall for each frame, including a digital totalizer for adding said discrete signals, and a separate indicating means responsive to the totalizer and including a plurality of separate indicators corresponding respectively to progressive pinfall values and selectively energizable under control of said totalizer.

253. An apparatus as in claim 252 wherein said separate indicators are a plurality of lamps corresponding respectively to pinfall values from one to 10.

254. In an apparatus for computing scores of a bowling game wherein bowling balls are rolled by a plurality of players during each of successive scoring frames to earn cumulative score value resulting from the rolling of said balls, in combination, means for detecting and totalizing pinfall to establish score values attributable to the rolling of said balls, a cumulative score value storage means for each of a plurality of players, means for successively transferring score values attributable to successive players from said value-setting means to the corresponding individual bowler score storage means, automatic bowler sequencing means responsive to completion of frame scoring for automatically successively associating said transferring means with successive score value storage means, and a single manually operable push button selectively operable and connected for successively associating the transferring means with successive score value storage means to override the automatic sequencing means.

255. An apparatus as in claim 149 wherein said value-setting means comprises means for detecting and totalizing pinfall to establish score values attributable to the rolling of said balls.

256. An apparatus as defined in claim 242 including manually operable means for correcting a cumulative score value in said computing means.

257. An apparatus as defined in claim 256 wherein said correction means comprises manually controllable means for clearing a cumulative score value from said computing means and manually controllable means for entering another cumulative score value into said computing means in place of the cleared value.

258. An apparatus as defined in claim 251 wherein said manually operable correction means includes manually controllable means for entering into said storing means a correct cumulative score for the last frame prior to an error and manually controllable means for supplying pinfall to said establishing means corresponding to each ball following the error.

259. In an apparatus for recording scores of a bowling game wherein two balls normally are bowled during each of a succession of scoring frames, such scores being based upon numbers of pins downed and bonus values resulting from strikes and spares, the combination of means for sensing numerical pinfall resulting from each of the balls bowled and for establishing a value corresponding thereto, means, including means responsive to such value establishment by said sensing means, for computing successive cumulative scores for each of said succession of frames based upon pins downed by said balls and bonus values resulting from strikes and spares, means for determining the completion of each frame score, means responsive to said determining means for printing corresponding one of said successive cumulative scores, means responsive to said sensing and value establishing means for printing a strike symbol or a spare symbol upon occurrence of a strike or spare respectively, and means whereby said printed cumulative scores and said printed strike and/or spare symbols are disposed in adjacent relationship.

260. In an apparatus for recording scores of a bowling game wherein two balls normally are bowled during each of a succession of scoring frames, such scores being based upon numbers of pins downed and bonus values resulting from strikes and spares, the combination of a. means for establishing pinfall values resulting from each of the balls bowled,
b. means, including means responsive to such value establishment, for computing successive cumulative scores for each of said succession of frames based upon pins downed by said balls and bonus values resulting from strikes and spares,
c. means for determining the completion of each frame score,
d. means responsive to said determining means for printing a corresponding one of said successive cumulative scores, and
e. means whereby said printed cumulative scores are disposed in adjacent relationship.

261. A system for automatically tabulating bowling information comprising: pin-fall indicating means for providing a signal having a magnitude in accordance with the number of pins knocked down during the course of one frame and after each ball bowled in that frame, totalizing circuit means for providing a per frame indication of the bowling score and for recording and retaining said indication for each frame responsively to an output signal whereby the score accumulated in each frame will be preserved and can be obtained and means responsive to said signal from said pin-fall indicating means for providing said output signal to said totalizing circuit means after each ball bowled.

262. A system for automatically tabulating bowling information comprising:

a. pinfall indicating means for providing a signal having a magnitude in accordance with the number of pins knocked down during the course of one frame and after each ball bowled in that frame, b. totalizing means for providing a per frame indication of the bowling score and for recording and retaining said indication for each frame responsively to an output signal whereby the score accumulated in each frame will be preserved and can be obtained, and c. means responsive to said signal from said pinfall indicating means for providing said output signal to said totalizing means after each ball bowled.

263. An apparatus as defined in claim 138 wherein the entry means comprises a manually operable keyboard for establishing pinfall values.

264. An apparatus as defined in claim 138 wherein the entry means comprises means for detecting pinfall and establishing pinfall values.

265. Apparatus as defined in claim 149 wherein said cumulative score value storage means comprises a plurality of separate registers corresponding respectively to the players.

266. Apparatus as defined in claim 149 wherein said selector comprises a manually indexable switch means including a series of stationary switch contacts corresponding respectively with the score storage means and a movable switch contact positionable to engage any selected stationary contact.

267. In an apparatus for computing the bowling scores for a plurality of bowlers bowling as a team and for computing a score of the team, the combination of: means for receiving pinfall information relative to each of said plurality of bowlers and for computing bowling scores thereform; and manually and selectively operable means for alternatively providing error correction information to said receiving and computing means for correcting an error in a bowling score computed thereby and for providing handicap information to said receiving and computing means whereby a handicap value will be included in a team score computed thereby.

268. In an apparatus for computing bowling scores for a plurality of bowlers, means for detecting pinfall on a bowling lane, computation means responsive to the detecting means for successively computing cumulative frame-by-frame score values for each of the bowlers and storing such values including cumulative score value storage means for each of the bowlers, means separate from the detection means and the computation means responsive to the detecting means and controlling the computation means for totalizing and storing pin down pinfall values subsequent to release of the information by the detection means and prior to use of the information by the computation means.

269. A method of recording scores of a bowling game, comprising the steps of a. computing cumulative frame-by-frame scores based on pinfall and bonus values attributable to strikes and spares, b. applying the scores in ink on contrasting supporting means and arranging the successive frame scores in adjacent positions on the supporting means, c. projecting the scores to a viewing screen during the progress of the game, d. applying the tacky side of an adhesive coated transparent tape to the scores on the supporting means to adhere at least some of the ink to the tape, e. removing the tape from the supporting means to lift the scores, and f. applying the tape to paper-like carrier for permanent record.

* * * * *